US012807784B2

(12) United States Patent
Grigorenko et al.

(10) Patent No.: US 12,807,784 B2
(45) Date of Patent: Nov. 24, 2026

(54) COMPOSITIONS, COMPRISING SILVER NANOPLATELETS

(71) Applicant: BASF SE, Ludwigshafen am Rhein (DE)

(72) Inventors: Nikolay A. Grigorenko, Basel (CH); Andre Oswald, Schweizerhalle (CH)

(73) Assignee: BASF SE, Ludwigshafen am Rhein (DE)

( * ) Notice: Subject to any disclaimer, the term of this patent is extended or adjusted under 35 U.S.C. 154(b) by 624 days.

(21) Appl. No.: 18/275,435

(22) PCT Filed: Jan. 31, 2022

(86) PCT No.: PCT/EP2022/052247
§ 371 (c)(1),
(2) Date: Aug. 2, 2023

(87) PCT Pub. No.: WO2022/167377
PCT Pub. Date: Aug. 11, 2022

(65) Prior Publication Data

US 2024/0309174 A1 Sep. 19, 2024

(30) Foreign Application Priority Data

Feb. 3, 2021 (EP) .................................... 21154989

(51) Int. Cl.

| | |
|---|---|
| ***C08K 3/08*** | (2006.01) |
| ***B22F 1/054*** | (2022.01) |
| ***B22F 1/0545*** | (2022.01) |
| ***B22F 9/24*** | (2006.01) |
| ***B22F 10/12*** | (2021.01) |
| ***B33Y 70/00*** | (2020.01) |

(52) U.S. Cl.
CPC .............. *C08K 3/08* (2013.01); *B22F 1/0545* (2022.01); *B22F 1/0551* (2022.01); *B22F 9/24* (2013.01); *B22F 10/12* (2021.01); *B33Y 70/00* (2014.12); *C08K 2003/0806* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 3,271,341 | A | 9/1966 | Garrison, Jr. |
| 4,025,709 | A | 5/1977 | Blaise et al. |
| 4,380,618 | A | 4/1983 | Khan et al. |
| 5,688,884 | A | 11/1997 | Baker et al. |
| 5,763,552 | A | 6/1998 | Feiring et al. |
| 5,789,508 | A | 8/1998 | Baker et al. |
| 7,261,843 | B2 | 8/2007 | Knox et al. |
| 9,028,724 | B2 | 5/2015 | Son et al. |
| 9,486,996 | B2 | 11/2016 | Ng et al. |
| 9,752,040 | B2 | 9/2017 | Goredema et al. |
| 10,208,224 | B2 | 2/2019 | Song et al. |
| 2005/0090613 | A1 | 4/2005 | Maruya et al. |
| 2011/0319535 | A1 | 12/2011 | Nesvadba et al. |
| 2012/0114521 | A1 | 5/2012 | Zinn |
| 2014/0232100 | A1 | 8/2014 | Mayer et al. |
| 2014/0247499 | A1 | 9/2014 | Doublet et al. |
| 2016/0170219 | A1 | 6/2016 | Fuhse |

(Continued)

FOREIGN PATENT DOCUMENTS

| | | | |
|---|---|---|---|
| DE | 102008002008 | A * | 12/2008 |
| DE | 102008002008 | A1 * | 12/2008 |

(Continued)

OTHER PUBLICATIONS

European Search Report for EP Patent Application No. 21154989.4, Issued on Aug. 5, 2021, 3 pages.

(Continued)

*Primary Examiner* — Tae H Yoon
(74) *Attorney, Agent, or Firm* — Faegre Drinker Biddle & Reath LLP

(57) ABSTRACT

The present invention relates to radically curable compositions, comprising (A) silver nanoplatelets, (B) one reactive diluent comprising 1 to 4 (meth)acrylate groups; (C) one, or more urethane (meth)acrylates (C), which are obtainable by reaction of the following components:

(a) at least one isocyanate having two isocyanate groups,
(b) at least one polyalkylene oxide polyether having at least 2 hydroxyl groups,
(c) at least one hydroxy-functional (meth)acrylate having one hydroxyl group and one (meth)acrylate group,
(d) at least one compound having at least one isocyanate reactive group and at least one acid function,
(e) if component (d) is present, optionally at least one basic compound which is present for neutralization or partial neutralization of the acid groups of component (d),
(f) optionally at least one monoalcohol having one hydroxy function, and
(g) optionally at least one compound having at least one primary and/or secondary amino group;
(D) one, or more photoinitiators; printing inks containing the compositions and their use for the production security products. Coatings obtained after curing of the compositions, show one color, when observed in transmission and another color, when observed in reflection on both sides of the cured coating. The metal-like reflection of the coatings may be further enhanced by the presence of surfactants.

15 Claims, No Drawings

(56) References Cited

U.S. PATENT DOCUMENTS

| | | | |
|---|---|---|---|
| 2017/0246690 A1 | 8/2017 | Murphy et al. |
| 2020/0040229 A1 | 2/2020 | Vella et al. |
| 2023/0174812 A1 | 6/2023 | Watanabe |

FOREIGN PATENT DOCUMENTS

| | | | |
|---|---|---|---|
| EP | 1791702 A2 | | 6/2007 |
| EP | 2559786 A1 | | 2/2013 |
| EP | 2886343 A1 | | 6/2015 |
| EP | 2667990 B1 | | 12/2016 |
| EP | 2886356 B1 | | 3/2017 |
| EP | 3156156 A1 | | 4/2017 |
| EP | 3157697 A1 | | 4/2017 |
| EP | 3441435 A1 | | 2/2019 |
| WO | 03/35596 | | 5/2003 |
| WO | 2005/003075 A1 | | 1/2005 |
| WO | 2006/074969 A1 | | 7/2006 |
| WO | 2006/076616 A2 | | 7/2006 |
| WO | 2009/056401 A1 | | 5/2009 |
| WO | 2010/108837 A1 | | 9/2010 |
| WO | 2011/064162 A2 | | 6/2011 |
| WO | 2013/090983 A1 | | 6/2013 |
| WO | 2013/186167 A2 | | 12/2013 |
| WO | 2014/041121 A1 | | 3/2014 |
| WO | 2014/118567 A1 | | 8/2014 |
| WO | 2014/187750 A1 | | 11/2014 |
| WO | 2015/120975 A1 | | 8/2015 |
| WO | 2015/196017 A1 | | 12/2015 |
| WO | 2016/091381 A1 | | 6/2016 |
| WO | WO 2016170160 A1 | * | 10/2016 |
| WO | 2016/173695 A1 | | 11/2016 |
| WO | 2016/173696 A1 | | 11/2016 |
| WO | 2017/008897 A1 | | 1/2017 |
| WO | 2017/008905 A2 | | 1/2017 |
| WO | 2017/028950 A1 | | 2/2017 |
| WO | 2017/054922 A1 | | 4/2017 |
| WO | 2017/080641 A1 | | 5/2017 |
| WO | 2017/092865 A1 | | 6/2017 |
| WO | 2017/114590 A1 | | 7/2017 |
| WO | 2018/045429 A1 | | 3/2018 |
| WO | 2019/131435 A1 | | 7/2019 |
| WO | 2020/083794 A1 | | 4/2020 |
| WO | 2020/084054 A1 | | 4/2020 |
| WO | 2020/156858 A1 | | 8/2020 |
| WO | 2020/224982 A1 | | 11/2020 |

OTHER PUBLICATIONS

International Search Report and Written Opinion received for PCT Patent Application No. PCT/EP2022/052247, mailed on May 17, 2022, 10 pages.

International Preliminary Report on Patentability received for PCT Patent Application No. PCT/EP2022/052247, mailed on Aug. 17, 2023, 8 pages.

* cited by examiner

COMPOSITIONS, COMPRISING SILVER NANOPLATELETS

CROSS-REFERENCE TO RELATED APPLICATIONS

This application is a National stage application (under 35 U.S.C. § 371) of PCT/EP2022/052247, filed Jan. 31, 2022, which claims benefit of European Application No. 21154989.4, filed Feb. 3, 2021, both of which are incorporated herein by reference in their entirety.

The present invention relates to radically curable compositions, comprising (A) silver nanoplatelets, (B) one reactive diluent comprising 1 to 4 (meth)acrylate groups; (C) one, or more urethane (meth)acrylates (C), which are obtainable by reaction of the following components:

(a) at least one isocyanate having two isocyanate groups,
(b) at least one polyalkylene oxide polyether having at least 2 hydroxyl groups,
(c) at least one hydroxy-functional (meth)acrylate having one hydroxyl group and one (meth)acrylate group,
(d) at least one compound having at least one isocyanate reactive group and at least one acid function,
(e) if component (d) is present, optionally at least one basic compound which is present for neutralization or partial neutralization of the acid groups of component (d),
(f) optionally at least one monoalcohol having one hydroxy function, and
(g) optionally at least one compound having at least one primary and/or secondary amino group;
(D) one, or more photoinitiators; printing inks containing the compositions and their use for the production security products. Coatings obtained after curing of the compositions, show one color, when observed in transmission and another color, when observed in reflection on both sides of the cured coating. The metal-like reflection of the coatings may be further enhanced by the presence of surfactants.

The coatings, obtained with said compositions, show one color, when observed in transmission and another color, when observed in reflection on both sides of the cured coating. The metal-like reflection aspect may be further enhanced in presence of surfactants.

US2017246690 (EP3157697) discloses a method for synthesizing metal nanoparticles, the method comprising:

(a) preparing a metal precursor mixture comprising a metal precursor compound and a first aqueous liquid medium,
(b) preparing a reducing agent mixture comprising a reducing agent and a second aqueous liquid medium,
(c) optionally adding an acid or a base to the mixture prepared in step (a) or to the mixture prepared in step (b), wherein the metal precursor mixture and the reducing agent mixture are both free of stabilizing agent and free of seed particles,
(d) combining the metal precursor mixture with the reducing agent mixture so as to allow the metal precursor compound to react with the reducing agent, thereby synthesizing the metal nanoparticles.

EP3156156 relates to a fine silver particle dispersion, which comprises fine silver particles, a short chain amine having 5 or less carbon atoms and a highly polar solvent, and a partition coefficient log P of the short chain amine is −1.0 to 1.4. The method for producing the fine silver particles of EP3156156 comprises a first step for preparing a mixed liquid of a silver compound which is decomposed by reduction to produce a metal silver, and a short chain amine having a partition coefficient log P of −1.0 to 1.4, and a second step for reducing the silver compound in the mixed liquid to produce a fine silver particle where a short chain amine having 5 or less carbon atoms which is adhered to at least a part of the surface of the particle.

EP2559786 discloses a method comprising:

a) providing a substrate;
b) applying an aqueous catalyst solution to the substrate, the aqueous catalyst solution comprises nanoparticles of one or more metal chosen from silver, gold, platinum, palladium, iridium, copper, aluminum, cobalt, nickel and iron, and one or more stabilizing compounds chosen from gallic acid, gallic acid derivatives and salts thereof, the aqueous catalyst solution is free of tin; and
c) electrolessly depositing metal onto the substrate using an electroless metal plating bath.

U.S. Pat. No. 9,028,724 discloses a method for preparing a dispersion of nanoparticles, comprising: dispersing nanoparticles having hydrophobic ligands on the surface in a hydrophobic solvent to form a first dispersion; mixing the first dispersion with a surface modification solution comprising (a) at least one wetting-dispersing agent selected from polydimethylsilane, alkylol ammonium salt of an acidic polyester and alkylol ammonium salt of a polyacrylic acid, (b) a surfactant, and (c) an aqueous-based solvent to form a first mixture solution; mixing the first mixture solution with a ligand removal agent to form a second mixture solution containing hydrophilic nanoparticles and separating the hydrophilic nanoparticles from the second mixture solution; and dispersing the hydrophilic nanoparticles in an aqueous-based solvent, wherein the nanoparticles comprise one of a metal and a metal oxide.

EP2667990B1 relates to a process comprising:

forming an insoluble complex of a metal salt from a reaction mixture comprising a solvent, a first surfactant, a second surfactant, and a third surfactant, each surfactant being present in the insoluble complex of the metal salt, and reacting the insoluble complex of the metal salt with a reducing agent in the reaction mixture to form metal nanoparticles;

wherein the first surfactant comprises a primary amine, the second surfactant comprises a secondary amine, and the third surfactant comprises a chelating agent comprising N,N'-dialkylethylenediamine.

EP1791702B9 relates to an ink for ink-jet printing or digital printing comprising a vehicle and metallic particles having a weight average particle size of from 40 nm to 1 micrometres, preferably from 50 nm to 500 nm, wherein the loading of metallic nanoparticles in the ink is comprised between 2 percent by weight and 75 percent by weight, preferably from 2 percent to 40 percent by weight, and the viscosity of the ink is comprised between 10 and 40 cP.

WO09/056401 relates to a method for the synthesis, isolation and re-dispersion in organic matrixes of nanoshaped transition metal particles, selected from the group consisting of Zn, Ag, Cu, Au, Ta, Ni, Pd, Pt, Co, Rh, Ir, Fe, Ru, and Ti, comprising a) adding to an aqueous solution of the transition metal salt an acrylate or methacrylate monomer or oligomer, or a polyacrylate or polymethacrylate and a reducing agent;
b1) treating the colloidal solution with a peroxide; or
b2) exposing the colloidal solution to UV—or visible light;

c) adding a water soluble amine; and d) isolating the nano-shaped transition metal particles or re-disperse the nano shaped transition metal particles together with a dispersing agent in a liquid acrylate or methacrylate monomer.

WO2010108837 relates to a method of manufacturing shaped transition metal particles in the form of nanoplatelets, which metal is selected from the group consisting of Cu, Ag, Au, Zn, Cd, Ti, Cr, Mn, Fe, Co, Ni, Ru, Rh, Pd, Os, Ir and Pt, which method comprises the steps of first a) adding a reducing agent to an aqueous mixture comprising a transition metal salt and a polymeric dispersant, and subsequently b) treating the obtained colloidal dispersion with a peroxide, wherein the aqueous mixture in step a) comprises the transition metal salt in a concentration of higher than 2 mmol per liter.

WO11064162 relates to security, or decorative element, comprising a substrate, which may contain indicia or other visible features in or on its surface, and on at least part of the said substrate surface, a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a method for forming for forming an optically variable image (an optically variable device) on a substrate comprising the steps of: forming an optically variable image (OVI) on a discrete portion of the substrate; and depositing a coating composition comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a binder on at least a portion of the OVI.

WO2013/186167 discloses a method for forming a surface relief microstructure, especially an optically variable image (an optically variable device, OVD) on a substrate comprising the steps of:

A) applying a curable composition to at least a portion of the substrate wherein the curable composition comprises a1) at least one ethylenically unsaturated resin, a monomer or a mixture thereof;

a2) at least one photoinitiator; and a3) a metal pigment which is in the form of platelet shaped transition metal particles having a longest dimension of edge length of from 5 nm to 1000 nm, preferably from 7 nm to 600 nm and particularly from 10 nm to 500 nm, and a thickness of from 1 nm to 100 nm, preferably from 2 to 40 nm and particularly from 3 to 30 nm;

B) contacting at least a portion of the curable composition with a surface relief microstructure, especially optically variable image forming means;

C) curing the composition by using at least one UV lamp.

WO2014/041121 and WO2014/187750 relates to a security elements, comprising a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

WO2013/090983 relates to an optical security device, including a substrate having a first surface and a second surface; and a metallic nanoparticle ink provided intermittently in at least one area on the first surface to produce a reflective or partially reflective patch or patches; wherein a high refractive index coating is applied over the area or areas in which the metallic nanoparticle ink is provided, the high refractive index coating adhering to the first surface where the metallic nanoparticle ink is not present, thereby retaining the metallic nanoparticle ink between the first surface and the high refractive index coating.

WO2019/131435 (Konica Minolta, publication date: Apr. 7, 2019) relates to a method for producing a silver nanoparticle dispersion liquid which comprises: a step wherein an aqueous solution that contains a silver ammine complex, a polymer dispersant that has an acidic group and a polyalkylene oxide group, and an alkanolamine that serves as a reducing agent are mixed with each other, thereby causing reduction of the silver ammine complex and consequently obtaining an aqueous dispersion liquid that contains silver nanoparticles, the polymer dispersant that adheres to at least a part of the surfaces of the silver nanoparticles, and water; and a step wherein the aqueous dispersion liquid that contains silver nanoparticles is purified.

EP3441435A1 relates to an ink for screen printing, comprising surface-modified silver nanoparticles (A) and a solvent (B), and having a viscosity at a shear rate of 10 (1/s) and 25° C. of 60 Pa-s or more, the surface-modified silver nanoparticles (A) each comprising a silver nanoparticle, and an amine-containing protective agent coating a surface of the silver nanoparticle, the solvent (B) comprising a terpene solvent, a content of solvents having a boiling point of less than 130° C., in the solvent (B), being 20 wt % or less based on the total amount of solvents.

US20200040229 describes a conductive adhesive composition comprising:

at least one epoxy resin;

at least one polymer chosen from polyvinyl phenols and polyvinyl butyrals;

at least one melamine resin;

a plurality of metal nanoparticles having an average particle size ranging from about 0.5 nanometers to about 100 nanometers; and at least one solvent.

U.S. Ser. No. 10/208,224B2 relates to a composition comprising a polyvinyl butyral represented by the following formula:

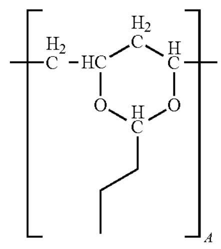

polyvinyl butyral

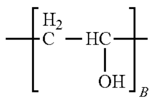

polyvinyl alcohol

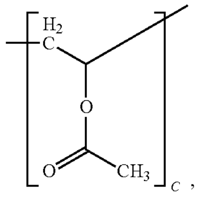

polyvinyl acetate wherein A, B and C represent a proportion of corresponding repeat units expressed as a weight percent, wherein each repeat unit is randomly distributed along a polymer chain and wherein the sum of A, B and C is about 100 weight percent and wherein the polyvinyl butyral is present in the composition in an amount ranging from about 1% to about 20% based on a total weight of the composition; a poly (melamine-co-formaldehyde) based polymer present in the composition in an amount ranging from about 0.5% to about 15%, based on a total weight of the composition, and an anhydride.

U.S. Pat. No. 9,752,040B2 relates to a nanosilver ink composition comprising: silver nanoparticles; poly(4-methylstyrene); and an ink vehicle; wherein the poly(4-methylstyrene) is present in the ink composition in an amount of 1 percent by weight based on the total weight of the ink composition. The nanosilver ink composition is produced by a process comprising: combining silver nanoparticles; poly (4-methylstyrene); and an ink vehicle; wherein the poly(4-methylstyrene) is present in the ink composition in an amount of 1 percent by weight based on the total weight of the ink composition.

U.S. Pat. No. 9,486,996 relates to a process comprising: selecting a printing system;

selecting an ink composition having ink properties that match the printing system; wherein the ink composition comprises metal nanoparticles;

wherein selecting an ink composition having ink properties that match the printing system comprises selecting an ink composition having a boiling point that matches the printing system and having a drying time that matches the printing system; depositing the ink composition onto a substrate to form an image, to form deposited features, or a combination thereof;

optionally, heating the deposited features to form conductive features on the substrate; and performing a post-printing treatment after depositing the ink composition.

WO2020/083794 and WO2020/224982 disclose compositions, comprising silver nanoplatelets, a process for its production and its use in security, or decorative elements.

U.S. Pat. No. 7,261,843 relates to photochromic articles comprising: (a) a rigid substrate, (b) a photochromic organic polymeric coating appended to at least a portion of at least one surface of said substrate, said polymeric coating comprising a photochromic amount of at least one photochromic material, and (c) a transparent coating comprising a thermally cured thermoset polymer superposed on said photochromic polymeric coating, said transparent coating being harder than said photochromic organic polymeric coating.

It has now been found, surprisingly, that coatings obtained after curing of the radically curable compositions of the present invention, show one color, when observed in transmission and another color, when observed in reflection on both sides of the cured coating. The metal-like reflection aspect may be further enhanced in presence of surfactants.

Accordingly, the present application relates to radically curable compositions, comprising (A) silver nanoplatelets, (B) one reactive diluent comprising 1 to 4 (meth)acrylate groups;

(C) one, or more urethane (meth)acrylates (C), which are obtainable by reaction of the following components:

(a) at least one isocyanate having two isocyanate groups, (b) at least one polyalkylene oxide polyether having at least 2 hydroxyl groups, (c) at least one hydroxy-functional (meth)acrylate having one hydroxyl group and one (meth)acrylate group, (d) at least one compound having at least one isocyanate reactive group and at least one acid function, (e) at least one basic compound which is present for neutralization or partial neutralization of the acid groups of component (d), (f) optionally at least one monoalcohol having one hydroxy function;

(D) one, or more photoinitiators;

(E) optionally one, or more reactive diluents, which are different from component (B);

(F) optionally one, or more oligomers, which are different from component (C); (G) optionally one, or more surfactants;

(I) optionally one, or more polymeric binders; and (H) optionally further additives.

The composition of the present invention is preferably solvent-free.

In the context of the composition of the present invention the term "solvent" means a compound with boiling point of below 250° C., preferably, below 200° C., which substantially evaporates during and/or after coating or printing of the compositions according to the present invention prior to the radiation curing step.

In general, the term "solvent-free" means that the amount of solvent is smaller than 5%, preferably smaller than 3%, more preferably smaller than 2%, most preferred smaller than 1% by weight based on the whole amount the composition.

The term "security document" refers to a document which is usually protected against counterfeit or fraud by at least one security feature. Examples of security documents include without limitation value documents and value commercial goods.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm).

The present invention preferably provides UV-Vis radiation radically curable printing inks, preferably selected from the group consisting of UV-Vis radiation radically curable rotogravure printing inks, UV-Vis radiation radically curable flexography security inks and UV-Vis radiation radically curable screen printing security inks and more preferably UV-Vis radiation radically curable screen printing security inks.

(B) Reactive Diluents Comprising 1 to 4 (meth)acrylate Groups

The reactive diluent (B) is selected from monofunctional, difunctional, trifunctional and tetrafunctional (meth)acrylates.

The reactive diluent (B) is a relatively low molecular weight compound having a weight average molecular weight (Mw) less than 800 g/mol.

The viscosity of the reactive diluent (B) is preferably in the range of from about 4 to 1000 mPa-s, more preferably of from about 4 to 500 mPa s, especially of from about 4 to 300 mPa-s.

The reactive diluent (B) may simultaneously comprise acrylate and methacrylate groups in one molecule.

Examples of monofunctional (metha)acrylates include without limitation octyl acrylate; decyl acrylate; lauryl acrylate, tridecyl acrylate; isodecyl acrylate; stearyl acrylate, 2-(2-ethoxyethoxy)ethyl acrylate, octyl methacrylate, lauryl methacrylate, isodecyl methacrylate, tridecyl methacrylate;

tetradecyl methacrylate; isodecyl methacrylate and stearyl methacrylate, 3,3,5-trimethylcyclohexyl acrylate; isobornyl acrylate; 4-tert-butylcyclohexyl acrylate; cyclohexylmethacrylate, isobornyl methacrylate, tetrahydrofurfuryl acrylate, (5-ethyl-1,3-dioxan-5-yl)methyl acrylate, ethoxylated phenyl acrylate, ethoxylated phenyl methacrylate, nonyl phenol acrylate, nonyl phenol methacrylate, methoxy polyethyleneglycol acrylates, methoxy polyethyleneglycol methacrylates, methoxy polypropyleneglycol acrylates, methoxy polypropyleneglycol methacrylates, tetrahydrofurfuryl methacrylate, cyclic trimethylolpropane formal methacrylate, benzyl acrylate, 2-phenoxyethyl acrylate, ethoxylated (EO4) phenol acrylate; mixtures of ethoxylated (EO4) phenol acrylate and ethoxylated (EO8) nonylphenol acrylate; propoxylated (PO2) nonylphenol acrylate, ethoxylated o-phenylphenol acrylate, p-cumylphenoxylethyl acrylate, dicyclopentenyl acrylate and dicyclopentenyloxyethyl acrylate and 2-(N-butylcarbamoyloxy)ethyl acrylate.

Examples of trifunctional (meth)acrylates are trimethylolpropane triacrylate (TMPTA), trimethylolpropane trimethacrylate (TMPTMA), ethoxylated trimethylolpropane triacrylates (in particular selected from the group consisting of ethoxylated (EO3) trimethylolpropane triacrylates, ethoxylated (EO6) trimethylolpropane triacrylates, ethoxylated (EO9) trimethylolpropane triacrylates), propoxylated trimethylolpropane triacrylates (PO3 TMPTA), ethoxylated glycerol triacrylates and propoxylated glycerol triacrylates (GPTA), pentaerythritol triacrylates (PETA), a mixture of pentaerythritol triacrylate and tetraacrylate, ethoxylated pentaerythritol triacrylates, propoxylated pentaerythritol triacrylates (ethoxylated (EO3) pentaerythritol triacrylates, ethoxylated (EO6) pentaerythritol triacrylates, ethoxylated (EO9) pentaerythritol triacrylates) and mixtures thereof.

Examples of tetrafunctional (meth)acrylates are bistrimethylolpropane tetraacrylate (DiTMPTA), pentaerythritol tetracrylate (PETTA), pentaerythritol tetramethacrylate, bistrimethylolpropane tetramethacrylate, ethoxylated pentaerythritol tetraacrylate (PPTTA, propoxylated pentaerythritol tetraacrylate, dipentaerythritol tetraacrylate, ethoxylated dipentaerythritol tetraacrylate, propoxylated dipentaerythritol tetraacrylate and mixtures thereof.

The reactive diluent (B) is preferably a difunctional (meth)acrylate.

The difunctional (meth)acrylate is preferably a compound of formula (XXa)

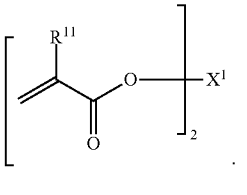

$R^{11}$ is independently in each occurrence H, or a methyl group;

$X^1$ is a group of formula

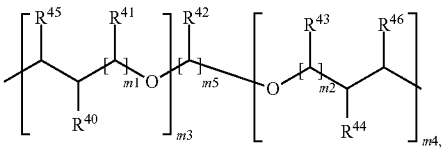

or

-continued

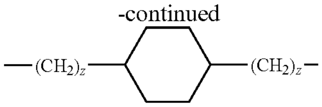

;

wherein m1 is 0, or 1; m2 is 0, or 1;

m3 is 0, or an integer of 1 to 10; m4 is 0, or an integer of 1 to 10;

m5 is 0, an integer 1 to 8;

z is 0, or 1;

$R^{42}$ is independently in each occurrence H, or a $C_1$-$C_4$alkyl group;

$R^{40}$, $R^{41}$, $R^{43}$, $R^{44}$, $R^{45}$ and $R^{46}$ are independently of each other H, or a $C_1$-$C_4$alkyl group.

Examples of difunctional (meth)acrylates of formula (XXa) are propylene glycol diacrylate, dipropylene glycol diacrylate, tripropylene glycol diacrylate, tetrapropylene glycol diacrylate, ethylene glycol diacrylate, diethylene glycol diacrylate, triethylene glycol diacrylate, tetraethylene glycol diacrylate, 1,3-propanediol diacrylate, 1,2-butanediol diacrylate, 1,3-butanediol diacrylate, 1,4-butanediol diacrylate, pentanediol diacrylate, hexanediol diacrylate, (ethoxylated) 1,4-butanediol diacrylate, (propoxylated) 1,4-butanediol diacrylate, (ethoxylated) 1,5-pentanediol diacrylate, (propoxylated) 1,5-pentanediol diacrylate, (ethoxylated) 1,6-hexanediol diacrylate, (propoxylated) 1,6-hexanediol diacrylate, (ethoxylated) 1,8-octanediol diacrylate, (propoxylated) 1,8-octanediol diacrylate, (ethoxylated)neopentyl glycol diacrylate, (propoxylated)neopentyl glycol diacrylate, propylene glycol dimethacrylate, dipropylene glycol dimethacrylate, tripropylene glycol dimethacrylate, tetrapropylene glycol dimethacrylate, ethylene glycol dimethacrylate, diethylene glycol dimethacrylate, triethylene glycol dimethacrylate, tetraethylene glycol dimethacrylate, 1,3-propanediol dimethacrylate, 1,2-butanediol dimethacrylate, 1,3-butanediol dimethacrylate, 1,4-butanediol dimethacrylate, pentanediol dimethacrylate, hexanediol dimethacrylate, (ethoxylated) 1,4-butanediol dimethacrylate, (propoxylated) 1,4-butanediol dimethacrylate, (ethoxylated) 1,5-pentanediol dimethacrylate, (propoxylated) 1,5-pentanediol dimethacrylate, (ethoxylated) 1,6-hexanediol dimethacrylate, (propoxylated) 1,6-hexanediol dimethacrylate, (ethoxylated) 1,8-octanediol dimethacrylate, (propoxylated) 1,8-octanediol dimethacrylate, (ethoxylated)neopentyl glycol dimethacrylate, (propoxylated)neopentyl glycol dimethacrylate, polyethylene glycol diacrylate, polyethyleneglycol dimethacrylate, poly(propylene glycol) diacrylate, poly(propylene glycol) dimethacrylate.

More preferably the reactive diluent B) is selected from dipropylene glycol diacrylate, tripropylene glycol diacrylate, dipropylene glycol dimethacrylate, tripropylene glycol dimethacrylate, diethylene glycol diacrylate, triethylene glycol diacrylate, diethylene glycol dimethacrylate, triethylene glycol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, cyclohexanediol diacrylate, cyclohexanediol dimethacrylate and cyclohexanedimethanol diacrylate. Dipropylene glycol diacrylate is most preferred.

Urethane (Meth)Acrylate (C)

The urethane (meth)acrylate (C) is preferably obtainable by reaction of the following components:

(a) at least one isocyanate having two isocyanate groups,
(b) at least one polyalkylene oxide polyether having at least 2 hydroxyl groups,
(c) at least one hydroxy-functional (meth)acrylate having one hydroxyl group and one (meth)acrylate group,
(d) at least one compound having at least one isocyanate reactive group and at least one acid function,
(e) at least one basic compound which is present for neutralization or partial neutralization of the acid groups of component (d),
(f) optionally at least one monoalcohol having one hydroxy function.

Optionally at least one compound having at least one primary and/or secondary amino group (g) is present.

The reaction mixture is heated at a temperature of 25 to 100° C., preferably 40 to 80° C. for 3 to 20 h, preferably 5 to 12 h with stirring, or circulating.

The production of the urethane (meth)acrylate (C) can be done in the presence of at least one reactive diluent.

Preferably, the isocyanate component (a) is added to a mixture containing components (b), (c) and (d).

Component (a):

Aromatic diisocyanates are preferred and include naphthylene 1.5-diisocyanate (NDI), tolylene 2,4- and/or 2,6-diisocyanate (TDI), diphenylmethane 2,2'-, 2,4'- and/or 4,4'-diisocyanate (MDI), 3,3'-dimethyl-4,4'-diisocyanato-diphenyl (TODI), p-phenylene diisocyanate (PDI), diphenylethan-4,4'-diisoyanate (EDI), diphenylmethandiisocyanate, 3,3'-dimethyl-diphenyl-diisocyanate, 1,2-diphenylethandiisocyanate and/or phenylene diisocyanat.

4,4'-, 2,4'- and/or 2,2'-methylenedicyclohexyl diisocyanate (H12MDI), isophorone diisocyanates (IPDI), and tolylene 2,4- and/or 2,6-diisocyanate (TDI) are preferred. TDI is most preferred.

Component (b)

Preferred components (b) are polyalkylene ether with 2 hydroxy groups, which are essentially, preferably exclusively formed from ethylene oxide and/or propylene oxide. Such compounds are often referred to as polyethylene/propylene glycols or polyalkylene glycols.

The structure of the polyalkylene glycols is generally as follows $HO—[—X_i—]_{n4}—H$, wherein $X_i$ for each i=1 to n4 independently of each other is selected from $—CH_2—CH_2—O—$, $—CH_2—CH(CH_3)—O—$ and $—CH(CH_3)—CH_2—O—$, especially $—CH_2—CH_2—O—$ and n4 is an integer from 5 to 60 can, preferably 10 to 45 and more preferably 7 to 50.

The number average molecular weight Mn may range preferably from 500 and 2000 g/mol. The OH numbers (53240 DIN, potentiometric) are preferably in a range of about 20 to 300 mg KOH/g of polymer.

Component (c)

The hydroxyalkylacrylate, or hydroxyalkylmethacrylate (A1) is preferably a compound of formula

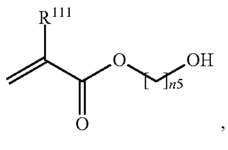

, wherein $R^{111}$ is a hydrogen atom, or a methyl group, and n5 is 2 to 6, especially 2 to 4. Examples of (A1) include 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate and 4-hydroxybutyl acrylate. 2-Hydroxyethyl acrylate is most preferred.

Component (d)

The component (d) comprises at least one, e.g. 1 to 3, more preferably 2 to 3 and most preferably exactly 2 isocyanate-reactive groups and at least one, preferably one, or two acid function.

The acid groups are preferably carboxylic acid groups.

The isocyanate-reactive groups are selected from hydroxyl, mercapto, primary and/or secondary amino groups. Hydroxy groups are preferred.

As compounds (d) mercaptoacetic acid (thioglycolic acid), mercaptopropionic acid, mercaptosuccinic acid, hydroxyacetic acid, hydroxypropionic acid (lactic acid), 2-hydroxysuccinic acid, hydroxypivalic acid, dimethylolpropionic acid, dimethylolbutyric acid, hydroxydecanoic acid, hydroxydodecanoic acid, 12-hydroxystearic acid, glycine (aminoacetic acid), Dimethylolbutyric acid is preferred and dimethylolpropionic acid is especially preferred.

Component (e)

At least one, preferably one basic compound is present for neutralization or partial neutralization of the acid groups of component (d).

Examples of basic compounds (e) are inorganic and organic bases such as alkali and alkaline earth metal hydroxides, oxides, carbonates, bicarbonates and ammonia or tert-amines. Preferably the neutralization or partial neutralization is done with sodium hydroxide or potassium hydroxide or tert-amines, such as triethylamine, tri-n-butylamine or ethyl diisopropylamine. The amount of introduced chemically bonded acid groups and the degree of neutralization of the acid groups (which is usually 40 to 100% of the equivalent basis) should preferably be sufficient to ensure the dispersion of the polyurethane in an aqueous medium, which is known in the art.

Component (f)

The component (f) is a monoalcohol having exactly one hydroxy function and comprising no further functional group.

Examples of the optional component (f) are methanol, ethanol, n-propanol, isopropanol and n-butanol.

The function of the compounds (f) is, in the preparation of the urethane (meth) acrylates (C) to saturate any remaining, unreacted isocyanate groups.

Suitable compounds (g) preferably have a molecular weight of below 1000 g/mol.

Examples include

- primary monoamines, such as, for example, $C_1$-$C_{20}$-alkyl amines, especially n-butyl amine, n-hexylamine, 2-ethylhexylamine, octadecylamine, isopropanolamine or methoxypropylamine, cycloaliphatic amines, such as, for example, cyclohexylamine and (hetero) aromatic groups containing amines, such as, for example, benzylamine, 1-(3-aminopropyl)imidazole and tetrahydrofurfuryl amine;
- compounds having two primary amino groups, such as, for example, $C_1$-$C_{20}$-alkylene diamines;
- compounds having secondary amino groups, such as, for example, dimethylamine, diethylamine, diisopropylamine and di-n-butylamine, and piperidine, pyrrolidine and morpholine;

compounds having primary and secondary amino groups, such as, for example, 3-amino-1-methylaminopropane, diethylenetriamine, triethylenetetramine, dipropylenetriamine and N,N-bis (3-aminopropyl)-ethylenediamine;

Compounds having a secondary amino group, such as, for example, dimethylamine, diethylamine, diisopropylamine and di-n-butylamine are preferred. Di-n-butylamine is most preferred.

The reaction is preferably accelerated by the addition of a suitable catalyst. Examples are tin(II)salts of organic carboxylic acids, such as, for example, tin(II)diacetate, tin(II)dioctoate, tin(II)bis(ethylhexanoate) and tin(II) and the dialkyltin(IV) salts of organic carboxylic acids, such as, for example, dimethyltin diacetate, dibutyltin diacetate, dibutyltin dibutyrate, dibutyltin-bis(2-ethylhexanoate), dibutyltin dilaurate, dibutyltin maleate, dioctyltin dilaurate and dioctyltin diacetate. In addition, zinc(II) salts such as zinc(II) dioctoate, can be used. It is also possible to carry out the reaction without catalyst, but in this case the reaction mixture must be exposed to higher temperatures and/or longer reaction times.

The optional addition of compound (g) is preferably done after the reaction of components (a) to (f) is essentially complete.

Polymerization inhibitors may be added to prevent undesirable polymerization of (meth)acrylate groups during the reaction. Such inhibitors are described on page 5, line 35 to page 10, line 4 of WO03/035596 and include for example, 2.6-di-tert-butyl-p-cresol and methyl hydroquinone.

The preparation of the urethane (meth)acrylate (C) can be done in the presence of a reactive diluent.

Preferred reactive diluents have one to four, preferably one two to four, more preferably two (meth)acrylate groups.

Particularly preferred reactive diluents have a boiling point higher than 200° C. at atmospheric pressure. Examples are the reactive diluents comprising 1 to 4 (meth)acrylate groups (B) described above. The same preferences apply as with respect to the reactive diluent (B). In case the preparation of the urethane (meth)acrylate (C) is done in the presence of a reactive diluent (B), the obtained urethane (meth)acrylate (C) already contains the reactive diluent (B).

Most preferred the urethane (meth)acrylate (C) is obtainable by reaction of the following components:

(a) at least one isocyanate having two isocyanate groups, which is selected from 4,4'-, 2,4'- and/or 2,2'-methylenedicyclohexyl diisocyanate (H12MDI), isophorone diisocyanates (IPDI), and tolylene 2,4- and/or 2,6-diisocyanate (TDI), and is especially TDI;

(b) at least one polyalkylene oxide polyether having at least 2 hydroxyl groups, which is selected from polyalkylene glycols of formula $HO—[—X_i—]_{n4}—H$, wherein $X_i$ for each i=1 to n4 independently of each other is selected from $—CH_2—CH_2—O—$, $—CH_2—CH(CH_3)—O—$ and $—CH(CH_3)—CH_2—O—$, very especially $—CH_2—CH_2—O—$ and n4 is an integer from 5 to 60 can, very especially 7 to 50;

(c) at least one hydroxy-functional (meth)acrylate having one hydroxyl group and one (meth)acrylate group, which is selected from 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate and 4-hydroxybutyl acrylate, and is especially 2-hydroxyethyl acrylate;

(d) at least one compound having at least one isocyanate reactive group and at least one acid function, which is selected from dimethylolbutyric acid and dimethylolpropionic acid, and is especially dimethylolpropionic acid;

(e) if component (d) is present, at least one basic compound which is present for neutralization or partial neutralization of the acid groups of component (d), which is selected from sodium hydroxide, potassium hydroxide triethylamine, tri-n-butylamine, di-n-butylamine and ethyl diisopropylamine, and is especially di-n-butylamine;

(f) optionally at least one monoalcohol having one hydroxy function, which is selected from methanol, ethanol, n-propanol, isopropanol and n-butanol;

(g) optionally at least one compound having at least one primary and/or secondary amino group, which is selected from dimethylamine, diethylamine, diisopropylamine and di-n-butylamine, and is especially di-n-butylamine, wherein the preparation of the urethane (meth)acrylate (C) is done in the presence of a reactive diluent; which is selected from dipropylene glycol diacrylate, tripropylene glycol diacrylate, dipropylene glycol dimethacrylate, tripropylene glycol dimethacrylate, diethylene glycol diacrylate, triethylene glycol diacrylate, diethylene glycol dimethacrylate, triethylene glycol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, cyclohexanediol diacrylate, cyclohexanediol dimethacrylate and cyclohexanedimethanol diacrylate, and is especially dipropylene glycol diacrylate.

Preferably, the isocyanate component (a) is added to a mixture containing components (b), (c) and (d).

The reaction is preferably accelerated by the addition of a suitable catalyst, which is preferably a dialkyltin(IV) salt of an organic carboxylic acid, such as, for example, dimethyltin diacetate, dibutyltin diacetate, dibutyltin dibutyrate, dibutyltin-bis(2-ethylhexanoate), dibutyltin dilaurate, dibutyltin maleate, dioctyltin dilaurate and dioctyltin diacetate. Dibutyltin dilaurate is most preferred.

Preferably, 2.6-di-tert-butyl-p-cresol and methyl hydroquinone are added to prevent undesirable polymerization of (meth)acrylate groups during the reaction.

The reaction mixture is heated at a temperature of 25 to 100° C., preferably 40 to 80° C. for 3 to 20 h, preferably 5 to 12 h.

Preferably a compound (g), which is selected from dimethylamine, diethylamine, diisopropylamine and di-n-butylamine, and is especially di-n-butylamine, is added after the reaction of components (a) to (f) is essentially complete.

D) Photoinitiator

Examples of photoinitiators are known to the person skilled in the art and for example published by Kurt Dietliker in "A compilation of photoinitiators commercially available for UV today", Sita Technology Textbook, Edinburgh, London, 2002 and include aminoketones (e.g. alpha-aminoketones), hydroxyketones (e.g. alpha-hydroxyketones), alkoxyketones (e.g. alpha-alkoxyketones), acetophenones, benzophenones, ketosulfones, benzyl ketals, benzoin ethers, phosphine oxides, phenylglyoxylates, and thioxanthones.

A suitable example of ketosulfone includes 1-[4-(4-benzoylphenylsulfanyl)phenyl]-2-methyl-2-(4-methylphenylsulfonyl)propan-1-one.

A suitable example of benzyl ketals includes 2,2-dimethoxy-2-phenylacetophenone.

Suitable examples of benzoin ethers include without limitation 2-ethoxy-1,2-diphenylethanone; 2-isopropoxy-1,2-diphenylethanone; 2-isobutoxy-1,2-diphenylethanone (CAS no. 22499-12-3); 2-butoxy-1,2-diphenylethanone; 2,2-dimethoxy-1,2-diphenylethanone; and 2,2-diethoxyacetophenone.

Examples of suitable acylphosphine oxide compounds are of the formula XII (XII)

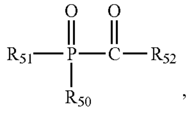

, $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

or $R_{53}$ and $R_{54}$ independently of one another are $C_2$-$C_{12}$-alkenyl, cyclopentyl, cyclohexyl, benzyl or phenyl;

Specific examples are bis(2,4,6-trimethylbenzoyl)-phenylphosphine oxide; 2,4,6-trimethylbenzoyl-diphenyl-phosphine oxide; ethyl (2,4,6 trimethylbenzoyl phenyl) phosphinic acid ester; (2,4,6-trimethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethyl-benzoyl)-phenylphosphine oxide with ethyl (2,4,6 trimethylbenzoyl phenyl) phosphinic acid ester, etc.

Examples of suitable benzophenone compounds are compounds of the formula X:

(X)

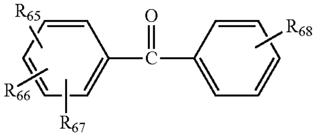

, $R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4alkyl)_2$;

$R_{68}$ is hydrogen, $C_1$-$C_4$alkyl, $C_1$-$C_4$halogenalkyl, phenyl, $N(C_1$-$C_4alkyl)_2$, $COOCH_3$,

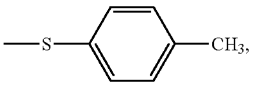

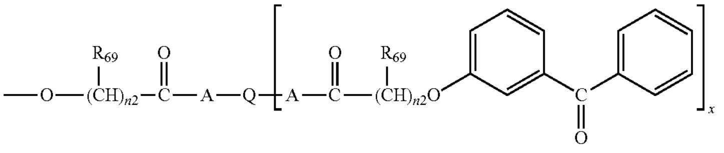

or

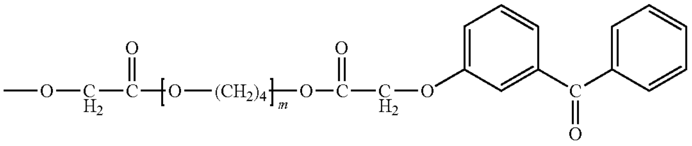

;

$R_{52}$ and R'$_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms;

Q is a residue of a polyhydroxy compound having 2 to 6 hydroxy groups;

x is a number greater than 1 but no greater than the number of available hydroxyl groups in Q;

A is $—[O(CH_2)_bCO]_y—$ or $—[O(CH_2)_bCO]_{(y-1)}—[O(CHR_{71}CHR_{70})_a]_y—$;

$R_{69}$ is hydrogen, methyl or ethyl; and if n is greater than 1 the radicals $R_{69}$ may be the same as or different from each other;

a is a number from 1 to 2;

b is a number from 4 to 5;

y is a number from 1 to 10;

n2 is a number from 1 to 10; and m is an integer 2-10.

Specific examples are benzophenone, a mixture of 2,4,6-trimethylbenzophenone and 4-methylbenzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one.

Examples of suitable alpha-hydroxy ketone, alpha-alkoxyketone or alpha-aminoketone compounds are of the formula (XI)

(XI)

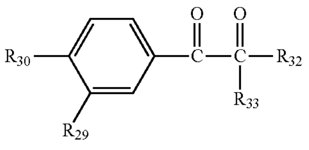

, wherein $R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2$—$OR_{34}$, morpholino, S—$C_1$-$C_{18}$alkyl, a group —HC═$CH_2$, —$C(CH_3)$═$CH_2$,

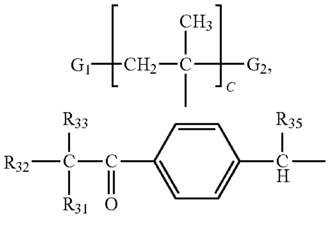

,

-continued

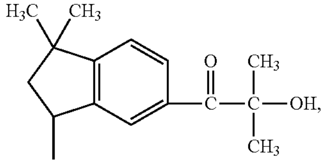

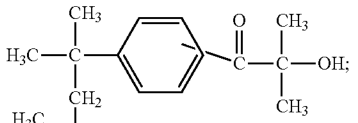

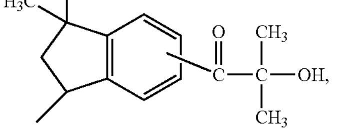

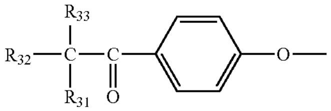

or

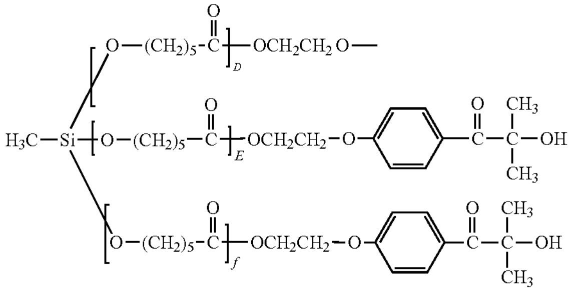

d, e and f are 1-3;

c is 2-10;

$G_1$ and $G_2$ independently of one another are end groups of the polymeric structure, preferably hydrogen or methyl;

$R_{34}$ is hydrogen,

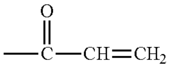

or

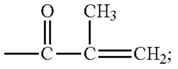

$R_{31}$ is hydroxy, $C_1$-$C_{16}$alkoxy, morpholino, dimethylamino or —$O(CH_2CH_2O)_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —$O(CH_2CH_2O)_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;

$R_{35}$ is hydrogen, $OR_{36}$ or $NR_{37}R_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

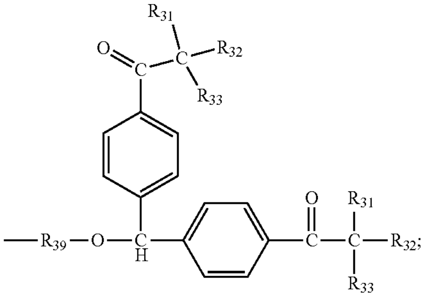

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

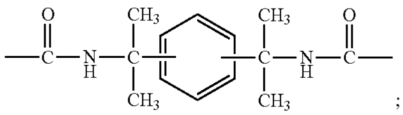

;

with the proviso that $R_{31}$, $R_{32}$ and $R_{33}$ not all together are $C_1$-$C_{16}$alkoxy or —$O(CH_2CH_2O)_g$—$C_1$-$C_{16}$alkyl.

Specific examples are 1-hydroxy-cyclohexyl-phenyl-ketone (optionally in admixture with benzophenone), 2-methyl-1[4-(methylthio)phenyl]-2-morpholinopropan-1-one, 2-benzyl-2-dimethylamino-1-(4-morpholinophenyl)-butan-1-one, 2-dimethylamino-2-(4-methyl-benzyl)-1-(4-morpholin-4-yl-phenyl)-butan-1-one, (3,4-dimethoxy-benzoyl)-1-benzyl-1-dimethylamino propane, 1-[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-hydroxy-1-{4-[4-(2-hydroxy-2-methyl-propionyl)-phenoxy]-phenyl}-2-methyl-propan-1-one, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula XIII (XIII)

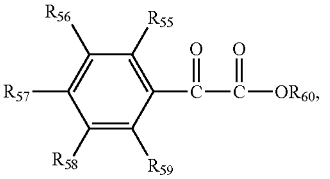

wherein $R_{60}$ is hydrogen, $C_1$-$C_{12}$alkyl or

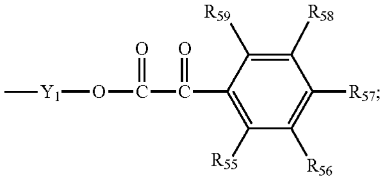

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkythio or $NR_{52}R_{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester, methyl α-oxo benzeneacetate. Examples of suitable oxime ester compounds are of the formula XIV (XIV)

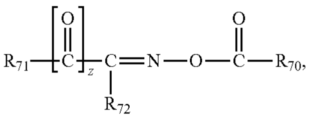

wherein z is 0 or 1;

$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, $OR_{73}$, $SR_{74}$ or by $NR_{75}R_{76}$; or $R_{70}$ is $C_1$-$C_8$alkoxy, benzyloxy; or phenoxy which is unsubstituted or substituted by one or more $C_1$-$C_6$alkyl or by halogen;

$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, $OR_{73}$, $SR_{74}$, $SOR_{74}$, $SO_2R_{74}$ or by $NR_{75}R_{76}$, wherein the substituents $OR_{73}$, $SR_{74}$ and $NR_{75}R_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more $OR_{73}$, $SR_{74}$ or by $NR_{75}R_{66}$; or $R_{71}$ is thioxanthyl, or

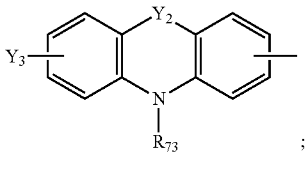

;

$R_{72}$ is hydrogen; unsubstituted $C_1$-$C_{20}$alkyl or $C_1$-$C_{20}$alkyl which is substituted by one or more halogen, $OR_{73}$, $SR_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, $OR_{73}$, $SR_{74}$ or by $NR_{75}R_{76}$; or is $C_2$-$C_{20}$alkanoyl or benzoyl which is unsubstituted or substituted by one or more $C_1$-$C_6$alkyl, phenyl, $OR_{73}$, $SR_{74}$ or by $NR_{75}R_{76}$; or is $C_2$-$C_{12}$alkoxycarbonyl, phenoxycarbonyl, CN, $CONR_{75}R_{76}$, $NO_2$, $C_1$-$C_4$haloalkyl, $S(O)_y$—$C_1$-$C_6$alkyl, or $S(O)_y$-phenyl, y is 1 or 2;

$Y_2$ is a direct bond or no bond;

$Y_3$ is $NO_2$ or

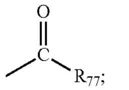

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, $N(C_1$-$C_{12}alkyl)_2$, diphenylamino or by

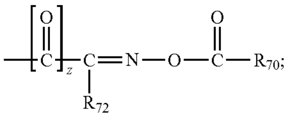

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_8$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio) phenyl]-2-(O-benzoyloxime), ethanone 1-[9-ethyl-6-(2-methylbenzoyl)-9H-carbazol-3-yl]-1-(O-acetyloxime), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(O-acetyloxime) (Adeka NC1831), etc.

In certain cases it may be of advantage to use mixtures of two or more photoinitiators.

In a particularly preferred embodiment the compositions of the present invention comprise at least one radical photoinitiator, which can be activated by irradiation with UV light in the range of 300 to 400 nm, especially 310 to 340 nm.

The photoinitiator (D) is preferably a compound of the formula (XII)

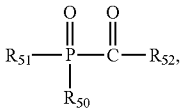

$R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)$R'_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl, or the photoinitiator (C) is a compound of the formula (XI)

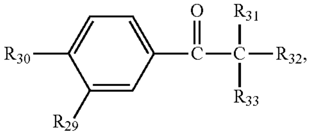

wherein $R_{29}$ is hydrogen or $C_1$-$C_{16}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2$—$OR_{34}$, morpholino, S—$C_1$-$C_{18}$alkyl, a group —HC═$CH_2$, —C($CH_3$)═$CH_2$,

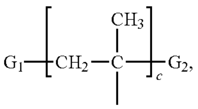
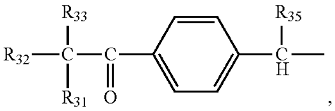
,
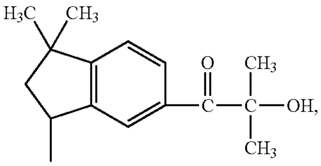

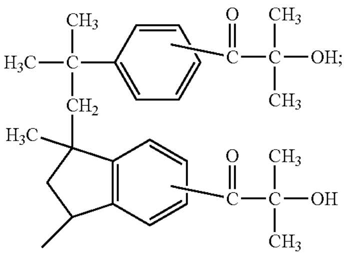
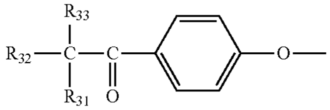
or

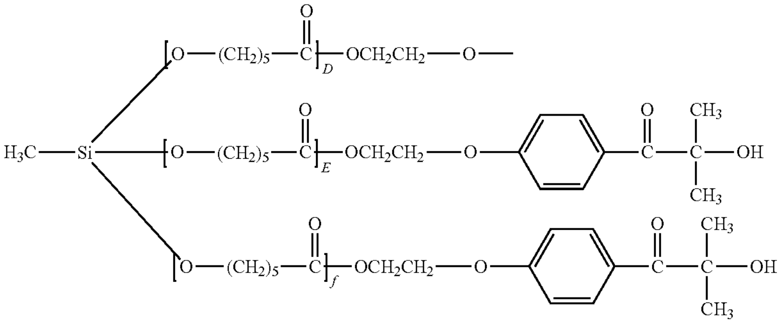

D, E and f are 1-3;

c is 2-10;

$G_1$ and $G_2$ independently of one another are end groups of the polymeric structure, preferably hydrogen or methyl;

$R_{34}$ is hydrogen,

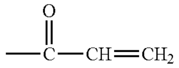
or
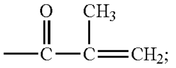
;

$R_{31}$ is hydroxy, $C_1$-$C_{16}$alkoxy, morpholino, dimethylamino or —$O(CH_2CH_2O)_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —$O(CH_2CH_2O)_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;

$R_{35}$ is hydrogen, $OR_{36}$ or $NR_{37}R_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

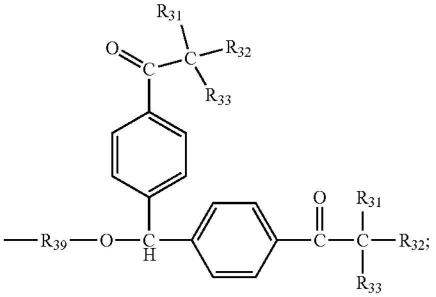
;

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

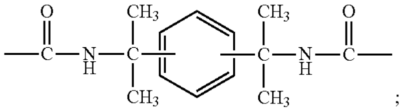
;

with the proviso that $R_{31}$, $R_{32}$ and $R_{33}$ not all together are $C_1$-$C_{16}$alkoxy or —$O(CH_2CH_2O)_g$—$C_1$-$C_{16}$alkyl, or the photoinitiator is a mixture of different compounds of the formula (XII), or the photoinitiator is a mixture of compounds of the formula (XII) and (XI).

E) Reactive Diluent

Reactive diluents are generally described in P. K. T. Oldring (ed.), Chemistry & Technology of UV & EB Formulations for Coatings, Inks & paints, Vol. II, Chapter III: Reactive Diluents for UV & EB Curable Formulations, Wiley and SITA technology, London 1997.

A "reactive diluent" is a component that contains at least one free radically reactive group (e.g., an ethylenically-unsaturated group) that can co-react with components (B), (C) and (F) (e.g., is capable of undergoing addition polymerization).

The reactive diluent (E) may comprise two different types of radically polymerizable ethylenically unsaturated groups in one molecule, for example, acrylate and methacrylate, acrylate and acrylamide, or acrylate and vinyl ester groups.

The reactive diluent (E) is a relatively low molecular weight compound having a weight average molecular weight MW less than 800 g/mol.

The reactive diluent (E) may be a single diluent, or a mixture of two, or more diluents.

If the composition of the present invention comprises the second diluent(s) E), it is contained in an amount of 5 to 50% by weight, preferably 10 to 40% by weight, more preferably 10 to 30% by weight based on the total weight of the composition.

The composition of the present invention may contain a monofunctional, difunctional, trifunctional, or tetrafunctional diluent having one, two, three, or four unsaturated carbon-carbon bonds.

The reactive diluent (E) is preferably selected from monofunctional (metha)acrylates, difunctional (metha)acrylates, trifunctional (metha)acrylates, tetrafunctional (metha)acrylates, pentafunctional (metha)acrylates, hexafunctional (metha)acrylates, monofunctional vinylamides, monofunctional vinyl esters, monofunctional (meth)acrylamides, di(meth)acrylamides, divinyl esters, divinyl amide trimethylolpropane formal (meth)acrylates, N-vinyloxazolidinones, N-Vinyl-caprolactam (NVC) and N-Vinyl-pyrrolidone (NVP) and mixtures thereof.

The reactive diluent (E) may be selected from monofunctional (metha)acrylates, including hydroxyethyl acrylate, hydroxypropyl acrylate and glycidyl acrylate, N-(2-hydroxyethyl)acrylate, hydroxyethyl methacrylate, hydroxypropyl methacrylate and glycidyl methacrylate; difunctional (metha)acrylates, trifunctional (metha)acrylates and tetrafunctional (metha)acrylates, which are different from the reactive diluent (B).

An example of monofunctional vinyl esters is 1-hexanoic acid vinyl ester.

Examples of monofunctional vinylamides include N-vinyl-pyrrolidone, N-vinylcaprolactame, N-(hydroxymethyl) vinylamide, N-hydroxyethyl vinylamide, N-isopropylvinylamide, N-isopropylmethvinylamide, N-tert-butylvinylamide, N,N'-methylenebisvinylamide, N-(isobutoxymethyl)vinylamide, N-(butoxymethyl)vinylamide, N-[3-(dimethylamino)propyl]methvinylamide, N,N-dimethylvinylamide, N,N-diethylvinylamide and N-methyl-N-vinylacetamide.

Examples of monofunctional (meth)acrylamides include acryloylmorpholine, methacryloylmorpholine, N-(hydroxymethyl)acrylamide, N-hydroxyethyl acrylamide, N-isopropylacrylamide, N-isopropylmethacrylamide, N-tert-butylacrylamide, N,N'-methylenebisacrylamide, N-(isobutoxymethyl)acrylamide, N-(butoxymethyl)acrylamide, N-[3-(dimethylamino)propyl]methacrylamide, N,N-dimethylacrylamide, N,N-diethylacrylamide, N-(hydroxymethyl)methacrylamide, N-hydroxyethyl methacrylamide, N-isopropylmethacrylamide, N-isopropylmethmethacrylamide, N-tert-butylmethacrylamide, N,N'-methylenebismethacrylamide, N-(isobutoxymethyl)methacrylamide, N-(butoxymethyl)methacrylamide, N-[3-(dimethylamino)propyl]methmethacrylamide, N,N-dimethylmethacrylamide and N,N-diethylmethacrylamide.

Further examples of a monofunctional diluent are N-vinyloxazolidinones of formula (I)

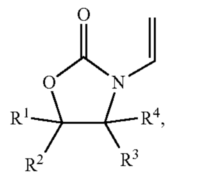

wherein $R^1$, $R^2$, $R^3$ and $R^4$ are independently of each other a hydrogen atom or an organic group having not more than 10 carbon atoms, such as, for example, N-vinyloxazolidinone (NVO), or N-vinyl-5-methyl oxazolidinone (NVMO);

N-Vinyl-pyrrolidone (NVP), N-Vinyl-caprolactam (NVC), trimethylolpropane formal (meth)acrylates, such as, for example,

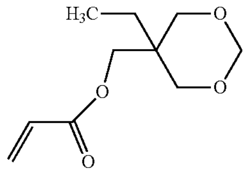

(trimethylolpropane formal acrylate)

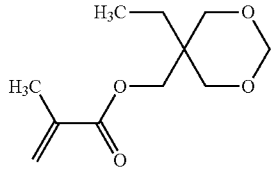

(trimethylolpropane formal methacrylate);

di(meth)acrylamides of formula (XXb)

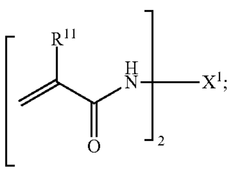

wherein $R^{11}$ is independently in each occurrence H, or a methyl group, $X^1$ is a group of formula

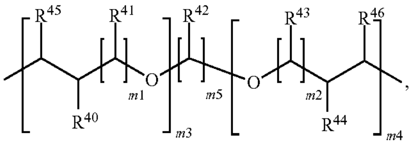

wherein m1 is 0, or 1; m2 is 0, or 1;

m3 is 0, or an integer of 1 to 10; m4 is 0, or an integer of 1 to 10;

m5 is 0, or an integer 1 to 8;

$R^{42}$ is independently in each occurrence H, or a $C_1$-$C_4$alkyl group;

$R^{40}$, $R^{41}$, $R^{43}$, $R^{44}$, $R^{45}$ and $R^{46}$ are independently of each other H, or a $C_1$-$C_4$alkyl group; divinyl esters of formula (XXc)

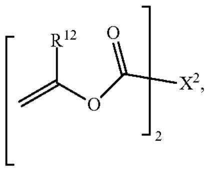

such as, for example, divinyl adipate, succinic acid divinyl ester, and divinyl amides of formula (XXd)

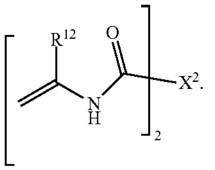

$R^{12}$ is independently in each occurrence H, or a methyl group, $X^2$ is a group of formula

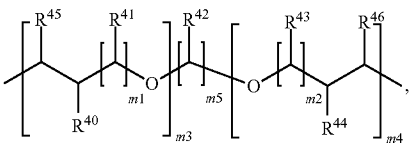

wherein m1 is 0, or 1; m2 is 0, or 1;

m3 is 0, or an integer of 1 to 10; m4 is 0, or an integer of 1 to 10;

m5 is 0, or an integer 1 to 8;

$R^{42}$ is independently in each occurrence H, or a $C_1$-$C_4$alkyl group;

$R^{40}$, $R^{41}$, $R^{43}$, $R^{44}$, $R^{45}$ and $R^{46}$ are independently of each other H, or a $C_1$-$C_4$alkyl group.

The reactive diluent (E) is preferably selected from monofunctional (metha)acrylates, difunctional (metha)acrylates, trifunctional (metha)acrylates, tetrafunctional (metha)acrylates, pentafunctional (metha)acrylates, hexafunctional (metha)acrylates, divinyl esters and mixtures thereof.

Examples of monofunctional (metha)acrylates include without limitation octyl acrylate; decyl acrylate; lauryl acrylate, tridecyl acrylate; isodecyl acrylate; stearyl acrylate, 2-(2-ethoxyethoxy)ethyl acrylate, octyl methacrylate, lauryl methacrylate, isodecyl methacrylate, tridecyl methacrylate; tetradecyl methacrylate; isodecyl methacrylate and stearyl methacrylate, 3,3,5-trimethylcyclohexyl acrylate; isobornyl acrylate; 4-tert-butylcyclohexyl acrylate; cyclohexylmethacrylate, isobornyl methacrylate, tetrahydrofurfuryl acrylate, (5-ethyl-1,3-dioxan-5-yl)methyl acrylate, ethoxylated phenyl acrylate, ethoxylated phenyl methacrylate, nonyl phenol acrylate, nonyl phenol methacrylate, methoxy polyethyleneglycol acrylates, methoxy polyethyleneglycol methacrylates, methoxy polypropyleneglycol acrylates, methoxy polypropyleneglycol methacrylates, tetrahydrofurfuryl methacrylate, cyclic trimethylolpropane formal methacrylate, hydroxyethyl acrylate, hydroxypropyl acrylate and glycidyl acrylate, N-(2-hydroxyethyl)acrylate, hydroxyethyl methacrylate, hydroxypropyl methacrylate and glycidyl methacrylate, benzyl acrylate, 2-phenoxyethyl acrylate, ethoxylated (EO4) phenol acrylate; mixtures of ethoxylated (EO4) phenol acrylate and ethoxylated (EO8) nonylphenol acrylate; propoxylated (PO2) nonylphenol acrylate, ethoxylated o-phenylphenol acrylate, p-cumylphenoxylethyl acrylate, dicyclopentenyl acrylate and dicyclopentenyloxyethyl acrylate and 2-(N-butylcarbamoyloxy)ethyl acrylate.

Examples of the difunctional (meth)acrylate are bisphenol A ethoxylate diacrylate, bisphenol A glycerolate diacrylate, glycerol diacrylate, triglycerol diacrylate, poly(ethylene glycol)-block-poly(propylene glycol)-block-poly(ethylene glycol) diacrylate, tricyclo[5.2.1.$0^{2,6}$]decanedimethanol diacrylate, (ethoxylated) trimethylolpropane methyl ether diacrylate, (propoxylated) trimethylolpropane methyl ether diacrylate, cyclohexanediol diacrylate, cyclohexanedimethanol diacrylate, cyclohexanedimethanol diacrylate, bisphenol A ethoxylate dimethacrylate, bisphenol A glycerolate dimethacrylate, glycerol dimethacrylate, triglycerol dimethacrylate, poly(ethylene glycol)-block-poly(propylene glycol)-block-poly(ethylene glycol) dimethacrylate, tricyclo[5.2.1.$0^{2,6}$]decanedimethanol dimethacrylate, (ethoxylated) trimethylolpropane methyl ether dimethacrylate, (propoxylated) trimethylolpropane methyl ether dimethacrylate, cyclohexanediol dimethacrylate and cyclohexanedimethanol dimethacrylate.

The difunctional (meth)acrylate is preferably a compound of formula (XXa)

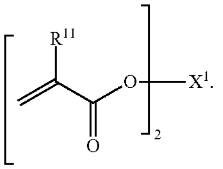

$R^{11}$ is independently in each occurrence H, or a methyl group;

$X^1$ is a group of formula

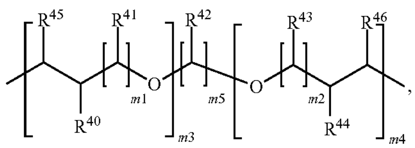

or

-continued

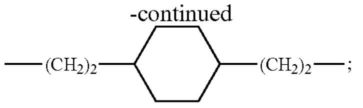

wherein m1 is 0, or 1; m2 is 0, or 1;

m3 is 0, or an integer of 1 to 10; m4 is 0, or an integer of 1 to 10;

m5 is 0, an integer 1 to 8;

z is 0, or 1;

$R^{42}$ is independently in each occurrence H, or a $C_1$-$C_4$alkyl group;

$R^{40}$, $R^{41}$, $R^{43}$, $R^{44}$, $R^{45}$ and $R^{46}$ are independently of each other H, or a $C_1$-$C_4$alkyl group.

Examples of difunctional (meth)acrylates of formula (XXa) are propylene glycol diacrylate, dipropylene glycol diacrylate, tripropylene glycol diacrylate, tetrapropylene glycol diacrylate, ethylene glycol diacrylate, diethylene glycol diacrylate, triethylene glycol diacrylate, tetraethylene glycol diacrylate, 1,3-propanediol diacrylate, 1,2-butanediol diacrylate, 1,3-butanediol diacrylate, 1,4-butanediol diacrylate, pentanediol diacrylate, hexanediol diacrylate, (ethoxylated) 1,4-butanediol diacrylate, (propoxylated) 1,4-butanediol diacrylate, (ethoxylated) 1,5-pentanediol diacrylate, (propoxylated) 1,5-pentanediol diacrylate, (ethoxylated) 1,6-hexanediol diacrylate, (propoxylated) 1,6-hexanediol diacrylate, (ethoxylated) 1,8-octanediol diacrylate, (propoxylated) 1,8-octanediol diacrylate, (ethoxylated)neopentyl glycol diacrylate, (propoxylated)neopentyl glycol diacrylate, propylene glycol dimethacrylate, dipropylene glycol dimethacrylate, tripropylene glycol dimethacrylate, tetrapropylene glycol dimethacrylate, ethylene glycol dimethacrylate, diethylene glycol dimethacrylate, triethylene glycol dimethacrylate, tetraethylene glycol dimethacrylate, 1,3-propanediol dimethacrylate, 1,2-butanediol dimethacrylate, 1,3-butanediol dimethacrylate, 1,4-butanediol dimethacrylate, pentanediol dimethacrylate, hexanediol dimethacrylate, (ethoxylated) 1,4-butanediol dimethacrylate, (propoxylated) 1,4-butanediol dimethacrylate, (ethoxylated) 1,5-pentanediol dimethacrylate, (propoxylated) 1,5-pentanediol dimethacrylate, (ethoxylated) 1,6-hexanediol dimethacrylate, (propoxylated) 1,6-hexanediol dimethacrylate, (ethoxylated) 1,8-octanediol dimethacrylate, (propoxylated) 1,8-octanediol dimethacrylate, (ethoxylated)neopentyl glycol dimethacrylate, (propoxylated)neopentyl glycol dimethacrylate, polyethylene glycol diacrylate, polyethyleneglycol dimethacrylate, poly(propylene glycol) diacrylate, poly(propylene glycol) dimethacrylate.

Examples of trifunctional (meth)acrylates are trimethylolpropane triacrylate (TMPTA), trimethylolpropane trimethacrylate (TMPTMA), ethoxylated trimethylolpropane triacrylates (in particular selected from the group consisting of ethoxylated (EO3) trimethylolpropane triacrylates, ethoxylated (EO6) trimethylolpropane triacrylates, ethoxylated (EO9) trimethylolpropane triacrylates), propoxylated trimethylolpropane triacrylates (PO3 TMPTA), ethoxylated glycerol triacrylates and propoxylated glycerol triacrylates (GPTA), pentaerythritol triacrylates (PETA), a mixture of pentaerythritol triacrylate and tetraacrylate, ethoxylated pentaerythritol triacrylates, propoxylated pentaerythritol triacrylates (ethoxylated (EO3) pentaerythritol triacrylates, ethoxylated (EO6) pentaerythritol triacrylates, ethoxylated (EO9) pentaerythritol triacrylates) and mixtures thereof.

Examples of tetrafunctional (meth)acrylates are bistrimethylolpropane tetraacrylate (DiTMPTA), pentaerythritol tetracrylate (PETTA), tetramethylolmethane tetramethacrylate, pentaerythritol tetramethacrylate, bistrimethylolpropane tetramethacrylate, ethoxylated pentaerythritol tetraacrylate (PPTTA, propoxylated pentaerythritol tetraacrylate, dipentaerythritol tetraacrylate, ethoxylated dipentaerythritol tetraacrylate, propoxylated dipentaerythritol tetraacrylate and mixtures thereof.

Examples of pentafunctional (meth)acrylates are dipentaerythritol pentaacrylate, sorbitol pentaacrylate and mixtures thereof.

Examples of hexafunctional (meth)acrylates are dipentaerythritol hexaacrylate, EBECRYL® 1290, which is a hexafunctional aliphatic urethane hexaacrylate and mixtures thereof.

More preferably the reactive diluent E) is selected from divinyladipate, dipropylene glycol diacrylate, tripropylene glycol diacrylate, dipropylene glycol dimethacrylate, tripropylene glycol dimethacrylate, diethylene glycol diacrylate, triethylene glycol diacrylate, diethylene glycol dimethacrylate, triethylene glycol dimethacrylate, butanediol diacrylate, butanediol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, cyclohexanediol diacrylate, cyclohexanediol dimethacrylate, cyclohexanedimethanol diacrylate, cyclohexanedimethanol dimethacrylate, (ethoxylated)neopentyl glycol diacrylate, (propoxylated)neopentyl glycol diacrylate, (ethoxylated)neopentyl glycol dimethacrylate, (propoxylated)neopentyl glycol dimethacrylate, trimethylolpropane triacrylate (TMPTA), trimethylolpropane trimethacrylate (TMPTMA), ethoxylated trimethylolpropane triacrylates, ethoxylated trimethylolpropane trimethacrylates, propoxylated trimethylolpropane triacrylates, propoxylated trimethylolpropane trimethacrylates, ethoxylated glycerol triacrylates, ethoxylated glycerol trimethacrylates, pentaerythritol tetraacrylate, pentaerythritol tetramethacrylate, ethoxylated pentaerythritol tetraacrylate, propoxylated pentaerythritol tetramethacrylate, dipentaerythritol hexaacrylate and mixtures thereof.

Oligomer (F)

Radically curable oligomers as used herein refers to relatively high molecular weight polymeric compounds having a weight average molecular weight (MW) higher than about 800 g/mol. The weight average molecular weights described herein are determined by GPC (gel permeation chromatography).

The radically curable oligomers (F) are preferably (meth) acrylate oligomers which may be branched or essentially linear, and the (meth)acrylate functional group or groups, respectively, can be terminal groups and/or pendant side groups bonded to the oligomer backbone. The term "(meth) acrylate" in the context of the present invention refers to the acrylate as well as the corresponding methacrylate. Preferably, the radically curable oligomers are (meth)acrylic oligomers, urethane (meth)acrylate oligomers, polyester (meth)acrylate oligomers, polyether based (meth)acrylate oligomers, amine modified polyether based (meth)acrylate oligomers or epoxy (meth)acrylate oligomers, more preferably urethane (meth)acrylate oligomers and epoxy (meth) acrylate oligomers. The functionality of the oligomer is not limited but is preferably not greater than 3.

The oligomer (F) is preferably selected from (meth) acrylic oligomers, urethane (meth)acrylate oligomers, polyester (meth)acrylate oligomers, polyether based (meth)acrylate oligomers, amine modified polyether based (meth) acrylate oligomers or epoxy (meth)acrylate oligomers, more preferably urethane (meth)acrylate oligomers and epoxy (meth)acrylate oligomers, with the proviso that oligomer (F) is different from component B).

Suitable examples of urethane (meth)acrylate oligomers include aliphatic urethane (meth)acrylate oligomers, in particular diacrylates, triacrylates, tetraacrylates and hexaacrylates, such as those sold by Sartomer under the grade number starting with CN90, CN92, CN93, CN94, CN95, CN96, CN98, CN99 and those sold by Allnex under the designation Ebecryl® 225, 230, 242, 244, 245, 246, 264, 265, 266, 267, 271, 280/151B, 284, 286, 294/25HD, 1258, 1291, 4101, 4141, 4201, 4250, 4220, 4265, 4396, 4397, 4491, 4513, 4666, 4680, 4683, 4738, 4740, 4820, 4858, 4859, 5129, 81 10, 8209, 8254, 8296, 8307, 8402, 8465 and 8602; and aromatic (meth)acrylate oligomers, in particular diacrylates, triacrylates, tetraacrylates and hexaacrylates, such as those sold by Sartomer under the grade number starting with CN91 (except CN910A70) and grades starting with CN97 and those sold by Allnex under the designations Ebecryl® 204, 205,206, 210, 214, 215, 220, 2221, 4501, 6203, 8232 and 8310. The urethane (meth)acrylate oligomers may be based upon polyethers or polyesters, which are reacted with aromatic, aliphatic, or cycloaliphatic diisocyanates and capped with hydroxy acrylates. Particularly suitable aliphatic urethane (meth)acrylate oligomers are sold by Rahn under the designation Genomer® 4316 and particularly suitable aromatic urethane (meth)acrylate oligomers are sold by Allnex under the designation Ebercryl® 2003.

Suitable examples of epoxy (meth)acrylate oligomers include without limitation aliphatic epoxy (meth)acrylate oligomers, in particular monoacrylates, diacrylates and triacrylates, and aromatic epoxy (meth)acrylate oligomers, in particular bisphenol-A (meth)acrylate oligomers, such as those sold by Sartomer under the grade number starting with 104, 109.1XX as well as CN2003EU, UVE150/80 and UVE151 M; such as those sold by Allnex under the designation Ebecryl® 600, 604, 605, 609, 641, 646, 648, 812, 1606, 1608, 3105, 3300, 3203, 3416, 3420, 3608, 3639, 3700, 3701, 3702, 3703, 3708, 3730, 3740, 5848, 6040.

Surfactant (G)

The surfactant (G) may be a compound, containing perfluoroalkyl, perfluoroalkenyl and/or perfluoropolyether segment(s) in the molecule, said surfactant being capable to reduce the surface energy of the composition according to the present invention.

Examples of the surfactant (G) are a (per)fluoropolyether polymer described in WO2020/084054, such as, for example, a polymer of formula $$A\text{-}O—R_f—(CF_2)_x—CFZ—CH_2—O—R_a—C(=O)—C(R_bR_c)—X' \quad (1), \text{ wherein}$$

$R_f$ is a (per)fluoropolyoxyalkylene chain having an average number molecular weight M, ranging from 100 to 8,000, preferably from 300 to 6,000, more preferably from 800 to 3,000, and comprising, preferably consisting of, repeating units, which may be equal to or different from one another, selected from:

(i) —CFY'O—, wherein Y' is F or $CF_3$, (ii) —CFY'CFY'O—, wherein Y', equal or different at each occurrence, is as above defined, with the proviso that at least one of Y' is —F, (iii) $—CF_2CF_2CW_2O—$, wherein each of W, equal or different from each other, are F or H, (iv) $—CF_2CF_2CF_2CF_2O—$, (v) $—(CF_2)_j—CFZ'—O—$ wherein j is an integer from 0 to 3 and Z' is a group of general formula $—OR_f'T$, wherein $R_f'$ is a fluoropolyoxyalkene chain comprising a number of repeating units from 0 to 10, said recurring units being chosen among the followings: —CFY'O—, $—CF_2CFY''O—$, $—CF_2CF_2CF_2O—$, $—CF_2CF_2CF_2CF_2O—$, with each of each of Y'' being independently F or $CF_3$ and T being a $C_1$-$C_3$ perfluoroalkyl group;

Z is fluorine or $CF_3$;

x is 0 or 1, with the proviso that, when, x is 1, Z is F; $—R_a$ is a polyoxyalkylene chain free from fluorine atoms, said chain comprising from 4 to 50 fluorine-free oxyalkylene units, said units being the same or different from one another and being selected from $—CH_2CH_2O—$ and $—CH_2CH(J)O—$, wherein J is a straight or branched alkyl or aryl, preferably methyl, ethyl or phenyl $R_b$ and $R_c$ are independently a hydrogen, a methyl or a benzyl group, with the proviso that $R_b$ and $R_c$ cannot be both hydrogen;

X is a chlorine, a bromine or a iodine atom, preferably a bromine atom;

A is $—R_a—C(=O)—C(R_bR_c)—X'$, wherein $R_a$, $R_b$, $R_c$, and X are as defined above, or is a straight or branched $C_1$-$C_4$(per)fluoroalkyl group wherein one fluorine atom can be substituted by one chlorine atom or one hydrogen atom, such as, for example, a polymer of formula $R_f[CF_2CH_2O—(CH_2CH_2O)_{n'}—C(=O)—C(CH_3)_2—Br]_2$ (n'=0 to 6);

a surfactant of formula $R_{f1}—C_2H_4—SO_3Cat$ (2), wherein $R_{f1}$ represents a perfluorinated aliphatic group and Cat represents a cation, which have been disclosed in U.S. Pat. Nos. 5,789,508, 4,025,709, 5,688,884 and 4,380,618;

a partially fluorinated surfactant of the general formula $R''_f—(CH_2)_{m6}—R'_f—COOY^1$ (3), wherein $R''_f$ represents a perfluoroalkyl group or a perfluoroalkoxy group of 3 to 8 carbon atoms, $R'_f$ represents a perfluoroalkylene of 1 to 4 carbon atoms, $Y^1$ is $NH_4$, Li, Na, K or H, or a linear, branched or cyclic alkyl containing 1-8 carbon atoms, and m6 is 1-3, described in U.S. Pat. No. 5,763,552;

a fluorinated surfactant of the general formula $R'''_f—(CH_2)_{n6}COOM'$ (4), where $R'''_f$ represents a perfluoroalkyl group or a perfluoroalkoxy group of 3 to 18 carbon atoms, preferably 5 to 18 carbon atoms, n6 is from 0 to 2 and M' is a monovalent cation. In case n6 is 0, $R'''_f$ represents a perfluoroalkyl group of 3 to 18 carbon atoms, preferably 5 to 18 carbon atoms;

a fluorinated surfactant of general formula $R''''_f—(CH_2)_{n7}—(OCH_2CH_2)_{m7}—OH$ (5), where $R''''_f$ represents a perfluoroalkyl group or a perfluoroalkoxy group of 3 to 18 carbon atoms, preferably 8 to 18 carbon atoms, n7 is from 0 to 2, preferably 1, or 2 and m7 is from 0 to 5, preferably from 0 to 3; in case n7 is 0, $R''''_f$ represents a perfluoroalkyl group of 3 to 18 carbon atoms, preferably 5 to 18 carbon atoms;

perfluoropolyethers of formula $F—(CF_2)_{m8}—O—[CFX^3—CF_2—O]_{n8}—CFX^3—COOA^1$ (6), wherein m8 is 1 to 5, $X^3$ is F or $CF_3$, $A^1$ is a monovalent cation and n8 is 0 to 10, described in U.S. Pat. No. 3,271,341;

fluorinated polyethers of the formula $F—(CF_2)_{m8'}—O—[CFX—CF_2—O]_{n8'}—CFX—COOA^3$ (7), wherein m8' is 3 to 10, $X^3$ is F or a perfluoroalkyl group, n8' is 0, 1 or 2 and $A^3$ is the counter ion of the carboxylic anion, described in US2005/0090613;

fluorinated polyether surfactants of formula $R_{f2}—O—CF_2CF_2—X^4$ (8), wherein $R_{f2}$ represents a linear or branched perfluoroalkyl group having 1, 2, 3 or 4 carbon atoms and $X^4$ represents a carboxylic acid group or salt thereof, described in WO05/03075. Examples of carboxylic acid salts include sodium, potassium and ammonium ($NH_4$) salts. Perfluoro ether surfactants, in which $R_{f2}$ represents a perfluoroalkyl group selected from $CF_3$, $CF_3CF_2$, $CF_3CF_2CF_2$, $(CF_3)_2CF$ and $(CF_3)_3C$ are preferred;

a fluorinated polyether surfactant of formula $H(OCH_2CH_2)_k—OCH_2CF_2—(OCF_2)—(OCF_2CF_2)_{m9}—OCF_2CH_2—(OCH_2CH_2)_{n9}OH$ (9), wherein k is 0, 1 or 2, l is 2 to 150, especially 2 to 10, m9 is 1 to 100, especially 5 to 20, n9 is 0, 1 or 2, such as, for example, Fluorolink® E10H (Solvay) or Fluorolink® PEG45;

fluorinated polyether surfactants, containing pendant (meth)acrylic groups, such as, for example, perfluoropolyether urethane acrylate Fluorolink® AD1700 and perfluoropolyether urethane methacrylate Fluorolink® MD700;

fluorinated polyether surfactants of general formula $(OH)_2(O)P—[(OCH_2CH_2)_{p1}—OCH_2—R_{f3}—CH_2O—(CH_2CH_2O)_{p1}P(O)OH]_{q1}OH$ (10), wherein p1=1-2, q1=1-4 and $R_{f3}$ is $CH_2O—(CF_2)_{m10}—(CF_2—CF_2—O)_{n10}—CF_2$, wherein m10 is 1 to 100, especially 5 to 20, n10 is 0, 1 or 2, such as for example, Fluorolink® P54 (Solvay);

perfluoropolyether compounds derivatives of the formula $(OH)_{3-n11}—(R^{II}O)_{n11}Si—R^I—NH—C(O)—CF_2O—(CF_2CF_2O)_{p2}—(CF_2O)_{q2}—CF_2—C(O)—NH—R^I—Si(OR^{II})_{n1}(OH)_{3-n11}$ (11), wherein $R^I$ is alkylene from 1 to 10 carbon atoms, preferably from 1 to 5 carbon atoms, still more preferably from 2 to 4 carbon atoms; $R^{II}$ is a linear or branched alkyl group from 1 to 4 carbon atoms, preferably from 1 to 3 carbon atoms; n11 is an integer from 0 to 3, preferably 3; p2 and q2 are numbers such that the q2/p2 ratio is between 0.2 and 4; and p2 is different from zero;

perfluoropolyether compounds functionalized with silane groups of the formula $$(EtO)_3—Si—R^I—NH—C(O)—CF_2O—(CF_2CF_2O)_{p2}—(CF_2O)_{q2}—CF_2—C(O)—NH—R^I—Si(OEt)_3 \quad (12),$$

wherein $R^I$ is alkylene from 1 to 10 carbon atoms, preferably from 1 to 5 carbon atoms, still more preferably from 2 to 4 carbon atoms and p2 and q2 are numbers such that the q2/p2 ratio is between 0.2 and 4; and p2 is different from zero, such as, for example, Fluorolink® S10 (Solvay) with the formula $(EtO)_3—Si—CH_2CH_2CH_2—NH—C(O)—CF_2O—(CF_2CF_2O)_{p2}—(CF_2O)_{q2}—CF_2—C(O)—NH—CH_2CH_2CH_2—Si(OEt)_3$ (13), wherein p2=2-6 and q2=2-4.

Compounds of formulae (1) to (9) and fluorinated polyether surfactants, containing pendant (meth)acrylic groups are preferred. More preferred are compounds of formulae (1), (3), (4), (6), (8) and (9). Especially preferred are compounds of formulae (4) and (9).

The coatings, obtained with said compositions, show one color, when observed in transmission and another color, when observed in reflection on both sides of the cured coating. The metal-like reflection of coatings, obtained with the compositions of the present invention, may be further enhanced by the presence of the above described fluorosurfactants, especially the compounds of formulae (1), (3), (4), (6), (8) and (9), very especially the compounds of formulae (4) and (9).

Further surfactants, which may be used, include, non-fluorinated anionic surfactants, cationic surfactants, non-ionic surfactants, amphoteric or zwitterionic surfactants. Anionic surfactants include, for example, alkyl sulfates (eg., dodecylsulfate), alkylamide sulfates, fatty alcohol sulfates, secondary alkyl sulfates, paraffin sulfonates, alkyl ether sulfates, alkylpolyglycol ether sulfates, fatty alcohol ether sulfates, alkylbenzenesulfonates, alkylphenol ether sulfates, alkyl phosphates; alkyl or alkylaryl monoesters, diesters, and triesters of phosphoric acid; alkyl ether phosphates, alkoxylated fatty alcohol esters of phosphoric acid, alkylpolyglycol ether phosphates (for example, polyoxyethylene octadecenyl ether phosphates marketed as LUBRHOPHOS® LB-400 by Rhodia), phosphonic esters, sulfosuccinic diesters, sulfosuccinic monoesters, alkoxylated sulfosuccinic monoesters, sulfosuccinimides, a-olefinsulfonates, alkyl carboxylates, alkyl ether carboxylates, alkyl-polyglycol carboxylates, fatty acid isethionate, fatty acid methyltauride, fatty acid sarcoside, alkyl sulfonates (eg., 2-(methyloleoylamino)ethane-1-sulfonate, marketed as GEROPON® T77 by Solvay) alkyl ester sulfonates, arylsulfonates (eg., diphenyl oxide sulfonate, marketed as RHODACAL® DSB by Rhodia), naphthalenesulfonates, alkyl glyceryl ether sulfonates, polyacrylates, a-sulfo-fatty acid esters, and salts and mixtures thereof. Cationic surfactants include, for example, aliphatic, cycloaliphatic or aromatic primary, secondary and tertiary ammonium salts or alkanolammonium salts; quaternary ammonium salts, such as tetraoctylammonium halides and cetyltrimethylammonium halides (eg., cetyltrimethylammonium bromide (CTAB)); pyridinium salts, oxazolium salts, thiazolium salts, salts of amine oxides, sulfonium salts, quinolinium salts, isoquinolinium salts, tropylium salts.

Other cationic surfactants suitable for use according to the present disclosure include cationic ethoxylated fatty amines. Examples of cationic ethoxylated fatty amines include, but are not limited to, ethoxylated oleyl amine (marketed as RHODAMEEN® PN-430 by Solvay), hydrogenated tallow amine ethoxylate, and tallow amine ethoxylate.

Nonionic surfactants include, for example, alcohol alkoxylates (for example, ethoxylated propoxylated $C_8$-$C_{10}$ alcohols marketed as ANTAROX® BL-225 and ethoxylated propoxylated $C_{10}$-$C_{16}$ alcohols marketed as ANTAROX® RA-40 by Rhodia), fatty alcohol polyglycol ethers, fatty acid alkoxylates, fatty acid polyglycol esters, glyceride monoalkoxylates, alkanolamides, fatty acid alkylolamides, alkoxylated alkanol-amides, fatty acid alkylolamido alkoxylates, imidazolines, ethylene oxide-propylene oxide block copolymers (for example, EO/PO block copolymer marketed as ANTAROX® L-64 by Rhodia), block copolymers of ethylene and ethylene oxide, alkylphenol alkoxylates (for example, ethoxylated nonylphenol marketed as IGEPAL® CO-630 and ethoxylated dinonylphenol/nonylphenol marketed as IGEPAL® DM-530 by Rhodia), alkyl glucosides, alkoxylated sorbitan esters (for example, ethoxylated sobitan monooleate marketed as ALKAMULS® PSMO by Rhodia), alkyl thio alkoxylates (for example, alkyl thio ethoxylates marketed as ALCODET® by Rhodia), amine alkoxylates, and mixtures thereof.

Typically, nonionic surfactants include addition products of ethylene oxide, propylene oxide, styrene oxide, and/or butylene oxide onto compounds having an acidic hydrogen atom, such as, for example, fatty alcohols, alkylphenols or alcohols. Examples are addition products of ethylene oxide and/or propylene oxide onto linear or branched fatty alcohols having from 1 to 35 carbon atoms, onto fatty acids having from 6 to 30 carbon atoms and onto alkylphenols having from 4 to 35 carbon atoms in the alkyl group; ($C_6$—$C_{30}$)-fatty acid monoesters and diesters of addition products of ethylene oxide and/or propylene oxide onto glycerol; glycerol monoesters and diesters and sorbitan monoesters, diesters and triesters of saturated and unsaturated fatty acids having from 6 to 22 carbon atoms and their ethylene oxide and/or propylene oxide addition products, and the corresponding polyglycerol-based compounds; and alkyl monoglycosides and oligoglycosides having from 8 to 22 carbon atoms in the alkyl radical and their ethoxylated or propoxylated analogues.

Amphoteric or zwitterionic surfactants include, but are not limited to, aliphatic quaternary ammonium, phosphonium, and sulfonium compounds, wherein the aliphatic radicals can be straight chain or branched, and wherein the aliphatic substituents contain about 6 to about 30 carbon atoms and at least one aliphatic substituent contains an anionic functional group, such as carboxy, sulfonate, sulfate, phosphate, phosphonate, and salts and mixtures thereof. Examples of zwitterionic surfactants include, but are not limited to, alkyl betaines, alkyl amidopropyl betaines, alkyl sulphobetaines, alkyl glycinates, alkyl carboxyglycinates; alkyl amphopropionates, such as cocoamphopropionate and caprylamphodipropionate (marketed as MIRANOL® JBS by Rhodia); alkyl amidopropyl hydroxysultaines, acyl taurates, and acyl glutamates, wherein the alkyl and acyl groups have from 6 to 18 carbon atoms, and salts and mixtures thereof. The further surfactants may improve the adhesion of the coatings to adjacent layers in a stack.

A) Silver Nanoplatelets

In general, the silver nanoplatelets have a number mean diameter of from 15 to 1000 nm and a number mean thickness of from 2 nm to 40 nm.

The term "silver nanoplatelets" is a term used in the art and as such is understood by the skilled person. In the context of the present invention, silver nanoplatelets are preferably silver nanoplatelets having a number mean diameter of from 15 nm to 700 and a number mean thickness of from 2 nm to 40 nm, especially a number mean diameter of from 20 to 600 nm and a number mean thickness of from 2 nm to 40 nm and very especially a number mean diameter of from 20 nm to 300 nm and a number mean thickness of from 4 to 30 nm.

The diameter is the longer side of the nanoplatelet (width). The thickness is the shorter side of the nanoplatelet (height).

The aspect ratio of the silver nanoplatelets is the ratio of its longest dimension, such as, for example, its diameter to its shortest dimension, such as, for example, its thickness. For example, the aspect ratio of a disk is the ratio of its diameter to its thickness. The mean aspect ratio (defined as the ratio of mean diameter to mean thickness) being larger than 1.5, preferably larger than 1.6 and more preferably larger than 1.7.

The silver nanoplatelets may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

The number mean diameter and the number mean thickness are determined by transmission electron microscopy (TEM).

In the context of the present invention, a "surface modified silver nanoplatelet (nanoparticle)" is a silver nanoplatelet (nanoparticle) having attached to its surface one or more surface stabilizing agents and optionally one, or more stabilizing agents.

Accordingly, the present invention relates to surface modified silver nanoplatelets which bear one, or more surface stabilizing agents described above, or below and optionally one, or more stabilizing agents described above, or below on their surface.

The mean aspect ratio of the silver nanoplatelets is higher than 1.5.

In a preferred embodiment the present invention relates to compositions comprising silver nanoplatelets, the production of which is described in WO2020/083794.

The diameter of a silver nanoplatelet is the longest dimension of said silver nanoplatelet and corresponds to the maximum dimension of said silver nanoplatelet when oriented parallel to the plane of a transmission electron microscopy image (TEM). As used herein, the term "number mean diameter of the silver nanoplatelets" refers to the mean diameter determined by transmission electron microscopy (TEM) using Fiji image analysis software (or Image analysis software: ParticleSizer (Thorsten Wagner (2016) ij-particlesizer: ParticleSizer 1.0.9. Zenodo; 10.5281/zenodo.820296) and ImageJ version 1.53f51) based on the measurement of at least 300, especially at least 500 randomly selected silver nanoplatelets oriented parallel to the plane of a transmission electron microscopy image (TEM), wherein the diameter of a silver nanoplatelet is the maximum dimension (maximum Feret diameter) of said silver nanoplatelet oriented parallel to the plane of a transmission electron microscopy (TEM) image. TEM analysis was conducted on a dispersion containing silver nanoplatelets in isopropanol using an EM 910 instrument from ZEISS (INST.109) in bright field mode at an e-beam acceleration voltage of 100 kV.

The thickness of a silver nanoplatelet is the shortest dimension of said nanoplatelet and corresponds to the maximum thickness of said silver nanoplatelet. As used herein, the term "number mean thickness of silver nanoplatelets" refers to the mean thickness determined by transmission electron microscopy (TEM) based on the measurement of at least 50, especially of at least 300 randomly selected silver nanoplatelets oriented perpendicular to the plane of the TEM image, wherein the thickness of the silver nanoplatelet is the maximum thickness of said silver nanoplatelet. TEM analysis was conducted on a dispersion containing silver nanoplatelets in isopropanol using an EM 910 instrument from ZEISS (INST.109) in bright field mode at an e-beam acceleration voltage of 100 kV.

The thickness of at least 300 randomly selected silver nanoplatelets may be determined from the cross-sectional TEM images by fitting ellipses to the cross-sectioned particles by the software (ParticleSizer). The minor axis (the shortest diameter) of the fitted ellipse is taken as particle thickness.

The process described in WO2020/083794 can be used to for the production of i) compositions comprising silver nanoplatelets, wherein the number mean diameter of the silver nanoplatelets, present in the composition, is in the range of 50 to 150 nm and the number mean thickness of the silver nanoplatelets, present in the composition, is in the range of 5 to 30 nm (a coating, comprising the silver nanoplatelets, shows a turquoise, or blue color in transmission and a yellowish metallic color in reflection); or ii) compositions comprising silver nanoplatelets, wherein the number mean diameter of the silver nanoplatelets, present in the composition, is in the range of 15 to 35 nm and the number mean thickness of the silver nanoplatelets, present in the composition, is in the range of 5 to 20 nm (a coating, comprising the silver nanoplatelets, shows a brown, or orange color in transmission and a blueish metallic color in reflection).

In said embodiment compositions are preferred which comprise silver nanoplatelets, wherein the number mean diameter of the silver nanoplatelets, present in the composition, is in the range of 20 to 70 nm. The standard deviation being less than 50%. the number mean thickness of the silver nanoplatelets, present in the composition, is in the range of 5 to 30 nm. The standard deviation being less than 50%. A coating, comprising the silver nanoplatelets, shows a magenta color in transmission and a greenish metallic color in reflection.

The number mean diameter of the silver nanoplatelets is preferably in the range of 25 to 65 nm, more preferably 35 to 55 nm. The standard deviation being less than 50%, preferably less than 40%.

The number mean thickness of the silver nanoplatelets is preferably in the range 7 to 25 nm, more preferably 8 to 25 nm. The standard deviation being less than 50%, preferably less than 40%.

The mean aspect ratio (defined as the ratio of mean diameter to mean thickness) being larger than 1.5, preferably larger than 1.6 and more preferably larger than 1.7.

In a more preferred embodiment the mean diameter of the silver nanoplatelets is in the range of 35 to 55 nm with standard deviation being less than 40% and the mean thickness of the silver nanoplatelets is in the range of 8 to 25 nm with standard deviation being less than 40%. The mean aspect ratio of the silver nanoplatelets is higher than 1.7.

The highest wavelength absorption maximum of the population of all silver nanoplatelets in the composition being within the range of 450 to 550 nm, preferably 460 to 540 nm, most preferably 465 to 535 nm (measured in water at ca. 5*10-5 M (mol/l) concentration of silver).

The absorption maximum has a full width at half maximum (FWHM) value in the range of 20 to 180 nm, preferably 30 to 150 nm, more preferably 35 to 130 nm.

In a particularly preferred embodiment the mean diameter of the silver nanoplatelets is in the range of 40 to 50 nm. The standard deviation being less than 30%. The mean thickness of the silver nanoplatelets is in the range of 15 to 22 nm. The standard deviation being less than 30%. The mean aspect ratio of the silver nanoplatelets is higher than 1.7.

In said embodiment the highest wavelength absorption maximum of the population of all silver nanoplatelets in the composition being within the range of 480 to 500 nm (measured in water at ca. 5*10-5 M (mol/l) concentration of silver). The absorption maximum has a full width at half maximum (FWHM) value in the range of 70 to 95 nm.

The molar extinction coefficient of silver nanoplatelets, measured at the highest wavelength absorption maximum of the population of all silver nanoplatelets in the composition, is higher than 4000 L/(cm*$mol_{Ag}$), especially higher than 5000 L/(cm*$mol_{Ag}$), very especially higher than 6000 L/(cm*$mol_{Ag}$).

In a preferred embodiment of the present invention the silver nanoplatelets bear one, or more surface stabilizing agent of formula (I)

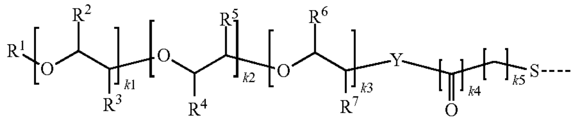

on their surface, wherein ........ indicates the bond to the silver, $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^8$;

$R^8$ is H, or $C_1$-$C_8$alkyl;

k1 is an integer in the range of from 1 to 500, k2 and k3 are independently of each other 0, or integers in the range of from 1 to 250;

k4 is 0, or 1, k5 is an integer in the range of from 1 to 5.

Y is preferably O. k4 is preferably 0.

The surface stabilizing agent of formula (I) has preferably a number average molecular weight of from 1000 to 20000, and more preferably from 1000 to 10000, most preferred from 1000 to 6000. All molecular weights specified in this text have the unit of [g/mol] and refer, unless indicated otherwise, to the number average molecular weight (Mn).

If the compounds comprise, for example, ethylene oxide units (EO) and propylene oxide units (PO), the order of (EO) and (PO) may not be fixed (random copolymers).

Preferably, $R^1$ is H, or $C_1$-$C_{18}$alkyl; $R^2$, $R^3$, $R^4$, $R^5$, $R^6$ and $R^7$ are independently of each other H, $CH_3$, or $C_2H_5$; k1 is 22 to 450, k2 and k3 are independently of each other 0, or integers in the range of from 1 to 250; k4 is 0, or 1; and k5 is an integer in the range of from 1 to 5.

More preferred, $R^1$ is H, or $C_1$-$C_4$alkyl; $R^2$, $R^3$, $R^4$, $R^5$, $R^6$ and $R^7$ are independently of each other H, or $CH_3$; k1 is 22 to 450; k2 and k3 are independently of each other 0, or integers in the range of from 8 to 200; k4 is 0; k5 is an integer in the range of from 1 to 4.

The most preferred surface stabilizing agent has the formula (Ia)

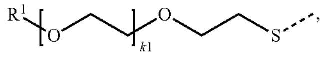

wherein $R^1$ is H, or a $C_1$-$C_8$alkyl group, and k1 is 22 to 450, especially 22 to 150.

$R^1$ is preferably H, or $CH_3$.

The most preferred surface stabilizing agents are derived from MPEG thiols (poly(ethylene glycol) methyl ether thiols) having an average M, of 2000 to 6000, such as, for example, MPEG 2000 thiol (A-1, average M, 2,000), MPEG 3000 thiol (A-2), MPEG 4000 thiol (A-3) MPEG 5000 thiol (A-4), MPEG 6000 thiol (A-5), PEG thiols (0-(2-mercaptoethyl)-poly(ethylene glycol)) having an average M, of 2000 to 6000, such as, for example, PEG 2000 thiol (A-6, average M, 2,000), PEG 3000 thiol (A-7), PEG 4000 thiol (A-8), PEG 5000 thiol (A-9), PEG 6000 thiol (A-10).

In addition to the surface stabilizing agents the composition may comprise further stabilization agents. Stabilizing agents may include, for example, phosphines; phosphine oxides; alkyl phosphonic acids; oligoamines, such as ethylenediamine, diethylene triamine, triethylene tetramine, spermidine, spermine; compounds of formula (IIa), (IIb) and (IIc) described below; dendrimers, and salts and combinations thereof.

The stabilizing agent may be a compound of formula $R^{20}$—X (IIa), wherein $R^{20}$ a linear or branched $C_1$-$C_{25}$alkyl group, or $C_1$-$C_{25}$alkenyl group, which may be substituted by one, or more groups selected from —OH, —SH, —$NH_2$, or —$COOR^{19}$, wherein $R^{19}$ is a hydrogen atom, or a $C_1$-$C_{25}$alkyl group, and X is —OH, —SH, —$NH_2$, or —$COOR^{19'}$, wherein $R^{19'}$ is a hydrogen atom, a $C_1$-$C_{25}$alkyl group, or a $C_2$-$C_{25}$alkenyl group, which may be substituted by one, or more groups selected from —OH, —SH, —$NH_2$, or —$COOR^{19''}$, wherein $R^{19''}$ is a hydrogen atom, or a $C_1$-$C_{25}$alkyl group.

Examples of compounds of formula (IIa) are 1-methylamine, 1-dodecylamine, 1-hexadecylamine, citric acid, oleic acid, D-cysteine, 1-dodecanethiol, 9-mercapto-1-nonanol, 1-thioglycerol, 11-amino-1-undecanethiol, cysteamine, 3-mercaptopropanoic acid, 8-mercaptooctanoic acid and 1,2-ethanedithiol.

The stabilizing agent may be a compound of formula (IIb)

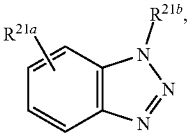

wherein $R^{21a}$ is a hydrogen atom, a halogen atom, a $C_1$-$C_8$alkoxy group, or a $C_1$-$C_8$alkyl group, $R^{21b}$ is a hydrogen atom, or a group of formula —$CHR^{24}$—$N(R^{22})(R^{23})$, $R^{22}$ and $R^{23}$ are independently of each other a $C_1$-$C_8$alkyl, a hydroxy$C_1$-$C_8$alkyl group, or a group of formula —$[(CH_2CH_2)$—$O]_{n1}$—$CH_2CH_2$—OH, wherein n1' is 1 to 5, $R^{24}$ is H or $C_1$-$C_8$alkyl.

Examples of compounds of formula (IIb) are (B-1)

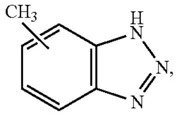

(B-2)

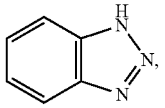

(B-3)

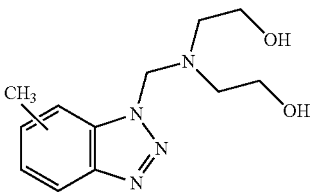

(B-4)

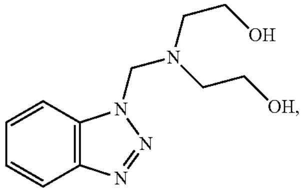

-continued (B-5)

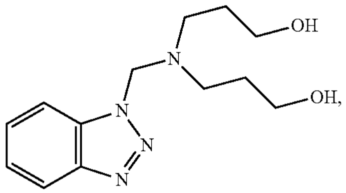

(B-6)

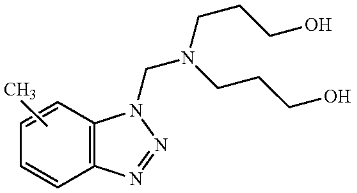

and (B-7)

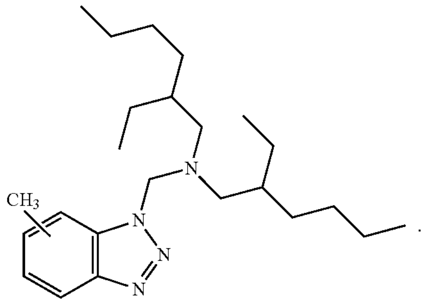

In another preferred embodiment the stabilizing agent is a "polyhydric phenol", which is a compound, containing an optionally substituted benzene ring and at least 2 hydroxy groups attached to it. The term "polyhydric phenol" comprises polyphenols, such as, for example, tannic acid and polycyclic aromatic hydrocarbons which consist of fused benzene rings, wherein at least one benzene ring has at least 2 hydroxy groups attached to it, such as, for example, 1,2-dihydroxynaphthalene. The "polyhydric phenol" may be substituted. Suitable substituents are described below.

The polyhydric phenol is preferably a compound of formula

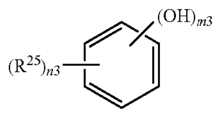

(IIc), wherein $R^{25}$ can be the same, or different in each occurrence and is a hydrogen atom, a halogen atom, a $C_1$-$C_{18}$alkyl group, a $C_1$-$C_{18}$alkoxy group, or a group —C(═O)—$R^{26}$, $R^{26}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group, and n3 is a number of 1 to 4, m3 is a number of 2 to 4, and the sum of m3 and n3 is 6.

The polyhydric phenol is more preferably a compound of formula (IIc')

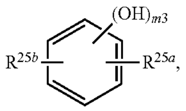

wherein $R^{25a}$ and $R^{25b}$ are independently of each other a hydrogen atom, a $C_1$-$C_{18}$alkyl group, a $C_1$-$C_{18}$alkoxy group, or a group of formula —C(═O)—$R^{26}$, $R^{26}$ is a hydrogen atom, a hydroxy group, a $C_1$-$C_{18}$alkyl group, an unsubstituted or substituted amino group, unsubstituted or substituted phenyl group, or a $C_1$-$C_{18}$alkoxy group, and m3 is a number of 2 to 4, especially 2 to 3. Polyhydric phenols are preferred, which have two hydroxy groups in ortho-position.

Even more preferably, the polyhydric phenol is a compound of formula (IIca)

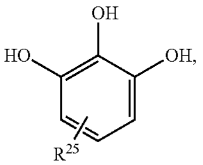

wherein $R^{25}$ is a hydrogen atom, or a group of formula —C(═O)—$R^{26}$, wherein $R^{26}$ is a hydrogen atom, a $C_1$-$C_{18}$alkyl group, or a $C_1$-$C_{18}$alkoxy group, an unsubstituted or substituted amino group, especially a $C_1$-$C_{18}$alkyl group or $C_1$-$C_8$alkoxy group.

Most preferred, the polyhydric phenol is a compound of formula

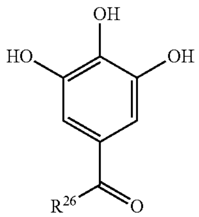

(IIca'), wherein $R^{26}$ is a hydrogen atom, a $C_1$-$C_{18}$alkyl group, or a $C_1$-$C_{18}$alkoxy group, especially a $C_1$-$C_8$alkoxy group, such as, for example, (methyl gallate, C-1)

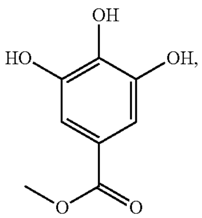

-continued (ethyl gallate, C-2)

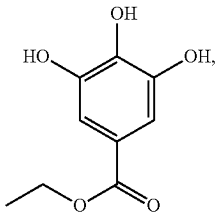

(propyl gallate, C-3)

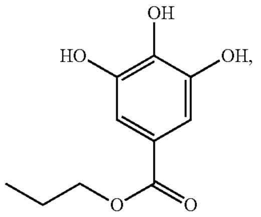

(isopropyl gallate, C-4)

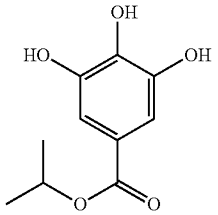

(butyl gallate, C-5)

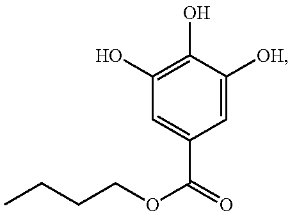

(octyl gallate, C-6)

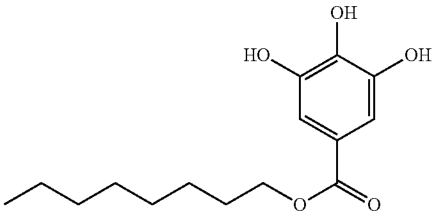

and (lauryl gallate, C-7)

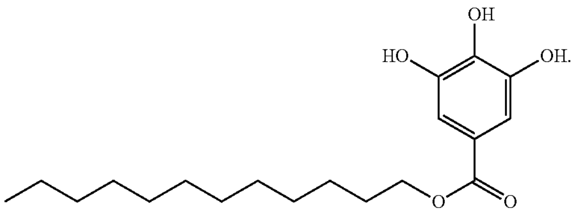

In another preferred embodiment of the present invention the polyhydric phenols are compounds of formula

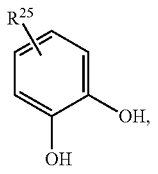

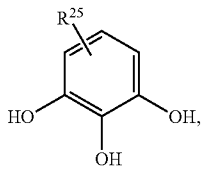

or

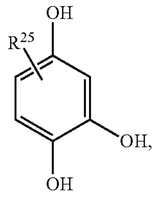

wherein $R^{25}$ is a hydrogen atom, a $C_1$-$C_{18}$alkyl group, or a group of formula —C(═O)—$R^{26}$, wherein $R^{26}$ is a hydrogen atom, a hydroxy group, a $C_1$-$C_{18}$alkyl group, or a $C_1$-$C_{18}$alkoxy group, an unsubstituted or substituted amino group, an unsubstituted or substituted phenyl group, especially a $C_1$-$C_{18}$alkyl group or $C_1$-$C_8$alkoxy group, such as, for example, (C-8)

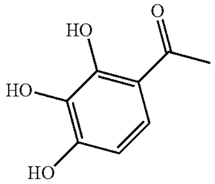

and (C-9)

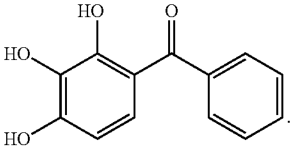

An unsubstituted or substituted amino group is, for example, a group of formula —$NR^{27}R^{28}$, wherein $R^{27}$ and $R^{28}$ are independently of each other a hydrogen atom, a $C_1$-$C_{18}$alkyl group, a phenyl group, preferably a hydrogen atom, or a $C_1$-$C_{18}$alkyl group.

In a particularly preferred embodiment the stabilizing agent is selected from compounds of formula (IIb), (IIc), or mixtures thereof.

The most preferred (surface) stabilizing agents (surface stabilizing agents and stabilizing agents), or mixtures thereof are described in WO2020/083794.

In another particularly preferred embodiment the mean diameter of the silver nanoplatelets is in the range of 40 to 50 nm. The standard deviation being less than 30%. The mean thickness of the silver nanoplatelets is in the range of 15 to 22 nm. The standard deviation being less than 30%. The mean aspect ratio of the silver nanoplatelets is higher than 1.7.

In said embodiment the highest wavelength absorption maximum of the population of all silver nanoplatelets in the composition being within the range of 480 to 500 nm (measured in water at ca. 5*10-5 M (mol/l) concentration of silver). The absorption maximum has a full width at half maximum (FWHM) value in the range of 70 to 95 nm.

In said embodiment the silver nanoplatelets preferably bear a surface stabilizing agent of formula (Ia)

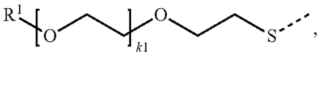

wherein $R^1$ is H, or a $C_1$-$C_8$alkyl group, especially H, or $CH_3$, and k1 is 22 to 450, especially 22 to 150; especially a compound (A-1), (A-2), (A-3), (A-4), (A-5), (A-6), (A-7), (A-8), (A-9), (A-10), or mixtures thereof, very especially a compound (A-4).

In said embodiment the silver nanoplatelets preferably bear a stabilizing agent of formula (IIb) and optionally a stabilizing agent of formula (IIc). The stabilizing agent of formula (IIb) is especially a compound (B-1), (B-2), (B-3), (B-4), (B-5), (B-6), or (B-7), very especially a compound (B-3). The stabilizing agent of formula (IIc) is especially a compound (C-1), (C-2), (C-3), (C-4), (C-5), (C-6), (C-7), (C-8), or (C-9), very especially a compound (C-2).

In another particularly preferred embodiment the mean diameter of the silver nanoplatelets is in the range of 37 to 47 nm. The standard deviation being less than 30% and the mean thickness of the silver nanoplatelets is in the range of 9 to 15 nm. The standard deviation being less than 30%. The mean aspect ratio of the silver nanoplatelets is higher than 1.7.

In said embodiment the highest wavelength absorption maximum of the population of all silver nanoplatelets in the composition being within the range of 510 to 530 nm (measured in water at ca. 5*10-5 M (mol/l) concentration of silver). The absorption maximum has a full width at half maximum (FWHM) value in the range of 70 to 90 nm.

In said embodiment the silver nanoplatelets preferably bear a surface stabilizing agent of formula (Ia)

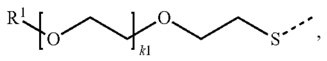

wherein $R^1$ is H, or a $C_1$-$C_8$alkyl group, especially H, or $CH_3$, and k1 is 22 to 450, especially 22 to 150; especially a compound (A-1), (A-2), (A-3), (A-4), (A-5), (A-6), (A-7), (A-8), (A-9), (A-10), or mixtures thereof.

In said embodiment the silver nanoplatelets preferably bear a stabilizing agent of formula (IIb) and optionally a stabilizing agent of formula (IIc). The stabilizing agent of formula (IIb) is especially a compound (B-1), (B-2), (B-3), (B-4), (B-5), (B-6), or (B-7), very especially a compound (B-3). The stabilizing agent of formula (IIc) is especially a compound (C-1), (C-2), (C-3), (C-4), (C-5), (C-6), (C-7), (C-8), or (C-9), very especially a compound (C-2).

In another preferred embodiment the composition comprises silver nanoplatelets, wherein the number mean diameter of the silver nanoplatelets, present in the composition, is in the range of 50 to 150 nm with standard deviation being less than 60% and the number mean thickness of the silver nanoplatelets, present in the composition, is in the range of 5 to 30 nm with standard deviation being less than 50%.

The mean aspect ratio of the silver nanoplatelets is higher than 2.0.

The highest wavelength absorption maximum of the population of all silver nanoplatelets in the composition being within the range of 560 to 800 nm.

A coating, comprising the silver nanoplatelets, shows a turquoise, or blue color in transmission and a yellowish metallic color in reflection.

The manufacture of the compositions is described in WO2020/224982.

The mean aspect ratio of the silver nanoplatelets is higher than 2.0.

The surface modified silver nanoplatelets bear a surface modifying agent of formula (V) and optionally further surface stabilizing agents described above, or below on their surface and optionally comprise one, or more stabilizing agents.

The number mean diameter of the silver nanoplatelets is in the range of 50 to 150 nm, preferably 60 to 140 nm, more preferably 70 to 120 nm. The standard deviation being less than 60%, preferably less than 50%.

The number mean thickness of the silver nanoplatelets is in the range of 5 to 30 nm, preferably 7 to 25 nm, more preferably 8 to 25 nm. The standard deviation being less than 50%, preferably less than 30%.

The mean aspect ratio (defined as the ratio of number mean diameter to number mean thickness) being larger than 2.0, preferably larger than 2.2 and more preferably larger than 2.5.

In a particularly preferred embodiment the number mean diameter of the silver nanoplatelets is in the range of 70 to 120 nm. The standard deviation being less than 50% The number mean thickness of the silver nanoplatelets is in the range of 8 to 25 nm. The standard deviation being less than 30%. The mean aspect ratio of the silver nanoplatelets is higher than 2.5.

The highest wavelength absorption maximum of the population of all silver nanoplatelets in the composition being within the range of 560 to 800 nm, preferably 580 to 800 nm, most preferably 600 to 800 nm (measured in water at ca. 5*10-5 M (mol/l) concentration of silver).

The absorption maximum has a full width at half maximum (FWHM) value in the range of 50 to 500 nm, preferably 70 to 450 nm, more preferably 80 to 450 nm.

The molar extinction coefficient of the silver nanoplatelets, measured at the highest wavelength absorption maximum of the population of all silver nanoplatelets in the composition, is higher than 4000 L/(cm*$mol_{Ag}$), especially higher than 5000 L/(cm*$mol_{Ag}$), very especially higher than 6000 L/(cm*$mol_{Ag}$).

In a preferred embodiment of the present invention the silver nanoplatelets bear a surface stabilizing agent of formula (I) described above on their surface.

A surface stabilizing agent of formula (Ia)

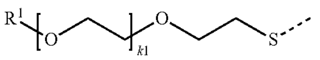

is more preferred, wherein $R^1$ is H, or a $C_1$-$C_8$alkyl group, and k1 is 22 to 450, especially 22 to 150. $R^1$ is preferably H, or $CH_3$.

The most preferred surface stabilizing agents are derived from MPEG thiols (poly(ethylene glycol) methyl ether thiols) having an average M, of 2000 to 6000, such as, for example, MPEG 2000 thiol (A-1, average M, 2,000), MPEG 3000 thiol (A-2), MPEG 4000 thiol (A-3) MPEG 5000 thiol (A-4), MPEG 6000 thiol (A-5), PEG thiols (0-(2-mercaptoethyl)-poly(ethylene glycol)) having an average M, of 2000 to 6000, such as, for example, PEG 2000 thiol (A-6, average M, 2,000), PEG 3000 thiol (A-7), PEG 4000 thiol (A-8), PEG 5000 thiol (A-9), PEG 6000 thiol (A-10).

In another preferred embodiment the silver nanoplatelets bear a surface stabilizing agent which is a polymer, or copolymer described in WO200674969, which can be obtained by a process comprising the steps i1) polymerizing in a first step one or more ethylenically unsaturated monomers in the presence of at least one nitroxylether having the structural element

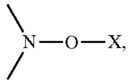

wherein X represents a group having at least one carbon atom and is such that the free radical X● derived from X is capable of initiating polymerization; or i2) polymerizing in a first step one or more ethylenically unsaturated monomers in the presence of at least one stable free nitroxyl radical

and a free radical initiator;

wherein at least one monomer used in the steps i1) or i2) is a $C_1$-$C_6$ alkyl or hydroxy $C_1$-$C_6$ alkyl ester of acrylic or methacrylic acid; and optionally i1) a second step, comprising the modification of the polymer or copolymer prepared under i1) or i2) by a transesterification reaction, an amidation, hydrolysis or anhydride modification or a combination thereof.

The monomer in step i1) or i2) is preferably selected from 4-vinyl-pyridine or pyridinium-ion, 2-vinyl-pyridine or pyridinium-ion, 1-vinyl-imidazole or imidazolinium-ion, or a compound of formula $CH_2{=}C(R_a)—(C{=}Z)—R_b$, wherein $R_a$ is hydrogen or methyl, $R_b$ is $NH_2$, $O^-(Me^+)$, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, unsubstituted di($C_1$-$C_{18}$alkyl)amino, hydroxy-substituted $C_1$-$C_1$alkylamino or hydroxy-substituted di($C_1$-$C_{18}$alkyl) amino, $—O—(CH_2)_yNR^{15}R^{16}$, or $—O—(CH_2)_yNHR^{15}R^{16+}$ $An^-$, $—N—(CH_2)_yNR^{15}R^{16}$, or $—N—(CH_2)_yNHR^{15}R^{16+}$ $An^-$, wherein $An^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, Me is a monovalent metal atom or the ammonium ion.

Z is oxygen or sulfur.

The second step ii) is preferably a transesterification reaction.

In step ii) the alcohol is preferably an ethoxylate of formula $R_A—[O—CH_2—CH_2—]_{n1}—OH$ (A), wherein $R_A$ is saturated or unsaturated, linear or branched chain alkyl with 1-22 carbon atoms, or alkylaryl or dialkylaryl with up to 24 carbon atoms and n1 is 1 to 150.

Preferably, step i1) or i2) is carried out twice and a block copolymer is obtained wherein in the first or second radical polymerization step the monomer or monomer mixture contains 50 to 100% by weight, based on total monomers, of a $C_1$-$C_6$ alkyl ester of acrylic or methacrylic acid and in the second or first radical polymerization step respectively, the ethylenically unsaturated monomer or monomer mixture contains at least a monomer without primary or secondary ester bond.

In the first polymerization step the monomer or monomer mixture contains from 50 to 100% by weight based on total monomers of a $C_1$-$C_6$ alkyl ester of acrylic or methacrylic acid (first monomer) and in the second polymerization step the ethylenically unsaturated monomer or monomer mixture comprises 4-vinyl-pyridine or pyridinium-ion, 2-vinyl-pyridine or pyridinium-ion, vinyl-imidazole or imidazolinium-ion, 3-dimethylaminoethylacrylamide, 3-dimethylaminoethylmethacrylamide, or corresponding ammonium ion, 3-dimethylaminopropylacrylamide, or corresponding ammonium ion, or 3-dimethylaminopropylmethacrylamide, or corresponding ammonium ion (second monomer).

The nitroxylether is preferably a compound of formula (O1)

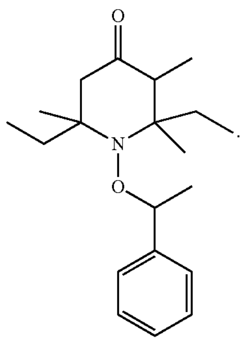

The surface stabilizing agent is preferably a copolymer which can be obtained by a process comprising the steps i1) polymerizing in a first step a first monomer, which is a $C_1$-$C_6$ alkyl or hydroxy $C_1$-$C_6$ alkyl ester of acrylic or methacrylic acid, and a second monomer which is selected from selected from 4-vinyl-pyridine or pyridinium-ion, 2-vinyl-pyridine or pyridinium-ion, 1-vinyl-imidazole or imidazolinium-ion, 3-dimethylamino-ethylacrylamide, 3-dimethylaminoethylmethacrylamide 3-dimethylaminopropylacrylamide, and 3-dimethylaminopropylmethacrylamide; in the presence of at least one nitroxylether having the structural element

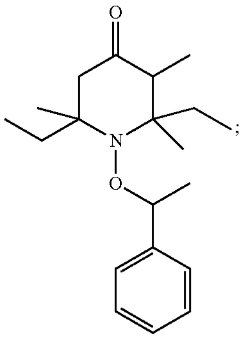 [SMILES: CCC1(C)CC(=O)C(C)C(C)(CC)N1OC(C)c1ccccc1]

;

and ii) a second step, comprising the modification of the polymer or copolymer prepared under i) or ii) by a transesterification reaction, wherein the alcohol in step ii) is an ethoxylate of formula $$R_A—[O—CH_2—CH_2—]_{n1}—OH \quad \text{(A), wherein}$$

$R_A$ is saturated or unsaturated, linear or branched chain alkyl with 1-22 carbon atoms, or alkylaryl or dialkylaryl with up to 24 carbon atoms and n1 is 1 to 150.

Copolymers represented by formula

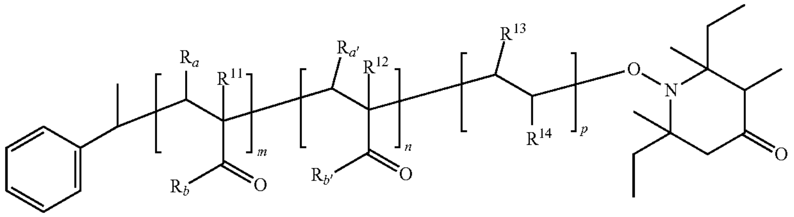

(III) are preferred, wherein $R^{11}$ and $R^{12}$ are H or methyl, $R^{13}$, $R_a$ and $R_{a'}$ are independently of each other H or methyl, $R_b$ is saturated or unsaturated, linear or branched chain alkyl with 1-22 carbon atoms, $R_{b'}$ is $R_A—[O—CH_2—CH_2—]_{n1}—O—$, $R^{14}$ is

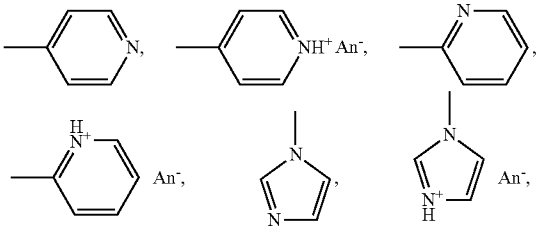

—C(═O)—N—$(CH_2)_y NR^{15}R^{16}$, or —C(═O)—N—$(CH_2)_y NHR^{15}R^{16+}An^-$, wherein $An^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, $R_A$ is saturated or unsaturated, linear or branched chain alkyl with 1-22 carbon atoms, or alkylaryl or dialkylaryl with up to 24 carbon atoms and n1 is 1 to 150, m, n and p are independently of each other integers from 1 to 200, and o is an integer from 1 to 150.

Copolymers represented by formula

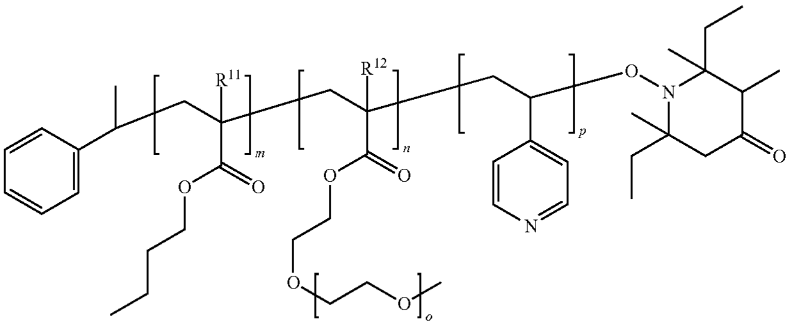

(III) are more preferred, where $R^{11}$ and $R^{12}$ are H or methyl, m, n and p are independently of each other integers from 1 to 200, o is an integer from 1 to 150, especially an integer from 1 to 149. The order of monomers with indices m and n may be fixed (block copolymers) or not fixed (random copolymers).

Examples of preferred copolymers are the copolymers described in Example A3 (D-1), Example A6 (D-2) of WO200674969.

In a particularly preferred embodiment the silver nanoplatelets comprise one, or more surface stabilizing agents of formula (I) and one, or more surface stabilizing agents of formula (III).

In addition to the surface stabilizing agents the composition may further comprise stabilizing agents. Stabilizing agents may include, for example, phosphines; phosphine oxides; alkyl phosphonic acids; oligoamines, such as ethylenediamine, diethylene triamine, triethylene tetramine, spermidine, spermine; compounds of formula (IIa), (IIb), (IIc) and (IId) described above; surfactants; dendrimers, and salts and combinations thereof.

The stabilizing agent may be a compound of formula $R^{20}$—X (IIa), wherein $R^{20}$ and X are defined above.

Examples of compounds of formula (IIa) are 1-methylamine, 1-dodecylamine, 1-hexadecylamine, citric acid, oleic acid, D-cysteine, 1-dodecanethiol, 9-mercapto-1-nonanol, 1-thioglycerol, 11-amino-1-undecanethiol, cysteamine, 3-mercaptopropanoic acid, 8-mercaptooctanoic acid and 1,2-ethanedithiol.

The stabilizing agent may be a compound of formula (IIb)

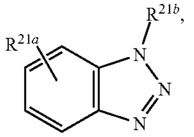

wherein $R^{21a}$ and $R^{21b}$ are defined above.

Examples of compounds of formula (IIb) are compounds (B-1), (B-2), (B-3), (B-4), (B-5), (B-6) and (B-7).

In another preferred embodiment the stabilizing agent is a "polyhydric phenol", which is defined above. The polyhydric phenol is preferably a compound of formula (IIc)

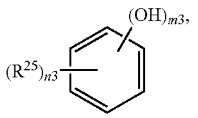

wherein $R^{25}$, n3 and m3 are defined above, more a compound of formula (IIc')

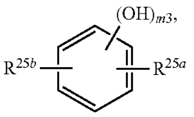

wherein m3, $R^{25a}$ and $R^{25b}$ are defined above.

Even more preferably, the polyhydric phenol is a compound of formula (IIca)

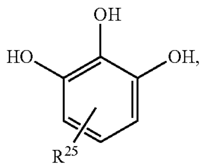

wherein $R^{25}$ is defined above.

Most preferred, the polyhydric phenol is a compound of formula (IIca')

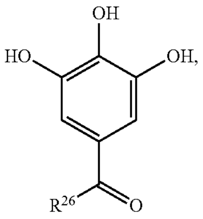

wherein $R^{26}$ is a hydrogen atom, a $C_1$-$C_{18}$alkyl group, or a $C_1$-$C_{18}$alkoxy group, especially a $C_1$-$C_8$alkoxy group, such as, for example, methyl gallate (C-1), ethyl gallate (C-2), propyl gallate (C-3), isopropyl gallate (C-4), butyl gallate (C-5), octyl gallate (C-6) and lauryl gallate (C-7).

In another preferred embodiment of the present invention the polyhydric phenols are compounds of formula

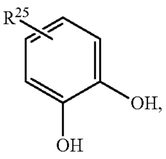

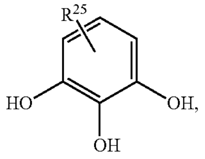

or

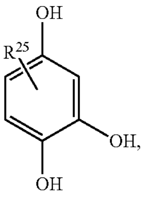

wherein $R^{25}$ is a hydrogen atom, a $C_1$-$C_{18}$alkyl group, or a group of formula —C(═O)—$R^{26}$, wherein $R^{26}$ is a hydrogen atom, a hydroxy group, a $C_1$-$C_{18}$alkyl group, or a $C_1$-$C_{18}$alkoxy group, an unsubstituted or substituted amino group, an unsubstituted or substituted phenyl group, especially a $C_1$-$C_{18}$alkyl group or $C_1$-$C_8$alkoxy group, such as, for example, a compound (C-8) and (C-9).

In a particularly preferred embodiment the stabilizing agent is selected from compounds of formula (IIb), (IIc), or mixtures thereof.

In a particularly preferred embodiment the silver nanoplatelets comprise one, or more surface stabilizing agents of formula (I) and one, or more surface stabilizing agents of formula (III). In addition, the silver nanoplatelet compositions may comprise one, or more stabilizing agents of formula (IIb).

A process for producing the composition according to the present invention, comprising the silver nanoplatelets, comprises the following steps:

(a) preparing a first solution comprising a silver precursor, at least one complexing agent, optionally a base, a compound of formula (I')

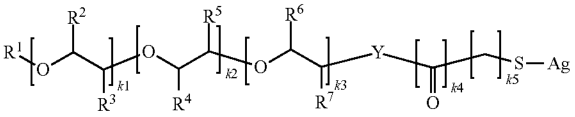

and water, (b) preparing a reducing agent mixture comprising at least two reducing agents, optionally a base and water, (c) combining the first solution with the reducing agent mixture so as to allow the silver precursor to react with the reducing agents, thereby synthesizing the composition, comprising the silver nanoplatelets.

$R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^8$;

$R^8$ is H, or $C_1$-$C_8$alkyl;

k1 is an integer in the range of from 1 to 500, k2 and k3 are independently of each other 0, or integers in the range of from 1 to 250;

k4 is 0, or 1, k5 is an integer in the range of from 1 to 5.

One compound, such as, for example, ammonia, an organoamine, methylglycine diacetic acid trisodium salt, or ethylenediaminetetraacetic acid tetrasodium salt, may simultaneously serve as complexing agent and base.

Preferably, the reaction of silver nanoplatelets formation is carried out at a total silver concentration of >1% w/w, especially >2% w/w, after combining the first solution with the reducing agent mixture solution.

Preferably, the reaction of silver nanoplatelets formation is carried out by gradually adding the silver precursor solution into reducing agent mixture solution, whereas the temperature of reducing agent mixture solution is in the range of 0-60° C. and the gradual addition is completed within 15 minutes to 10 h.

The silver precursor is preferably a silver(I) compound, selected from the group consisting of $AgNO_3$; $AgClO_4$; $Ag_2SO_4$; AgCl; AgF; AgOH; $Ag_2O$; $AgBF_4$; $AgIO_3$; $AgPF_6$; $R^{200}CO_2Ag$, $R^{200}SO_3Ag$, wherein $R^{200}$ is unsubstituted or substituted $C_1$-$C_{18}$alkyl, unsubstituted or substituted $C_5$-$C_8$cycloalkyl, unsubstituted or substituted $C_7$-$C_{18}$aralkyl, unsubstituted or substituted $C_6$-$C_{18}$aryl or unsubstituted or substituted $C_2$-$C_{18}$heteroaryl; Ag salts of dicarboxylic, tricarboxylic, polycarboxylic acids, polysulfonic acids, P-containing acids and mixtures thereof.

$AgNO_3$, $Ag_2O$, $AgClO_4$, $Ag_2SO_4$, AgF, $CH_3CO_2Ag$, mono-, di- or trisilver citrate, $CH_3SO_3Ag$, $CF_3SO_3Ag$ are more preferred, wherein $AgNO_3$ is most preferred.

Nonlimiting examples of complexing agents include ammonia, methylamine, dimethylamine, ethylamine, ethylenediamine, diethylenetriamine, ethylene-diamine-tetraacetic acid (EDTA); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, such as, for example, trisodium salt of methylglycinediacetic acid ($Na_3MGDA$) and tetrasodium salt of EDTA.

The reducing agent mixture comprises at least two reducing agents. One reducing agent is selected from the group consisting of alkali, or alkaline earth metal borohydrides, such as sodium borohydride, alkali, or alkaline earth metal acyloxyborohydrides, such as sodium triacetoxyborohydride, alkali, or alkaline earth metal alkoxy- or aryloxyborohydrides, such as sodium trimethoxyborohydride, aryloxyboranes, such as catecholborane, dialkylsulfide-borane complexes, such as dimethylsulfide borane, and amine-borane complexes, such as diethylaniline borane, tert-butylamine borane, morpholine borane, dimethylamine borane, triethylamine borane, pyridine borane, ammonia borane and mixtures thereof. The other reducing agent is selected from $NH_2NH_2$, mono- or dialkylhydrazines and mixtures thereof. In a particularly preferred embodiment the reducing agent mixture comprises morpholine borane complex and $NH_2NH_2$.

Preferably, the molar ratio of boron-containing reducing agent to hydrazine-type reducing agent is below 1 to 10, especially below 1 to 20.

Nonlimiting examples of base are alkali metal hydroxides, alkali earth metal hydroxides, alkali metal carboxylate salts, amines and combinations thereof. The most preferred base is $NH_3$.

Preferably, the process comprises the following steps.

(a) preparing a first solution comprising $AgNO_3$, diethylenetriamine and methylglycine diacetic acid trisodium salt, $NH_3$, a compound of formula (Ia)

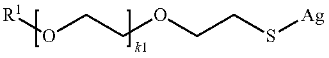

and water, (b) preparing a reducing agent mixture comprising $NH_3$, hydrazine monohydrate and borane-morpholine complex, (c) dosing the first solution into the reducing agent mixture to form the composition, comprising the silver nanoplatelets.

$R^1$ is H, or a $C_1$-$C_8$alkyl group and k1 is 22 to 450, especially 22 to 150.

The process is preferably carried out under inert atmosphere. Dosing the first solution into the reducing agent mixture solution within 15 minutes to 10 h.

The silver nanoplatelets can be isolated by known methods such as decantation, filtration, centrifugation, reversible or irreversible agglomeration, phase transfer with organic solvent and combinations thereof. The silver nanoplatelets may be obtained after isolation as a wet paste or dispersion in water. The silver nanoplatelets content in the final preparation of said particles may be up to about 99% by weight, based on the total weight of the preparation, preferably between 5 to 99% by weight, more preferably 10-95% by weight.

A preferred aspect of the present invention relates to a method which comprises further a step d), wherein the dispersion of the silver nanoplatelets is concentrated and/or water is replaced at least partially with an organic solvent. Examples of suitable organic solvents are ethanol, isopropanol, ethyl acetate, ethyl-3-ethoxypropionate and 1-methoxy-2-propanol, or mixtures thereof, optionally with water.

Optionally, further stabilizing agents may be added in step c) before water is removed.

Another process for producing the composition according to the present invention, comprising the silver nanoplatelets, comprises:

(a) preparing a first solution comprising a silver precursor, a compound of formula (I')

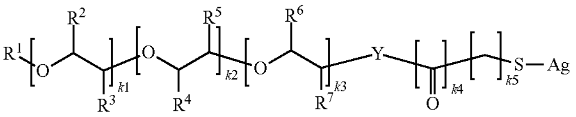

and water, (b) adding a hydrogen peroxide solution in water and shortly thereafter a solution, comprising a first reducing agent, which comprises at least one boron atom in the molecule, and water and allowing the obtained solution to stir until gas evolution is complete, and adding hydrazine or its solution in water, (c) adding a second solution comprising a silver precursor, a complexing agent, a base and water, thereby synthesizing the composition, comprising the silver nanoplatelets.

Preferably, the silver salt is selected from the group consisting of silver nitrate, silver acetate, silver perchlorate, silver fluoride, silver methanesulfonate, silver trifluoromethanesulfonate, silver sulfate, and mixtures thereof. Silver nitrate is most preferred.

The first reducing agent is selected from the group consisting of alkali, or alkaline earth metal borohydrides, such as sodium borohydride, alkali, or alkaline earth metal acyloxyborohydrides, such as sodium triacetoxyborohydride, alkali, or alkaline earth metal alkoxy- or aryloxyborohydrides, such as sodium trimethoxyborohydride, aryloxyboranes, such as catecholborane, dialkylsulfide-borane complexes, such as dimethylsulfide borane, and amine-borane complexes, such as diethylaniline borane, tert-butylamine borane, morpholine borane, dimethylamine borane, triethylamine borane, pyridine borane, ammonia borane and mixtures thereof.

Nonlimiting examples of base are alkali metal hydroxides, alkali earth metal hydroxides, alkali metal carboxylates, amines and combinations thereof. The at present most preferred base is $NH_3$.

One compound, such as, for example, ammonia, an organoamine, methylglycine diacetic acid trisodium salt, or ethylenediaminetetraacetic acid tetrasodium salt, may simultaneously serve as complexing agent and base.

Preferably, the reaction of silver nanoplatelets formation is carried out at a total silver concentration of >1% w/w after combining the first solution with the second solution.

Preferably, the reaction of silver nanoplatelets formation is carried out by gradually adding the silver precursor solution into reducing agent solution, whereas the temperature of reducing agent mixture solution is in the range of 0-60° C. and the gradual addition is completed within 15 minutes to 10 h time.

The composition of the present application is preferably solvent free.

In a preferred embodiment the solvent-free composition comprises

A) 2 to 30%, preferably, 3 to 25%, more preferably, 4 to 20% by weight of the silver nanoplatelets (A), B) 5 to 80%, preferably 10 to 70%, more preferably, 20 to 70% by weight of component (B), C) 10 to 70%, preferably 15 to 65%, more preferably 15 to 50% by weight of a urethane (meth)acrylate (C), D) 2 to 10%, preferably 3 to 8%, more preferably, 3 to 7% by weight of a radical photoinitiator (D), E) 0 to 60%, preferably 0 to 50%, more preferably 0 to 45% by weight of reactive diluent (E), F) 0 to 40%, preferably 0 to 30%, more preferably 0 to 25% by weight of oligomer (F), G) 0 to 5%, preferably 0 to 3% by weight of a surfactant (G), H) optionally a polymeric binder; and I) optionally 0 to 10% of further additives (I), wherein components A), B), C), D), E), F), G), H) and I) add up to 100% by weight.

In another preferred embodiment the present invention is directed to a UV-Vis radiation radically curable ink, comprising:

I) from about 1 to about 25 wt-% of silver nanoplatelets (A),

II) from about 75 to about 99 wt-% of an ink vehicle comprising (B) from about 20 to about 40 wt-% of one reactive diluent which is elected from diacrylates;

(C) from about 25 to about 55 wt-% of one, or more urethane (meth)acrylates (C), which are obtainable by reaction of the following components:

(a) at least one isocyanate having two isocyanate groups, (b) at least one polyalkylene oxide polyether having at least 2 hydroxyl groups, (c) at least one hydroxy-functional (meth)acrylate having one hydroxyl group and one (meth)acrylate group, (d) at least one compound having at least one isocyanate reactive group and at least one acid function, (e) at least one basic compound which is present for neutralization or partial neutralization of the acid groups of component (d), (f) optionally at least one monoalcohol having one hydroxy function;

(D) from about 0.1 to about 10 wt-% one, or more photoinitiators;

(E) from about 10 to about 50 wt-% of one, or more reactive diluents, which are different from component (B) and are selected from the group consisting of monoacrylates;

diacrylates;

triacrylates selected from the group consisting of trimethylolpropane triacrylates, trimethylolpropane trimethacrylates, alkoxylated trimethylolpropane triacrylates, alkoxylated trimethylolpropane trimethacrylates, alkoxylated glycerol triacrylates, pentaerythritol triacrylates, alkoxylated pentaerythritol triacrylates and mixtures thereof, preferably selected from the group consisting of trimethylolpropane triacrylates, alkoxylated trimethylolpropane triacrylates, alkoxylated glycerol triacrylates, pentraerythritol triacrylates and mixtures thereof—tetraacrylates selected from the group consisting of ditrimethylolpropane tetraacrylates, pentraerythritol tetraacrylates, alkoxylated pentaerythritol tetraacrylates and mixtures thereof, preferably selected from the group consisting of ditrimethylolpropane tetraacrylates, alkoxylated pentaerythritol tetraacrylates and mixtures thereof; and mixtures thereof;

the weight percent of (B), (C), (D) and (E) being based on the total weight of the ink vehicle; and the weight percent of I) and II) being based on the total weight of UV-Vis radiation radically curable ink.

The UV-Vis radiation radically curable ink may optionally comprise one, or more oligomers (F), which are different from component (C); one, or more surfactants (G); (I) one, or more polymeric binders; and (H) further additives.

In the above embodiments the reactive diluent (B) is preferably selected from dipropylene glycol diacrylate, tripropylene glycol diacrylate, dipropylene glycol dimethacrylate, tripropylene glycol dimethacrylate, diethylene glycol diacrylate, triethylene glycol diacrylate, diethylene glycol dimethacrylate, triethylene glycol dimethacrylate, butanediol diacrylate, butanediol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, cyclohexanediol diacrylate, cyclohexanediol dimethacrylate and cyclohexanedimethanol diacrylate, especially dipropylene glycol diacrylate.

The urethane (meth)acrylate (C) is preferably obtainable by reaction of the following components:

(a) at least one isocyanate having two isocyanate groups, (b) at least one polyalkylene oxide polyether having at least 2 hydroxyl groups, (c) at least one hydroxy-functional (meth)acrylate having one hydroxyl group and one (meth)acrylate group, (d) at least one compound having at least one isocyanate reactive group and at least one acid function, (e) at least one basic compound which is present for neutralization or partial neutralization of the acid groups of component (d), (f) optionally at least one monoalcohol having one hydroxy function.

The photoinitiator (D) is a compound of the formula (XII), a compound of the formula (XI), or the photoinitiator is a mixture of different compounds of the formula (XII), or the photoinitiator is a mixture of compounds of the formula (XII) and (XI).

The surfactant (G) is preferably a compound of formulae (1) to (9), more preferred a compound of formulae (1), (3), (4), (6), (8) and (9), most preferred a compound of formulae (4) and (9).

For the oligomer (F), the polymeric binder (I) and further additives (H) the preferences outlined above, below apply.

The composition of the present application is preferably a UV-Vis radically curable ink, especially a UV-Vis radically curable security ink.

H) Polymeric Binder

The printing (or coating) composition may comprise a polymeric binder.

The polymeric binder is a high-molecular-weight organic compound conventionally used in coating compositions. High molecular weight organic materials usually have molecular weights of about from 103 to 108 g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

With respect to the polymeric binder, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly (vinyl butyral) (PVB), poly(vinyl alcohol) (PVA), poly (vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN), also known as nitrocellulose], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

The polymeric binder preferably comprises nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester, rosin ester resins, shellac and mixtures thereof.

Most preferred, the polymeric binder is selected from the group consisting of nitro cellulose, vinyl chloride copolymers, vinyl acetate copolymers, vinyl, acrylic, urethane, polythyleneterephthalate, terpene phenol, polyolefin, cellulose, polyamide, polyester and rosin ester resins or mixtures thereof.

Preferably, polymeric binder is at least partially soluble in the composition.

I) Further Additives (I)

The printing (or coating) composition may comprise various additives (I). Examples thereof include thermal inhibitors, coinitiators and/or sensitizers, light stabilisers, optical brighteners, fillers and pigments, as well as white and coloured pigments, dyes, antistatics, wetting agents, flow auxiliaries, lubricants, waxes, anti-adhesive agents, dispersants, emulsifiers, anti-oxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

Examples of coinitiators/sensitisers are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes. Amines, for example, can also be regarded as photosensitisers when the photoinitiator consists of a benzophenone or benzophenone derivative.

Examples of light stabilizers are:

Phosphites and phosphonites (processing stabilizer), for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS No. 939402-02-5), Phosphorous acid, triphenyl ester, polymer with alpha-hydro-omega-hydroxypoly[oxy (methyl-1,2-ethanediyl)], C10-16 alkyl esters (CAS No. 1227937-46-3). The following phosphites are especially preferred:

Tris(2,4-di-tert-butylphenyl) phosphite, tris(nonylphenyl) phosphite,

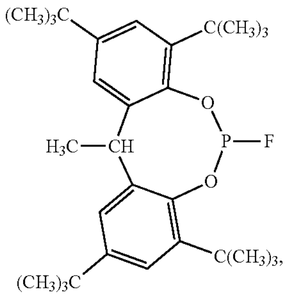

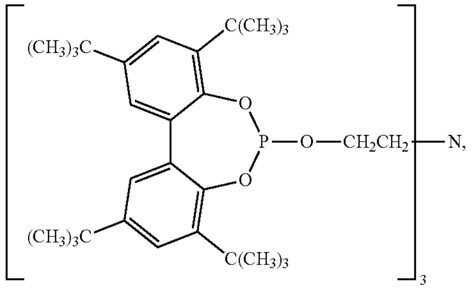

-continued

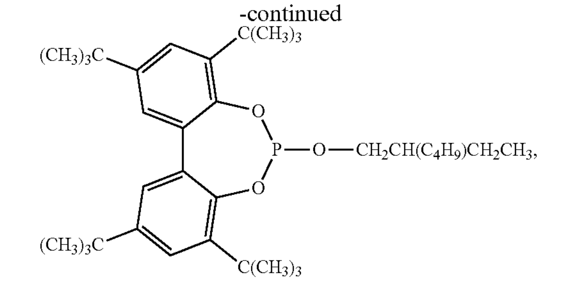

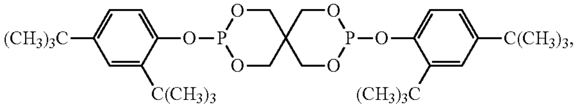

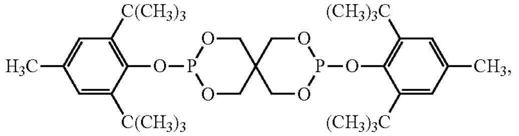

and

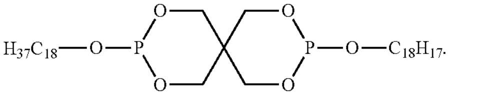

Quinone Methides of the Formula

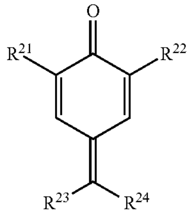

(providing long term shelf life stability), wherein $R^{21}$ and $R^{22}$ independently of each other are $C_1$-$C_{18}$alkyl, $C_5$-$C_{12}$cycloalkyl, $C_7$-$C_{15}$-phenylalkyl, optionally substituted $C_6$-$C_{10}$aryl;

$R^{23}$ and $R^{24}$ independently of each other are H, optionally substituted $C_6$-$C_{10}$-aryl, 2-,3-4-pyridyl, 2-,3-furyl or thienyl, COOH, $COOR^{25}$, $CONH_2$, $CONHR^{25}$, $CONR^{25}R^{26}$, —CN, —$COR^{25}$, —$OCOR^{25}$, —OPO$(OR^{25})_2$, wherein $R^{25}$ and $R^{26}$ are independently of each other $C_1$-$C_8$alkyl, or phenyl. Quinone methides are preferred, wherein $R^{21}$ and $R^{22}$ are tert-butyl;

$R^{23}$ is H, and $R^{24}$ is optionally substituted phenyl, COOH, $COOR^{25}$, $CONH_2$, $CONHR^{25}$, $CONR^{25}R^{26}$, —CN, —$COR^{25}$, —$OCOR^{25}$, —OPO$(OR^{25})_2$, wherein $R^{25}$ and $R^{26}$ are $C_1$-$C_8$alkyl, or phenyl. Examples of quinone methides are

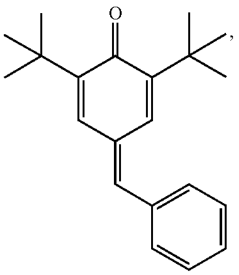

,

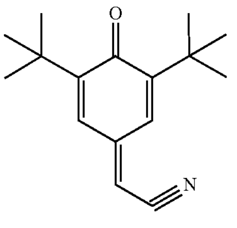

and

-continued

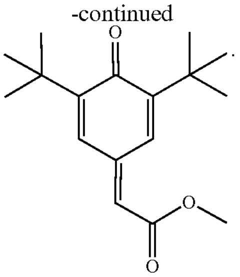

The quinone methides may be used in combination with highly sterically hindered nitroxyl radicals as described, for example, in US20110319535.

The quinone methides are used typically in a proportion of from about 0.01 to 0.3% by weight, preferably from about 0.04 to 0.15% by weight, based on the total weight of the UV curable composition.

Leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000, likewise obtainable from Tego. Such auxiliaries are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

Leveling agents are typically used in a proportion of from about 0.005 to 1.0% by weight, preferably from about 0.01 to 0.2% by weight, based on the total weight of the UV curable composition.

The coating, or printing ink compositions of the present invention may be used for the production of decorative, or security elements.

Accordingly, the present application relates to security, or decorative elements, comprising a substrate, which may contain indicia or other visible features in or on its surface, and and on at least part of the said substrate surface, a coating, comprising the composition according to the present invention.

The coating, comprising the composition according to the present invention, shows a color in transmission and a different color in reflection, such as, for example, a red, or magenta color in transmission and a greenish-metallic color in reflection, or a blue color in transmission and a gold color in reflection.

The coating, comprising the composition according to the present invention shows metallic reflection aspect on both sides of the coating, i.e. on the substrate side and on the top side.

Due to the simple buildup of the security element and the specific highest maximum absorption wavelength of the silver nanoplatelets a high protection against counterfeit is possible, making the element ideally suitable for banknotes, credit cards and the like.

As substrate the usual substrates can be used. The substrate may comprise paper, leather, fabric such as silk, cotton, tyvac, filmic material or metal, such as aluminium. The substrate may be in the form of one or more sheets or a web. The substrate may be mould made, woven, non-woven, cast, calendared, blown, extruded and/or biaxially extruded. The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, Propafilm® polypropylene, polyvinylchloride, rigid PVC, cellulose, triacetate, acetate polystyrene, polyethylene, nylon, acrylic and polyetherimide board. The polyethyleneterephthalate substrate may be Melinex type film (obtainable from DuPont Films Willimington Delaware, such as, for example, product ID Melinex HS-2), or oriented polypropylene.

The substrates being transparent films or non-transparent substrates like opaque plastic, paper including but not limited to banknote, voucher, passport, and any other security or fiduciary documents, self-adhesive stamp and excise seals, card, tobacco, pharmaceutical, computer software packaging and certificates of authentication, aluminium, and the like.

The substrates can be plain such as in metallic (e.g. Al foil) or plastic foils (e.g. PET foil), but paper is regarded also as a plain substrate in this sense.

Non-plain substrates or structured substrates comprise a structure, which was intentionally created, such as a hologram, or any other structure, created, for example, by embossing.

In a particularly preferred embodiment compositions, comprising silver nanoplatelets with different highest wavelength absorption maximums may be used to print dichromic, or trichromic patterns. The patterns may have a defined shape, such as, for example, a symbol, a stripe, a geometrical shape, a design, lettering, an alphanumeric character, the representation of an object or parts thereof. Reference is made to 2020/156858.

The coating (or layer), comprising the composition according to the present invention, which shows a color in transmission and a different color in reflection, can be used as functional semitransparent and/or metallic layer in known decorative, or security elements, which are, for example, described in WO2011/064162, WO2014/041121, WO2014/187750, WO15120975A1, WO16091381A1, WO16173696, WO2017114590, WO2017092865, WO2017080641, WO2017028950, WO2017008897, WO2016173695 WO17054922A1 and WO17008905A3.

Accordingly, the present invention relates to a security, or decorative element (the structure of which is described in more detail in WO2014/041121), comprising a) a substrate, b) a component with refractive index modulation, in particular a volume hologram, which is obtainable by exposing a recording material to actinic radiation and thereon c) a coating on at least a portion of the refractive index modulated layer, comprising the composition according to the present invention, which shows a color in transmission and a different color in reflection;

a security element, or decorative element (the structure of which is described in more detail in WO2014/187750), comprising a) a substrate b) a coating on at least a portion of the substrate comprising at least one liquid crystal compound, the coating being applied on the reverse side of the substrate if the substrate is transparent or translucent or on the surface side if the substrate is transparent, translucent, reflective or opaque and c) a further coating on at least a portion of the coating containing the liquid crystal compound or direct on the substrate if the coating containing the liquid crystal compound is placed on the reverse side of the substrate, the further coating is formed by the composition according to the present invention, which shows a color in transmission and a different color in reflection;

a security element, or decorative element (the structure of which is described in more detail in WO16173696) for security papers, value documents, or the like, which consists of a multilayer structure capable of interference, wherein the multilayer structure capable of interference has a reflection layer, a dielectric layer, and a partially transparent layer, wherein the dielectric layer is arranged between the reflection layer and the partially transparent layer, wherein the reflection layer is formed by a colored layer, comprising the composition according to the present invention, which shows a color in transmission and a different color in reflection;

a security element, or decorative element (the structure of which is described in more detail in WO2017092865) for protecting documents of value, comprising a transparent carrier substrate, a layer containing a diffractive optical element (DOE) and a semi-transparent functional layer, which is formed by the composition according to the present invention, which shows a color in transmission and a different color in reflection;

a molded plastic film article (the structure of which is described in more detail in WO2017114590) for a blister, in particular a blister for tablets, comprising a transparent carrier substrate that includes a semi-transparent functional layer, which is formed by the composition according to the present invention, which shows a color in transmission and a different color in reflection;

a packaging (the structure of which is described in more detail in WO17054922A1) comprising a plastic film shaped part and a cover film, wherein said plastic film shaped part defines the front side of the packaging and the cover film defines the rear side of the packaging, and the cover film is based on a carrier substrate provided with a semi-transparent functional layer, which is formed by the composition according to the present invention, which shows a color in transmission and a different color in reflection;

a security, or decorative element, comprising a substrate, an UV lacquer layer on at least part of the substrate having on at least part of its surface a nano- or microstructure, such as, for example an OVD, and on at least part of the UV lacquer layer and/or on at least part of the nano- or microstructure layer, a coating, which is formed by the composition according to the present invention;

a security, or decorative element, capable of interference in the visible range of spectrum, comprising a substrate, optionally, carrying on at least part of its surface a nano- or microstructure, and on at least part of the substrate and/or on at least part of the nano- or microstructure, a coating, which is obtained with the compositions according to the present invention, said coating showing an interference color; or a security or decorative element, comprising i) a reflective layer, which is obtained with the compositions according to the present invention, ii) a transparent or translucent spacer layer and iii) additionally a transparent or translucent layer having a refractive index differing from refractive index of said spacer layer by at least 0.1, preferably at least 0.2, most preferably at least 0.3; wherein the spacer layer ii) is located between the reflective layer i) and the layer iii) and the security, or decorative element showing an interference color.

Methods for producing the security, or decorative elements (or security features) comprise the steps of (a) printing, preferably by a printing process selected from the group consisting of rotogravure processes, flexography processes and screen printing processes the UV-Vis radiation radically curable security inks of the present invention on a substrate, and (b) curing the UV-Vis radiation radically curable security ink so as to form the security, or decorative elements (or one or more security features).

The application of layer (b) is preferably done by gravure, flexographic, ink jet, offset, or screen printing process.

A protective layer (c) may be applied on top of layer (b). The protective layer is preferably transparent or translucent. Examples for coatings are known to the skilled person. For example, water borne coatings, UV-cured coatings or laminated coatings may be used.

UV-cured coatings are preferably derived from UV curable compositions which are preferably deposited by means of gravure, offset flexographic, ink jet, offset and screen printing process.

The UV curable composition comprises (a) 1.0 to 20.0, especially 1.0 to 15.0, very especially 3.0 to 10.0% by weight of photoinitiator, (b) 99.0 to 80.0, especially 99.0 to 85.0, very especially 97.0 to 90.0% by weight of a binder (unsaturated compound(s) including one or more olefinic double bonds), wherein the amounts of components a) and b) adds up to 100%.

In a preferred embodiment the UV curable composition comprises (b1) an epoxy-acrylate (10 to 60%) and (b2) one or several (monofunctional and multifunctional) acrylates (20 to 90%) and (a) one, or several photoinitiators (1 to 15%). wherein the amounts of components a), b1) and b2) add up to 100%.

The epoxy-acrylate is selected from aromatic glycidyl ethers aliphatic glycidyl ethers. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl] methane isomers (CAS No. [66072-39-7]), phenol-based epoxy novolaks (CAS No. [9003-35-4]), and cresol-based epoxy novolaks (CAS No. [37382-79-9]). Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The one or several acrylates are preferably multifunctional monomers which are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacry-late, dipentaerythritol tetraacrylate, dipentaerythritol pentaacrylate, dipentaerythritol hexa-acrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA) and or mixtures thereof.

In another preferred embodiment the UV curable composition comprises:

Bisphenol A epoxyacrylate with 25% TPGDA 1-35% by weight

Dipropylene glycol diacrylate (DPGDA) 30-45% by weight

Ethoxylated trimethylol propane triacrylate (TMEOPTA) 10-50% by weight

Reactive tertiary amine 1-15% by weight

Photoinitiator: 5-10% by weight

The amounts of the components—the of UV curable composition add up to 100% by weight.

In another preferred embodiment the UV curable composition comprises:

Tripropylene glycol diacrylate (TPGDA) 1-25% by weight

Dipropylene glycol diacrylate (DPGDA) 30-45% by weight

Ethoxylated trimethylol propane triacrylate (TMEOPTA) 10-50% by weight

Reactive tertiary amine 1-15% by weight

Photoinitiator: 5-9% by weight

The amounts of the components—the of UV curable composition add up to 100% by weight.

The photoinitiator is preferably a blend of an alpha-hydroxy ketone, alpha-alkoxyketone or alpha-aminoketone compound of the formula (XI) and a benzophenone compound of the formula (X); or a blend of an alpha-hydroxy ketone, alpha-alkoxyketone or alpha-aminoketone compound of the formula (XI), a benzophenone compound of the formula (X) and an acylphosphine oxide compound of the formula (XII).

The UV curable composition may comprise various additives. Examples thereof include thermal inhibitors, coinitiators and/or sensitizers, light stabilisers, optical brighteners, fillers and pigments, as well as white and coloured pigments, dyes, antistatics, wetting agents, flow auxiliaries, lubricants, waxes, anti-adhesive agents, dispersants, emulsifiers, antioxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

Examples of coinitiators/sensitisers are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes. Amines, for example, can also be regarded as photosensitisers when the photoinitiator consists of a benzophenone or benzophenone derivative.

The security element of the invention can be affixed to a variety of objects through various attachment mechanisms, such as pressure sensitive adhesives or hot stamping processes, to provide for enhanced security measures such as anticounterfeiting. The security article can be utilized in the form of a label, a tag, a ribbon, a security thread, and the like, for application to a variety of objects such as security documents, monetary currency, credit cards, merchandise, etc.

Accordingly, the present invention is also directed to a product, comprising the security element according to the present invention, and to the use of the security element according to the present invention for the prevention of counterfeit or reproduction, on a document of value, right, identity, a security label or a branded good.

A method of detecting the authenticity of the security element according to the present invention may comprise the steps of:

a) measuring an absorbance, reflectance or transmittance spectrum of the security document in the VIS/NIR range of the electromagnetic spectrum; and b) comparing the spectrum measured under a) and/or information derived therefrom with a corresponding spectrum and/or information of an authentic security element.

The composition of the present invention can used in methods for forming an optically variable image (an optically variable device), which are, for example, described in EP2886343A1, EP2886343A1, EP2886356B1, WO11064162, WO2013/186167 and WO14118567A1.

Accordingly, the present invention relates to a method for forming an optically variable image (an optically variable device) on a substrate comprising the steps of: forming an optically variable image (OVI) on a discrete portion of the substrate; and depositing a coating, printing composition, comprising the composition according to the present invention on at least a portion of the OVI;

a method for forming a surface relief microstructure, especially an optically variable image (an optically variable device, OVD) on a substrate described in WO2013/186167 comprises the steps of:

A) applying a curable composition to at least a portion of the substrate wherein the curable composition comprises a1) at least one ethylenically unsaturated resin, a monomer or a mixture thereof;

a2) at least one photoinitiator; and a3) the composition according to the present invention;

B) contacting at least a portion of the curable composition with a surface relief microstructure, especially optically variable image forming means;

C) curing the composition by using at least one UV lamp.

In a preferred embodiment the method of producing the security element of the present invention comprises the steps of a) providing a substrate having a surface, which surface may contain indicia or other visible features, such as for example polyethylene terephthalate (PET) film, or a biaxially oriented polypropylene (BOPP) film;

b) applying on top of at least part of the said substrate surface a composition according to the present invention, comprising the silver nanoplatelets, and c) optionally applying a protective layer on top of layer (b).

In another preferred embodiment the method of producing the security element of the present invention comprises the steps of a) providing a substrate, optionally bearing a surface relief nano- or microstructure, b) applying a composition according to claims 1 to 9 to at least a portion of the substrate c) curing the composition with actinic radiation.

Said method may comprise the steps of:

a) providing a substrate, optionally bearing a surface relief nano- or microstructure, b1) applying a composition according to claims 1 to 9 to at least a portion of the substrate;

b2) embossing a nano- or microstructure into the coating obtained in step b1), and c) curing the composition with actinic radiation.

The thickness of the layer obtained in step b) is preferably in the range of 0.2 to 20 micrometer, preferably 0.25 to 15 micrometer, especially, 0.25 to 10 micrometer.

The thickness of a cured coating, obtained with the compositions of the present invention is preferably in the range of 0.2 to 20 micrometer, preferably, 0.2 to 15 micrometer, especially 0.2 to 10 micrometer.

The compositions, comprising silver nanoplatelets, which bear on their surface stabilizing agents and stabilizing agents may be used in the production of security elements, comprising prisms (US2014232100, WO18045429), lenses (US2014247499), and/or micromirrors (US2016170219).

The compositions, comprising silver nanoplatelets, which bear on their surface stabilizing agents and stabilizing agents may show surface enhanced Raman scattering (SERS).

Various aspects and features of the present invention will be further discussed in terms of the examples. The following examples are intended to illustrate various aspects and features of the present invention.

EXAMPLES

UV-Vis spectra of dispersions were recorded on Varian Cary 50 UV-Visible spectrophotometer at such concentration of dispersions as to achieve the optical density of 0.3 to 1.5 at 1 cm optical path.

TEM analysis was conducted on dispersions containing silver nanoplatelets in isopropanol using an EM 910 instrument from ZEISS, INST.109, in bright field mode at an e-beam acceleration voltage of 100 kV. At least 2 representative images with scale in different magnification (5,000×, 10,000× and 20,000×) were recorded in order to characterize the dominant particle morphology for each sample.

The "number mean diameter of the silver nanoplatelets" refers to the mean diameter determined by transmission electron microscopy (TEM) using Fiji image analysis software (or Image analysis software: ParticleSizer (Thorsten Wagner (2016) ij-particlesizer: ParticleSizer 1.0.9. Zenodo; 10.5281/zenodo.820296) and ImageJ version 1.53f51) based on the measurement of at least 300, especially at least 500 randomly selected silver nanoplatelets oriented parallel to the plane of a transmission electron microscopy image (TEM), wherein the diameter of a silver nanoplatelet is the maximum dimension of said silver nanoplatelet (maximal Feret diameter) oriented parallel to the plane of a transmission electron microscopy (TEM) image (recorded at magnification 20,000×).

The "number mean thickness of silver nanoplatelets" refers to the mean thickness determined by transmission electron microscopy (TEM) based on the measurement of at least 50, especially of at least 300 randomly selected silver nanoplatelets oriented perpendicular to the plane of the TEM image (recorded at magnification 25,000×), wherein the thickness of the silver nanoplatelet is the maximum thickness of said silver nanoplatelet. TEM analysis was conducted on dispersions containing silver nanoplatelets in isopropanol using an EM 910 instrument from ZEISS, INST.109, in bright field mode at an e-beam acceleration voltage of 100 kV.

In detail, a part of the dispersion is transferred to a smooth foil. After drying the sample is embedded in Araldit®, which is cross-linked below 60° C. Ultrathin cross-sections of the embedded sample are prepared perpendicular to the foil surface. The thickness of at least 300 randomly selected silver nanoplatelets may be determined from the cross-sectional TEM images (recorded at magnification 25,000×) by fitting ellipses to the cross-sectioned particles by the software (ParticleSizer). The minor axis (the shortest diameter) of the fitted ellipse is taken as particle thickness.

Synthesis Example 1—Preparation of S-Vinylmercaptoethanol (VME) Ethoxylate

VME-ethoxylate is synthesized essentially according to Example 1h, described in EP3063188B1, with the reactant ratios described in Table 1.

| | |
|---|---|
| S-vinylmercaptoethanol (VME) | 25 g |
| Potassium methylate | 0.25 g |
| Toluene | 75 g |
| Ethylene oxide | 1160 g |

The product had hydroxyl value of 25.5 mg KOH/g.

Synthesis Example 2—Hydrolysis of VME-Ethoxylate 844 g of VME-ethoxylate are dissolved in 770 g of de-ionized water and the temperature is brought to 50° C. 26.85 g of silver nitrate are dissolved in 50.7 g water and the resulting solution is added to the solution of VME-ethoxylate in one portion. The mixture is stirred at 50° C. for 5 min, followed by addition of 37.5 g of methanesulfonic acid. The resulting mixture is stirred for 8 h at 50° C. and then pH was brought to ca. 5 by dropwise addition of 47.5 g of 50% w/w solution of NaOH in de-ionized water. The resulting solution, containing silver complex of O-(2-mercaptoethyl)-poly (ethylene glycol), is stored at room temperature and used for the synthesis of silver nanoplatelets without further purification.

Synthesis Example 3—Urethane Acrylate (UA-1)

In a four-necked flask, equipped with reflux condenser, stirrer, dropping funnel and thermometer was provided, 550 g Pluriol® 1010 E (product of BASF SE, polyethylene oxide having molecular weight 1000 g/mol), 0.9 g dimethylolpropionic acid, 102.1 g 2-hydroxyethyl acrylate, 290.4 g dipropylene glycol diacrylate (Laromer® DPGDA, commercial product of BASF SE), 0.9 g 2.6-di-tert-butyl-p-cresol and 0.44 g methyl hydroquinone were mixed at 60° C. 0.6 dibutyltin dilaurate were added as catalyst. 201 154.5 g tolylene diisocyanate (mixture of 2.4 and 2.6 isomers) (Lupranat® T80, product of BASF SE) were added drop wise to this mixture at 60 to 70° C. within 60 minutes. Then the reaction mixture was stirred at ca. 65° C. (internal temperature) for 6 hours until the NCO value of the reaction mixture was 0.25%. Then 23.2 g dibutylamine were added and the reaction mixture was stirred at 65° C. for 2 h. The obtained polymer was then diluted with 174 dipropylene glycol diacrylate (Laromer® DPGDA, commercial product of BASF SE).

The content of the urethane acrylate in the reactive diluent was 65%. The double bond density of solvent-free urethane acrylate 1.03 moles/kg of urethane acrylate and the viscosity of the reaction mixture was 7.5 Pa s.

Example 1 (cf. Example 1 of WO2020/083794)

a) Synthesis of Silver Nanoplatelets

Preparation of Solution A: 925 g of the solution, obtained in Synthesis Example 2, are mixed with 250 g of de-ionized water. Separately, 720.5 g of silver nitrate are dissolved in 450 g of deionized water and both solutions are mixed at room temperature. 485.6 g of diethylenetriamine are added dropwise, while maintaining the temperature between 25 at 30° C. After the addition is complete, 211 g of 25% w/w ammonia solution in water and 114 g of methylglycine diacetic acid trisodium salt, 40% w/w solution in water, are added and the resulting solution is cooled to ca. +3° C.

Preparation of Solution B: 1170 g of de-ionized water are placed in a reactor and stirred at room temperature under vacuum (100 mbar) for 10 min. Vacuum is released with nitrogen gas, and the procedure is repeated another 2 times for removing the dissolved oxygen. Then 53 g of hydrazine monohydrate is added, followed by addition of 42.4 g of 25% w/w ammonia solution in water and the solution temperature is brought to 45° C. After that, 2 g of 1-octanol and 0.5 g of borane-morpholine complex are added and the mixture is stirred for 5 min at 45° C.

The whole amount of Solution A is dosed into Solution B with a constant rate over 75 min under the surface, while maintaining the temperature of Solution B at 45° C., resulting in a dispersion of silver nanoplatelets (total silver concentration 10.4% w/w).

b) Isolation and Purification

The dispersion is cooled to 25° C., then 24 g of cpd. (B-3) are added to the dispersion and the stirring is continued for 1 h. The stirrer is stopped and the dispersion is allowed to sediment for 24 h at room temperature. Then 2300 g of supernatant are pumped out with a peristaltic pump, 2200 g of de-ionized water are added and the mixture is stirred for 1 h at room temperature. After that, 230 g of anhydrous sodium sulfate are added in portions with stirring. Stirring is continued for 20 min after addition of last portion of sodium sulfate, the stirrer is stopped and the dispersion is allowed to sediment for 24 h at room temperature. Then 2900 g of supernatant are pumped out with a peristaltic pump, 1000 g of de-ionized water are added and the mixture is stirred for 1 h at RT.

The dispersion is subjected to ultrafiltration with an $Al_2O_3$ membrane (50 nm pore size) until the conductivity of the permeate dropped below 10 μS/cm.

Yield: 2360 g of silver nanoplatelets dispersion in water. Dry content of silver nanoplatelets in the resulting dispersion is 19.4% w/w, yield of silver nanoplatelets (based on total silver, introduced in reaction) is 90%.

Highest wavelength absorption maximum of the obtained silver nanoplatelets is located at 490 nm, when measured in water at ca. $5*10^{-5}$ M concentration of silver). FWHM of this maximum is 85 nm.

Mean diameter of the particles is 45±10 nm. Mean thickness of the particles is 18±2.4 nm (standard deviation is indicated after ±sign).

c) Solvent Switch 100 g of dispersion of silver nanoplatelets in water, obtained in step b) were placed in a round-bottom flask and the solution of 0.7 g of ethyl gallate in 200 g of 1-methoxy-2-propanol is added. The mixture is concentrated on rotary evaporator to ca 40% w/w of dry content, then 100 g of 1-methoxy-2-propanol are added and the mixture is concentrated again to ca. 40% w/w of dry content. 100 g of 1-methoxy-2-propanol are added and the mixture is concentrated to ca. 45% w/w of dry content and filtered through Whatman Grande GF/B=1u filter. The dry content in filtrate is adjusted to 40% w/w by addition of 1-methoxy-2-propanol.

Example 2 (Cf. Example 1 of WO2020/224982)

a) In a 1 L double-wall glass reactor, equipped with anchor-stirrer, 365 g of de-ionized water was cooled to +2° C. 13.62 g of sodium borohydride was added, and the mixture was cooled to −1° C. with stirring at 250 rounds per minute (RPM, Solution A).

In a 0.5 L double-wall glass reactor, equipped with anchor-stirrer, 132 g of deionized water and 4.8 g of MPEG-5000-thiol were combined, and the mixture was stirred for 10 minutes at room temperature. 72 g of the product of Example A3 of WO2006074969 was added, and the resulting mixture was stirred for another 10 minutes at room temperature for homogenization. The solution of 30.6 g of silver nitrate in 30 g of de-ionized water was added in one portion and the mixture was stirred for 10 minutes, resulting in an orange-brown viscous solution. To this solution 96 g of deionized water was added, followed by addition of 3 g of Struktol SB2080 defoamer, pre-dispersed in 36 g of de-ionized water. The resulting mixture was cooled to 0° C. with stirring at 250 RPM (Solution B).

After that, Solution B was dosed with a peristaltic pump at a constant rate over 2 h into Solution A under the liquid surface via a cooled (0° C.) dosing tube, resulting in spherical silver nanoplatelets dispersion. During pumping, the Solution A was stirred at 250 RPM.

After dosing was complete, the reaction mixture was warmed up to +5° C. within 15 minutes, and a solution of 862 mg of KCl in 10 g of deionized water was added in one portion, followed by addition of 9.6 g of ethylenediaminetetraacetic acid (EDTA) in 4 equal portions with 10 minutes time intervals.

After addition of the last EDTA portion, the reaction mixture was stirred for 15 minutes at +5° C., then warmed up to 35° C. over 30 minutes and stirred for 1 h at this temperature. Upon this time, hydrogen evolution is completed.

3.0 mL of 30% w/w solution of ammonia in water was added, followed by addition of 5.76 g of solid NaOH, and the mixture was stirred for 15 min at 35° C. Then 180 mL of 50% w/w hydrogen peroxide solution in water were dosed with a peristaltic pump at a constant rate over 4 h into the reaction mixture under the liquid surface with stirring at 250 RPM, while maintaining the temperature at 35° C. This has led to a deep blue colored dispersion of silver nanoplatelets, which was cooled to room temperature. 1.23 g of compound of formula (B-3) was added, and the mixture was stirred for 1 h at room temperature.

b) Isolation and Purification of Ag Nanoplatelets b1) Decantation 9.6 g of sodium dodecylsulfate was added to the reaction mixture and then ca. 25 g of anhydrous sodium sulfate powder was added in portions with stirring until the transmission color of the dispersion changed from blue to pink. Then the mixture was kept without stirring at room temperature for 24 h, allowing the coagulated nanoplatelets to sediment at the bottom of the reactor.

890 g of supernatant was pumped out from the reactor with a peristaltic pump, and 890 g of deionized water was added to the reactor. The mixture in reactor was stirred for 1 h at room temperature, allowing the coagulated particles to re-disperse.

b2) Decantation

Ca. 64 g of anhydrous sodium sulfate powder was added in portions with stirring until the transmission color of the dispersion changed from blue to yellowish-pink. Then the mixture was kept without stirring at room temperature for 12 h, allowing the coagulated nanoplatelets to sediment at the bottom of the reactor. 990 g of supernatant was pumped out from the reactor with a peristaltic pump, and 90 g of deionized water was added to the reactor. The resulting mixture was stirred for 30 minutes at room temperature, allowing the coagulated particles to re-disperse.

b3) Ultrafiltration in Water

The resulting dispersion of Ag nanoplatelets was subjected to ultrafiltration using a Millipore Amicon 8400 stirred ultrafiltration cell. The dispersion was diluted to 400 g weight with de-ionized water and ultrafiltered to the end volume of ca. 50 mL using a polyethersulfone (PES) membrane with 300 kDa cut-off value. The procedure was repeated in total 4 times to provide 60 g of Ag nanoplatelets dispersion in water. After ultrafiltration was completed, 0.17 g of compound (B-3) was added to the dispersion. Ag content 28.9% w/w; yield ca. 89% based on total silver amount; Solids content (at 250° C.) 33.5% w/w; Purity 86% w/w of silver based on solids content at 250° C.

b4) Ultrafiltration in Isopropanol

The dispersion was further ultrafiltered in isopropanol. 60 g of Ag nanoplatelets dispersion, obtained after ultrafiltration in water, was placed in a Millipore Amicon 8400 stirred ultrafiltration cell and diluted to 300 g weight with isopropanol. The dispersion was ultrafiltered to the volume of ca. 50 mL using a polyethersulfone (PES) membrane with 500 kDa cut-off value. The procedure was repeated in total 4 times to provide 72 g of Ag nanoplatelets dispersion in isopropanol.

Ag content 24.1% w/w; Solids content (at 250° C.) 25.7% w/w; Purity 93.5% w/w of silver based on solids content at 250° C.

The UV-Vis-NIR spectrum was recorded in water at Ag concentration of $9.8*10^{-5}$ M.

$\lambda_{max}$=700 nm; extinction coefficient at maximum ε=10200 L/(cm*mol Ag), FWHM=340 nm.

Reference is made to FIG. 1. UV-Vis-NIR spectrum of Ag nanoplatelets from Example 1 b4). Number mean particle diameter 93±40 nm, number mean particle thickness 16±2.5 nm.

Example 3—Replacement of Solvent with Dipropylene Glycol Diacrylate (DPGDA)

100 g of the dispersion, prepared according to Step c) of Example 1, was placed in a 0.5 L round-bottom flask and 50 g of DPGDA was added. 1-methoxy-2-propanol was removed on rotary evaporator at 10 mbar pressure and 50° C. bath temperature, until no more solvent was distilled off. The solids content was adjusted to 42% by addition DPGDA to obtain the dispersion of silver nanoplatelets in DPGDA.

The dispersion of silver nanoplatelets in DPGDA was mixed with additional radically curable components and photoinitiator and homogenized thoroughly to obtain coating compositions 1 to 4. Reference is made to Table 1.

TABLE 1

| Coating Comp. | Ag NPs of Example 3 [% by weight] | Component (B) DPGDA[2)] [% by weight] | Component (E) [% by weight] | Oligomer (C) [% by weight] UA-1[3)] | Photoinitiator (D) Omnirad ® 819[1)] [% by weight] |
|---|---|---|---|---|---|
| 1 | 8.7 | 52.7 | — | 33.9 | 4.7 |
| 2 | 8.7 | 30.2 | 22.5 TPGDA[4)] | 33.9 | 4.7 |
| 3 | 8.7 | 30.2 | 22.5 HDDA[5)] | 33.9 | 4.7 |
| 4 | 8.7 | 30.2 | 22.5 Divinyl ad.[6)] | 33.9 | 4.7 |

[1)]Omnirad ® 819 = phenyl-bis(2,4,6-trimethylbenzoyl)phosphine oxide
[2)]DPGDA = dipropylene glycol diacrylate
[3)]UA-1 = Urethane Acrylate obtained in Synthesis Example 3, excluding DPGDA
[4)]TPGDA = tripropylene glycol diacrylate
[5)]Laromer ® HDDA = 1,6-hexandiol diacrylate
[6)]Divinyl adipate = $CH_2{=}CH{-}O{-}C({=}O){-}(CH_2)_4C(C{=}O){-}O{-}CH{=}CH_2$

Example 4—General Procedure for Preparation of Printing Compositions 5 to 11

The radically curable monomers and photoinitiator were mixed with the dispersion, obtained in Example 2, step b4) in such proportions, as to obtain the compositions shown in Table 2 after solvent removal. The resulting mixture was concentrated on rotary evaporator at 20 mbar pressure and 50° C. bath temperature, till no more solvent was distilled off to obtain the printing compositions 5 to 11. Reference is made to Table 2.

TABLE 2

| Printing Comp. | Ag NPs of Example 3 [% by weight] | Component (B) DPGDA[2)] [% by weight] | Component (E) [% by weight] | Oligomer (C) [% by weight] UA-1[3)] | Photoinitiator (D) Omnirad ® 819[1)] [% by weight] | Surfactant (G) [% by weight] |
|---|---|---|---|---|---|---|
| 5 | 7.8 | 56.3 | — | 30.9 | 5.0 | — |
| 6 | 7.8 | 16.6 | 39.5 TPGDA[4)] | 30.8 | 5.3 | — |
| 7 | 7.8 | 16.6 | 39.5 Laromer ® HDDA[5)] | 30.8 | 5.3 | — |
| 8 | 7.8 | 16.6 | 39.5 Divinyl adipate[6)] | 30.8 | 5.3 | — |
| 9 | 13.6 | 55.3 | — | 27.0 | 4.1 | — |
| 10 | 7.8 | 55.8 | — | 30.4 | 5.0 | 1.0[7)] |
| 11 | 7.8 | 56.2 | — | 30.7 | 5.0 | 0.3[8)] |

[1)]Omnirad ® 819 = phenyl-bis(2,4,6-trimethylbenzoyl)phosphine oxide
[2)]DPGDA = dipropylene glycol diacrylate
[3)]UA-1 = Urethane Acrylate obtained in Synthesis Example 3, excluding DPGDA
[4)]TPGDA = tripropylene glycol diacrylate
[5)]Laromer ® HDDA = 1,6-hexandiol diacrylate
[6)]Divinyl adipate = $CH_2{=}CH{-}O{-}C({=}O){-}(CH_2)_4C(C{=}O){-}O{-}CH{=}CH_2$
[7)]Fluorolink ® E10H
[8)]Perfluorononanoic acid The term "Ag nanoplatelets" in Application Examples 1 to 4 refers to total solids content (excluding DPGDA) of the dispersion, obtained in Example 3. The solids includes (surface) stabilizing agents, present in the dispersion and on the surface of Ag nanoplatelets.

The term "Ag nanoplatelets" in Application Examples 5 to 11 refers to total solids content of the dispersion, obtained in Example 2, Step b4). The solids include (surface) stabilizing agents, present in the dispersion and on the surface of Ag nanoplatelets.

Application Examples 1 to 4

Substrate preparation: Melinex 506 PET foil substrate was coated with a UV-curable varnish Lumogen OVD 311 (commercially available from BASF SE), using K bar wired handcoater #1 and the obtained coating was cured with a medium pressure Hg lamp (total UV dose ca. 500 mJ/cm$^2$).

The coating compositions from Table 1 were coated onto thus prepared substrate using K bar wired handcoater #1 and cured with a medium pressure Hg lamp (total UV dose ca. 500 mJ/cm$^2$). The properties of the obtained coatings are shown in Table 3.

TABLE 3

| | Application Example | | | |
|---|---|---|---|---|
| | 1 | 2 | 3 | 4 |
| | Coating Composition | | | |
| Property | 1 | 2 | 3 | 4 |
| Color of coating (frontside of substrate) | green-gold | green-metallic | green-gold | green-gold |
| Color of coating (backside of substrate) | green-gold | green-gold | green-gold | green-gold |
| Reflection Intensity (frontside of substrate) | 4 | 3 | 4 | 4 |
| Reflection Intensity (backside of substrate) | 4 | 4 | 4 | 4 |
| Transmission Color | magenta | magenta | magenta | magenta |
| Quality of Transmission Color | 3 | 3 | 3 | 3 |
| Adhesion | 3 | 1 | 1 | 3 |

Application Examples 5 to 11

Substrate preparation: Melinex 506 PET foil substrate was coated with a UV-curable varnish Lumogen OVD 311 (commercially available from BASF SE), using K bar wired handcoater #1 and the obtained coating was cured with a medium pressure Hg lamp (total UV dose ca. 500 mJ/cm$^2$).

The coating compositions from Table 2 were coated onto thus prepared substrate using K bar wired handcoater #1 and cured with a medium pressure Hg lamp (total UV dose ca. 500 mJ/cm$^2$). The properties of obtained coatings are shown in Table 4.

TABLE 4

| | Application Example | | | | | | |
|---|---|---|---|---|---|---|---|
| | 5 | 6 | 7 | 8 | 9 | 10 | 11 |
| | Coating Composition | | | | | | |
| Property | 5 | 6 | 7 | 8 | 9 | 10 | 11 |
| Color of coating (frontside of substrate) | gold | gold | gold | gold | gold | gold | gold |
| Color of coating (backside of substrate) | gold | gold | gold | gold | gold | gold | gold |
| Reflection Intensity (frontside of substrate) | 3 | 3 | 3 | 3 | 4 | 4 | 4 |
| Reflection Intensity (backside of substrate) | 3 | 3 | 3 | 3 | 4 | 4 | 4 |
| Transmission Color | blue | blue | blue | blue | dark blue | blue | blue |
| Quality of Transmission Color | 3 | 3 | 3 | 3 | 3 | 3 | 3 |
| Adhesion | 3 | 3 | 3 | 3 | 3 | 3 | 3 |

Example 5. Replacement of Solvent with Dipropylene Glycol Diacrylate (DPGDA)

50 g (12.85 g of solids) of dispersion, obtained in Example 2, Step b4) was placed in a 250 mL round bottom flask and DPGDA (30.0 g) was added. The resulting mixture was concentrated on rotary evaporator at 20 mbar pressure and 50° C. bath temperature, till no more solvent was distilled off. The solids content was adjusted to 25% w/w by addition of DPGDA.

Application Example 12

The dispersion of silver nanoplatelets in DPGDA obtained in Example 5 was mixed with additional radically curable components and photoinitiator and homogenized thoroughly to obtain printing composition 12. Reference is made to Table 5.

TABLE 5

| Printing Comp. | Ag NPs of Example 5 [% by weight] | Component (B) DPGDA[2)] [% by weight] | Component (E) [% by weight] | Oligomer (C) [% by weight] UA-1 | Photoinitiator (D) Omnirad ® 819 [% by weight] | Surfactant (G) [% by weight] |
|---|---|---|---|---|---|---|
| 12 | 7.7 | 49.8 | — | 38.1 | 4.4 | — |

Printing composition 12 was printed with a flat-bed screen press "Sirimac 4560E" from Eickmeyer, using a 180/31Y (180 threads per cm, each with a nominal thread diameter of 31 μm, yellow thread) screen with a certain printing image design and mercury UV lamp for curing. Prints were dried in an oven at 80° C. for 2 minutes, followed by UV curing at 120 W/cm, 20 m/minute speed of a UV dryer belt. The properties of obtained prints are shown in Table 6.

| Property | Application Example 12<br>Coating Composition 12 |
|---|---|
| Color of coating (frontside of substrate) | gold |
| Color of coating (backside of substrate) | gold |
| Reflection Intensity (frontside of substrate) | 3 |
| Reflection Intensity (backside of substrate) | 3 |
| Transmission Color | blue |
| Quality of Transmission Color | 3 |

Reflectivity was assessed visually according to the grayscale from 1 to 4.

Quality of transmission color was assessed visually according to the grayscale from 1 to 3.

The strength of adhesion of coatings to substrate was assessed according to a grayscale from 1 to 3 via a simplified scotch tape test:

The coatings after UV curing were left under ambient conditions for 3 days, then an adhesive tape, Lyreco Invisible Tape 184.835, was firmly applied over a portion of a coating and rapidly peeled off.

The meanings of grey scale ratings for the tests of reflectivity, transmission color quality and adhesion of the coatings are summarized in Table 7.

TABLE 7

Meaning of grey scale ratings for the tests of reflectivity, transmission color quality and adhesion of the coatings

| Rating | Reflection | Quality of Transmission Color | Adhesion |
|---|---|---|---|
| 1 | No metallic reflection | Grey color | Coating is fully removed from substrate with scotch tape |
| 2 | Weak colored metallic aspect | Greyish magenta (Appl. Ex. 1-4) or blue (Appl. Ex. 5-12) color | Coating is partially removed from substrate with scotch tape |
| 3 | Strong colored metallic reflection | Deep magenta (Appl. Ex. 1-4) or blue (Appl. Ex. 5-12) color, similar to the color of particles dispersion in THF | Coating is not removed from substrate with scotch tape |
| 4 | Very strong colored metallic reflection | — | — |

The invention claimed is:

1. A radically curable composition, comprising (A) silver nanoplatelets, (B) one reactive diluent comprising 1 to 4 (meth)acrylate groups;

(C) one, or more urethane (meth)acrylates (C), which are obtained by reaction of the following components:

(a) at least one isocyanate having two isocyanate groups, (b) at least one polyalkylene oxide polyether having at least 2 hydroxyl groups, (c) at least one hydroxy-functional (meth)acrylate having one hydroxyl group and one (meth)acrylate group, (d) at least one compound having at least one isocyanate reactive group and at least one acid function, (e) optionally at least one basic compound which is present for neutralization or partial neutralization of the acid groups of component (d), (f) optionally at least one monoalcohol having one hydroxy function; and (g) optionally at least one compound having at least one primary and/or secondary amino group, (D) one, or more photoinitiators;

(E) optionally one, or more reactive diluents, which are different from component (B);

(F) optionally one, or more oligomers, which are different from component (C);

(G) optionally one, or more surfactants;

(H) optionally one, or more polymeric binders; and (I) optionally further additives.

2. The composition according to claim 1, wherein the urethane (meth)acrylate (C) is obtained by reaction of the following components:

(a) at least one isocyanate having two isocyanate groups, (b) at least one polyalkylene oxide polyether having at least 2 hydroxyl groups, (c) at least one hydroxy-functional (meth)acrylate having one hydroxyl group and one (meth)acrylate group, (d) at least one compound having at least one isocyanate reactive group and at least one acid function, (e) optionally at least one basic compound which is present for neutralization or partial neutralization of the acid groups of component (d), (f) optionally at least one monoalcohol having one hydroxy function, and (g) optionally at least one compound having at least one primary and/or secondary amino group.

3. The composition according to claim 1, wherein component (B) is selected from octyl acrylate; decyl acrylate; lauryl acrylate, tridecyl acrylate; isodecyl acrylate; stearyl acrylate, 2-(2-ethoxyethoxy)ethyl acrylate, octyl methacrylate, lauryl methacrylate, isodecyl methacrylate, tridecyl methacrylate; tetradecyl methacrylate; isodecyl methacrylate and stearyl methacrylate, 3,3,5-trimethylcyclohexyl acrylate; isobornyl acrylate; 4-tert-butylcyclohexyl acrylate; cyclohexylmethacrylate, isobornyl methacrylate, tetrahydrofurfuryl acrylate, (5-ethyl-1,3-dioxan-5-yl) methyl acrylate, ethoxylated phenyl acrylate, ethoxylated phenyl methacrylate, nonyl phenol acrylate, nonyl phenol methacrylate, methoxy polyethyleneglycol acrylates, methoxy polyethyleneglycol methacrylates, methoxy polypropyleneglycol acrylates, methoxy polypropyleneglycol methacrylates, tetrahydrofurfuryl methacrylate, cyclic trimethylolpropane formal methacrylate, benzyl acrylate, 2-phenoxyethyl acrylate, ethoxylated (EO4) phenol acrylate; mixtures of ethoxylated (EO4) phenol acrylate and ethoxylated (EO8) nonylphenol acrylate; propoxylated (PO2) nonylphenol acrylate, ethoxylated o-phenylphenol acrylate, p-cumylphenoxylethyl acrylate, dicyclopentenyl acrylate, dicyclopentenyloxyethyl acrylate, 2-(N-butylcarbamoyloxy)ethyl acrylate; and difunctional (meth)acrylates of formula (XXa)

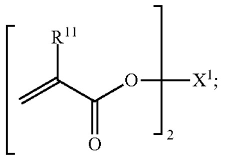

wherein $R^{11}$ is independently in each occurrence H, or a $C_1$-$C_4$alkyl group $X^1$ is a group of formula

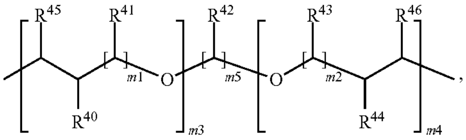

, or

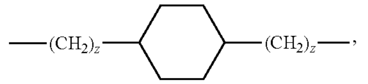

, wherein m1 is 0, or 1; m2 is 0, or 1;

m3 is 0, or an integer of 1 to 10; m4 is 0, or an integer of 1 to 10;

m5 is 0, or an integer 1 to 8;

$R^{42}$ is independently in each occurrence H, or a $C_1$-$C_4$alkyl group;

$R^{40}$, $R^{41}$, $R^{43}$, $R^{44}$, $R^{45}$ and $R^{46}$ are independently of each other H, or a $C_1$-$C_4$alkyl group; trimethylolpropane triacrylate (TMPTA), trimethylolpropane trimethacrylate (TMPTMA), ethoxylated trimethylolpropane triacrylates (in particular selected form the group consisting of ethoxylated (EO3) trimethylolpropane triacrylates, ethoxylated (EO6) trimethylolpropane triacrylates, ethoxylated (EO9) trimethylolpropane triacrylates), propoxylated trimethylolpropane triacrylates (PO3 TMPTA), ethoxylated glycerol triacrylates and propoxylated glycerol triacrylates (GPTA), pentaerythritol triacrylates (PETA, CAS no. 3524-68-3), ethoxylated pentaerythritol triacrylates, propoxylated pentaerythritol triacrylates (ethoxylated (EO3) pentaerythritol triacrylates, ethoxylated (EO6) pentaerythritol triacrylates and ethoxylated (EO9) pentaerythritol triacrylates); and tetrafunctional (meth) acrylates which are selected from bistrimethylolpropane tetraacrylate (DiTMPTA), pentaerythritol tetracrylate (PETTA), tetramethylolmethane tetramethacrylate, pentaerythritol tetramethacrylate, bistrimethylolpropane tetramethacrylate, ethoxylated pentaerythritol tetraacrylate, propoxylated pentaerythritol tetraacrylate, dipentaerythritol tetraacrylate, ethoxylated dipentaerythritol tetraacrylate and propoxylated dipentaerythritol tetraacrylate.

4. The composition according to claim 1, wherein component B) is selected from dipropylene glycol diacrylate, tripropylene glycol diacrylate, dipropylene glycol dimethacrylate, tripropylene glycol dimethacrylate, diethylene glycol diacrylate, triethylene glycol diacrylate, diethylene glycol dimethacrylate, triethylene glycol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, cyclohexanediol diacrylate, cyclohexanediol dimethacrylate and cyclohexanedimethanol diacrylate.

5. The composition according to claim 1, wherein the photoinitiator (D) is a compound of the formula (XII)

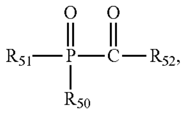

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R^{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R^{51}$ is $(CO)R'_{52}$; or $R^{51}$ is $C_1$-$C_{12}$alkyl which is unsubstituted or substituted by one or more halogen, C1-$C_{12}$alkoxy, $C_1$-$C_{12}$alkylthio, or by $NR_{53}R_{54}$;

$R^{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R^{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl, or the photoinitiator (C) is a compound of the formula (XI)

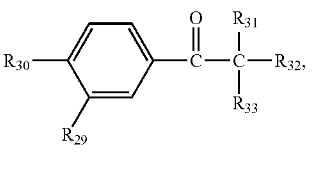

wherein $R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2$—$OR_{34}$, morpholino, S—$C_1$-$C_{18}$alkyl, a group —HC═$CH_2$, —$C(CH_3)$═$CH_2$,

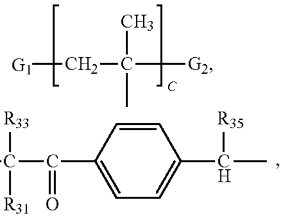

,

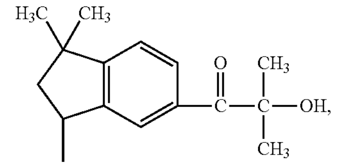

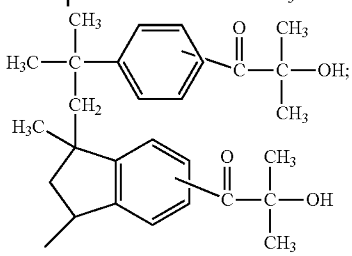

or

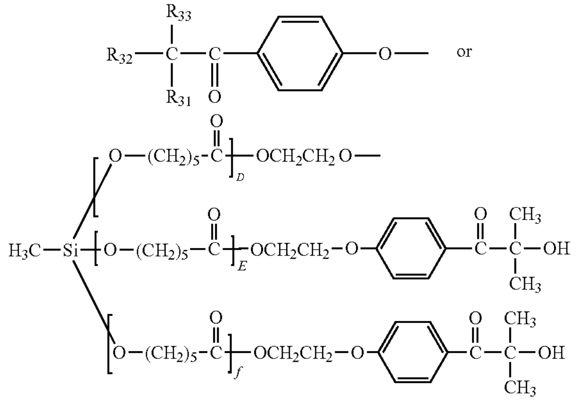

D, E and f are 1-3;

c is 2-10;

$G_1$ and $G_2$ independently of one another are end groups of the polymeric structure;

$R_{34}$ is hydrogen,

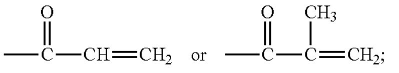

$R_{31}$ is hydroxy, $C_1$-$C_{16}$alkoxy, morpholino, dimethylamino or —$O(CH_2CH_2O)_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —$O(CH_2CH_2O)_g$—$C_1$-$C_{16}$alkyl; or are unsubstituted phenyl or benzyl; or phenyl or benzyl substituted by $C_1$-$C_{12}$-alkyl; or $R^{32}$ and $R^{33}$ together with the carbon atom to which they are attached form a cyclohexyl ring;

$R_{35}$ is hydrogen, $OR_{36}$ or $NR_{37}R_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

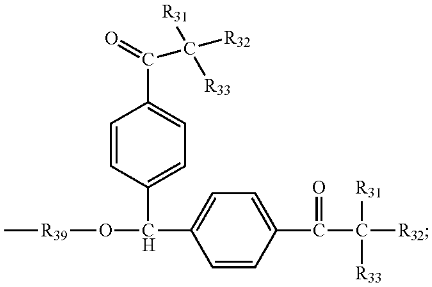

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

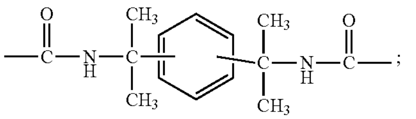

with the proviso that $R_{31}$, $R_{32}$ and $R_{33}$ not all together are $C_1$-$C_{16}$alkoxy or —$O(CH_2CH_2O)_g$—$C_1$-$C_{16}$alkyl, or the photoinitiator is a mixture of different compounds of the formula (XII), or the photoinitiator is a mixture of compounds of the formula (XII) and (XI).

6. The composition according to claim 1, wherein the diluent (E) is selected from monofunctional (metha)acrylates, monofunctional vinylamides, monofunctional (meth) acrylamides, monofunctional vinyl esters, di(meth)acrylamides, divinyl esters, divinyl amides, trimethylolpropane formal (meth)acrylates, N-vinyloxazolidinones, N-Vinyl-caprolactam (NVC) and N-Vinyl-pyrrolidone (NVP), with the proviso that diluent (E) is different from component (B).

7. The composition according to claim 1, wherein the oligomer (F) is selected from (meth)acrylic oligomers, urethane (meth)acrylate oligomers, polyester (meth)acrylate oligomers, polyether based (meth)acrylate oligomers, amine modified polyether based (meth)acrylate oligomers or epoxy (meth)acrylate oligomers, with the proviso that oligomer (F) is different from component (C).

8. The composition according to claim 1, wherein the surfactant (G) is selected from a polymer of formula $$A—O—R_f—(CF_2)_x—CFZ—CH_2—O—R_a—C(=O)—C(R_bR_c)—X', \quad (1)$$

wherein $R_f$ is a (per)fluoropolyoxyalkylene chain having an average number molecular weight $M_n$ ranging from 100 to 8,000, and comprising, repeating units, which may be equal to or different from one another, selected from:

(i) —CFY'O—, wherein Y' is F or $CF_3$, (ii) —CFY'CFY'O—, wherein Y', equal or different at each occurrence, is as above defined, with the proviso that at least one of Y' is —F, (iii) —$CF_2CF_2CW_2O$—, wherein each of W, equal or different from each other, are F or H, (iv) —$CF_2CF_2CF_2CF_2O$—, (v) —$(CF_2)_j$—CFZ'—O— wherein j is an integer from 0 to 3 and Z' is a group of general formula —$OR_f$'T, wherein $R_f$' is a fluoropolyoxyalkene chain comprising a number of repeating units from 0 to 10, said recurring units being chosen among the followings: —CFY'O—, —$CF_2$CF"O—, —$CF_2CF_2CF_2O$—, —$CF_2CF_2CF_2CF_2O$—, with each of each of Y" being independently F or $CF_3$ and T being a $C_1$-$C_3$ perfluoroalkyl group;

Z is fluorine or $CF_3$;

x is 0 or 1, with the proviso that, when, x is 1, Z is F; —$R_a$ is a polyoxyalkylene chain free from fluorine atoms, said chain comprising from 4 to 50 fluorine-free oxyalkylene units, said units being the same or different from one another and being selected from —$CH_2CH_2O$— and —$CH_2CH(J)O$—, wherein J is a straight or branched alkyl or aryl;

$R_b$ and $R_c$ are independently a hydrogen, a methyl or a benzyl group, with the proviso that $R_b$ and $R_c$ cannot be both hydrogen;

X' is a chlorine, a bromine or a iodine atom;

A is —$R_a$—C(=O)—C($R_bR_c$)—X', wherein $R_a$, $R_b$, $R_c$, and X' are as defined above, or is a straight or branched $C_1$-$C_4$(per)fluoroalkyl group wherein one fluorine atom can be substituted by one chlorine atom or one hydrogen atom, such as, for example, a polymer of formula $R_f[CF_2CH_2O—(CH_2CH_2O)_{n'}—C(=O)—C(CH_3)_2—Br]_2$ (n'=0 to 6);

a surfactant of formula $R_{f1}$—$C_2H_4$—$SO_3$Cat (2), wherein $R_f$ represents a perfluorinated aliphatic group and Cat represents a cation;

a partially fluorinated surfactant of the general formula $R''_f$—$(CH_2)_{m6}$—$R'_f$—$COOY^1$ (3), wherein $R''_f$ represents a perfluoroalkyl group or a perfluoroalkoxy group of 3 to 8 carbon atoms, $R'_f$ represents a perfluoroalkylene of 1 to 4 carbon atoms, $Y^1$ is $NH_4$, Li, Na, K or H, or a linear, branched or cyclic alkyl containing 1-8 carbon atoms, and m6 is 1-3;

$R'''_f$—$(CH_2)_{n6}$COOM' (4), where $R'''_f$ represents a perfluoroalkyl group or a perfluoroalkoxy group of 3 to 18 carbon atoms, n6 is from 0 to 2 and M' is a monovalent cation. In case n6 is 0, $R'''_f$ represents a perfluoroalkyl group of 3 to 18 carbon atoms;

a fluorinated surfactant of general formula $R''''_f$—$(CH_2)_{n7}$—$(OCH_2CH_2)_{m7}$—OH (5), where $R''''_f$ represents a perfluoroalkyl group or a perfluoroalkoxy group of 3 to 18 carbon atoms, n7 is from 0 to 2, and m7 is from 0 to 5; in case n7 is 0, $R''''_f$ represents a perfluoroalkyl group of 3 to 18 carbon atoms;

a perfluoropolyether of formula F—$(CF_2)_{m8}$—O—$[CFX^3—CF_2—O]_{n8}$—$CFX^3$—$COOA^1$ (6), wherein m8 is 1 to 5, $X^3$ is F or $CF_3$, $A^1$ is a monovalent cation and n8 is 0 to 10;

a fluorinated polyether of the formula F—$(CF_2)_{m8'}$—O—$[CFX—CF_2—O]_{n8'}$—$CFX^5$—$COOA^3$ (7), wherein m8' is 3 to 10, $X^5$ is F or a perfluoroalkyl group, n8' is 0, 1 or 2 and $A^3$ is the counter ion of the carboxylic anion;

a fluorinated polyether surfactant of formula $R_{f2}$—O—$CF_2CF_2$—$X^4$ (8), wherein $R_{f2}$ represents a linear or branched perfluoroalkyl group having 1, 2, 3 or 4 carbon atoms and $X^4$ represents a carboxylic acid group or salt thereof;

$—H(OCH_2CH_2)_k—OCH_2CF_2—(OCF_2)_l—(OCF_2CF_2)_{m9}—OCF_2CH_2—(OCH_2CH_2)_{n9}OH$ (9), wherein k is 0, 1 or 2, 1 is 2 to 150, m9 is 1 to 100, n9 is 0, 1 or 2; and mixtures thereof.

9. The composition according to claim 1, wherein the silver nanoplatelets bear a surface stabilizing agent on their surface, which is selected from surface stabilizing agents of formula (I)

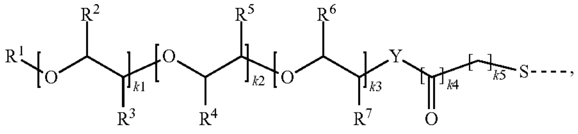

wherein $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^8$;

$R^8$ is H, or $C_1$-$C_8$alkyl;

k1 is an integer in the range of from 1 to 500, k2 and k3 are independently of each other 0, or integers in the range of from 1 to 250;

k4 is 0, or 1, k5 is an integer in the range of from 1 to 5, or surface stabilizing agents of formula (Ia)

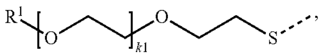

wherein $R^1$ is H, or a $C_1$-$C_8$alkyl group, and k1 is 22 to 450;

and surface stabilizing agents which are polymers, or copolymers, which are obtained by a process comprising the steps i1) polymerizing in a first step one or more ethylenically unsaturated monomers in the presence of at least one nitroxylether having the structural element

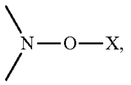

wherein X represents a group having at least one carbon atom and is such that the free radical X● derived from X is capable of initiating polymerization; or i2) polymerizing in a first step one or more ethylenically unsaturated monomers in the presence of at least one stable free nitroxyl radical

and a free radical initiator; wherein at least one monomer used in the steps i1) or i2) is a $C_1$-$C_6$alkyl or hydroxy$C_1$-$C_6$alkyl ester of acrylic or methacrylic acid; and optionally ii) a second step, comprising the modification of the polymer or copolymer prepared under i1) or i2) by a transesterification reaction, an amidation, hydrolysis or anhydride modification or a combination thereof, or by copolymers represented by formula (III)

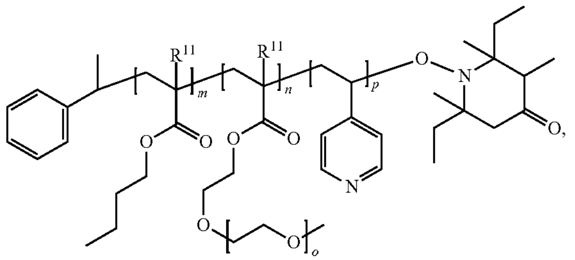

wherein $R^{11}$ and $R^{12}$ are H or methyl, m, n and p are independently of each other integers from 1 to 200, o is an integer from 1 to 150; and mixtures thereof.

10. The composition according to claim 1, which comprises one, or more stabilizing agents selected from the group consisting of compounds of formula (IIb)

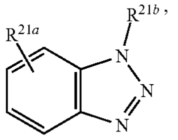

wherein $R^{21a}$ is a hydrogen atom, a halogen atom, a $C_1$-$C_8$alkoxy group, or a $C_1$-$C_8$alkyl group, $R^{21b}$ is a hydrogen atom, or a group of formula $—CHR^{24}—N(R^{22})(R^{23})$, $R^{22}$ and $R^{23}$ are independently of each other a $C_1$-$C_8$alkyl, a hydroxy$C_1$-$C_8$alkyl group, or a group of formula $—[(CH_2CH_2)—O]_{n1'}—CH_2CH_2—OH$, wherein n1' is 1 to 5, $R^{24}$ is H or $C_1$-$C_8$alkyl, and compounds of formula (IIc)

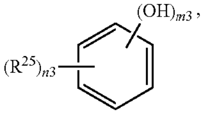

wherein $R^{25}$ can be the same, or different in each occurrence and is a hydrogen atom, a halogen atom, a $C_1$-$C_{18}$alkyl group, a $C_1$-$C_{18}$alkoxy group, or a group $—C(═O)—R^{26}$, $R^{26}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group, and n3 is a number of 1 to 4, m3 is a number of 2 to 4, and the sum of m3 and n3 is 6.

11. A security, or decorative element, comprising a substrate, which may contain indicia or other visible features in or on its surface, and on at least part of the said substrate surface, a coating, comprising the composition according to claim 1.

12. A security, or decorative element, comprising a substrate, which may contain indicia or other visible features in or on its surface, and on at least part of the said substrate surface, a coating, comprising the composition according to claim 1, wherein the security element, or decorative element comprises a substrate, a coating on at least a portion of the substrate comprising at least one liquid crystal compound, the coating being applied on the reverse side of the substrate if the substrate is transparent or translucent or on the surface side if the substrate is transparent, translucent, reflective or opaque and a further coating on at least a portion of the coating containing the liquid crystal compound or direct on the substrate if the coating containing the liquid crystal compound is placed on the reverse side of the substrate, the further coating is formed by the composition according to claim 1; or the security element, or decorative element consists of a multi-layer structure capable of interference, wherein the multilayer structure capable of interference has a reflection layer, a dielectric layer, and a partially transparent layer, wherein the dielectric layer is arranged between the reflection layer and the partially transparent layer, wherein the reflection layer is formed by a colored layer, comprising the composition according to claim 1; or the security element, or decorative element comprises a transparent carrier substrate, a layer containing a diffractive optical element (DOE) and a semi-transparent functional layer, which is formed by the composition according to claim 1; or the security, or decorative element is a blister for tablets, comprising a transparent carrier substrate that includes a semi-transparent functional layer, which is formed by the composition according to claim 1; or the security, or decorative element is a packaging comprising a plastic film shaped part and a cover film, wherein said plastic film shaped part defines the front side of the packaging and the cover film defines the rear side of the packaging, and the cover film is based on a carrier substrate provided with a semi-transparent functional layer, which is formed by the composition according to claim 1; or a security, or decorative element, comprising a substrate, a component with refractive index modulation, in particular a volume hologram, which is obtainable by exposing a recording material to actinic radiation and thereon a coating on at least a portion of the refractive index modulated layer, which is formed by the composition according to claim 1; or a security, or decorative element, comprising a substrate, an UV lacquer layer on at least part of the substrate having on at least part of its surface a nano- or microstructure, and on at least part of the UV lacquer layer and/or on at least part of the nano- or microstructure layer a coating, which is formed by the composition according to claim 1; or a security, or decorative element, capable of interference in the visible range of spectrum, comprising a substrate, optionally, carrying on at least part of its surface a nano- or microstructure, and on at least part of the substrate and/or on at least part of the nano- or microstructure, a coating, which is obtained with the compositions according to claim 1, said coating showing an interference color; or a security or decorative element, comprising i) a reflective layer, which is obtained with the compositions according to claim 1, ii) a transparent or translucent spacer layer and iii) additionally a transparent or translucent layer having a refractive index differing from refractive index of said spacer layer by at least 0.1; wherein the spacer layer ii) is located between the reflective layer i) and the layer iii) and the security, or decorative element showing an interference color.

13. A product, comprising the security or decorative element according to claim 11.

14. A method of using the security or decorative element according to claim 11 for the prevention of counterfeit or reproduction, on a document of value, right, identity, a security label or a branded good.

15. A method for manufacturing of a security or decorative element, comprising the steps of:

a) providing a substrate, optionally bearing a surface relief nano- or microstructure, b1) applying a composition claim 1 to at least a portion of the substrate, b2) optionally embossing a nano- or microstructure into the coating obtained in step b1), and c) curing the composition with actinic radiation.

* * * * *